US012600817B2

(12) United States Patent
Moeinzadeh et al.

(10) Patent No.: US 12,600,817 B2
(45) Date of Patent: Apr. 14, 2026

(54) DEVICES AND METHODS FOR ANALYZING BIOLOGICAL SAMPLES

(71) Applicant: Cellanome, Inc., Foster City, CA (US)

(72) Inventors: Seyedsina Moeinzadeh, Mountain View, CA (US); Justin Poelma, Sunnyvale, CA (US); Meng Taing, Hayward, CA (US); Frank Charbonier, San Francisco, CA (US); Tarun Kumar Khurana, Fremont, CA (US)

(73) Assignee: Cellanome, Inc., Foster City, CA (US)

( * ) Notice: Subject to any disclaimer, the term of this patent is extended or adjusted under 35 U.S.C. 154(b) by 0 days.

(21) Appl. No.: 19/052,121

(22) Filed: Feb. 12, 2025

(65) Prior Publication Data

US 2025/0282912 A1 Sep. 11, 2025

Related U.S. Application Data

(63) Continuation of application No. PCT/US2024/059913, filed on Dec. 12, 2024.

(60) Provisional application No. 63/609,847, filed on Dec. 13, 2023.

(51) Int. Cl.

*C08G 65/334* (2006.01)
*C08G 65/26* (2006.01)
*C08G 65/333* (2006.01)
*C08J 3/24* (2006.01)
*C08J 3/28* (2006.01)

(52) U.S. Cl.

CPC ..... *C08G 65/3348* (2013.01); *C08G 65/2609* (2013.01); *C08G 65/33396* (2013.01); *C08J 3/24* (2013.01); *C08J 3/28* (2013.01); *C08J 2371/02* (2013.01)

(58) Field of Classification Search

None

See application file for complete search history.

(56) References Cited

U.S. PATENT DOCUMENTS 7,544,721 B2 * 6/2009 Gaud ................ C08F 222/1025 522/182
7,968,085 B2 * 6/2011 Hersel .................... A61K 47/60 514/182
8,309,680 B2 * 11/2012 McManus ............. A61K 47/60 528/421
8,703,907 B2 * 4/2014 Ashley ................. C08G 83/003 530/323
8,912,247 B2 * 12/2014 Wang .................... A61L 24/046 523/105
9,631,092 B2 4/2017 Bowman et al.
10,968,300 B2 * 4/2021 Stansbury ............. C08F 220/14
11,179,470 B2 * 11/2021 Ashley ................ C09B 23/0066
11,554,370 B2 1/2023 Khurana et al.
12,030,047 B2 7/2024 Khurana et al.
12,151,242 B2 11/2024 Khurana et al.
12,303,892 B2 5/2025 Khurana et al.
2004/0219214 A1 11/2004 Gravett et al.
2012/0027775 A1 * 2/2012 Won ....................... A61K 47/34 514/777
2012/0202263 A1 8/2012 Blakely et al.
2015/0119280 A1 4/2015 Srinivas et al.
2016/0177030 A1 6/2016 Sugiura et al.
2016/0375143 A1 12/2016 Gunatillake et al.
2017/0312368 A1 11/2017 Ashley et al.
2020/0164083 A1 * 5/2020 Schneider ............ A61K 9/0004

FOREIGN PATENT DOCUMENTS

WO WO-2004060967 A1 * 7/2004 ......... C08G 65/3342
WO WO-2022150659 A1 7/2022
WO WO-2022261507 A1 12/2022
WO WO-2023183327 A1 9/2023
WO WO-2023196603 A1 10/2023
WO WO-2023225366 A1 11/2023
WO WO-2023240207 A1 12/2023
WO WO-2024020398 A1 1/2024
WO WO-2024092056 A1 5/2024
WO WO-2024145393 A1 7/2024
WO WO-2025072571 A1 4/2025

OTHER PUBLICATIONS

Wang et al. In situ photo-crosslinked hydrogels prepared from acrylated 4-arm-poly(ethylene glycol)-poly(ε-caprolactone) block copolymers for local cancer therapy. Polymers for Advance Technologies. 2022;33:2620-2631. (Year: 2022).*
Almeida et al. Polycaprolactone Enzymatic Hydrolysis: A Mechanistic Study. ACS Omega 2019 4 (4), 6769-6774 (Year: 2019).*
Saez-Martinez.(2013). Fabrication and Characterization of Macroporous Poly(Ethylene Glycol) Hydrogels Generated by Several Types of Porogens. International Journal of Polymeric Materials & Polymeric Biomaterials, 62(9), 502-508. (Year: 2013).*
Hou et al. Photo-cross-linked biodegradable hydrogels based on n-arm-poly(ethylene glycol), poly(ε-caprolactone) and/or methacrylic acid for controlled drug release. (2017). Journal of Biomaterials Applications. vol. 32. No. 4. pp. 511-523. (Year: 2017).*
Deforest, Cole A. and Anseth, Kristi S. Cytocompatible Click-based Hydrogels with Dynamically-Tunable Properties Through Orthogonal Photoconjugation and Photocleavage Reactions. Nature Chemistry. 3(12):925-931 (2011).

(Continued)

*Primary Examiner* — Sanza L. McClendon

(74) *Attorney, Agent, or Firm* — Wilson Sonsini Goodrich & Rosati

(57) ABSTRACT

Systems for analyzing biological components are provided. The systems may include a fluidic device and an energy source in communication with the fluidic device. The energy source may supply energy to the fluidic device to form a polymer matrix on or adjacent to a biological component within the fluidic device. Methods of using the systems to analyze biological components are also provided.

80 Claims, 38 Drawing Sheets

(56) References Cited

OTHER PUBLICATIONS

Dubay, Ryan et al., Single-Cell Microgels for Diagnostics and Therapeutics. Advanced Functional Materials. 31(44):2009946, pp. 1-54 (2021).
Fairbanks, Benjamin D. et al. A Versatile Synthetic Extracellular Matrix Mimic via Thiol-Norbornene Photopolymerization. Advanced Materials 21(48):5005-5010 (2009).
Fairbanks, Benjamin D. et al. Photodegradable, Photoadaptable Hydrogels via Radical-Mediated Disulfide Fragmentation Reaction. Macromolecules 44(8):2444-2450 (2011).
Ghassemi, Zahra et al., Stability of Proteins Encapsulated in Michael-Type Addition Polyethylene Glycol Hydrogels. Biotechnol Bioeng. 118(12): 4840-4853 (2021).
Hou, Ping et al. Photo-cross-linked biodegradable hydrogels based on n-arm-poly(ethylene glycol), poly(ε-caprolactone) and/or methacrylic acid for controlled drug release. Journal of biomaterials applications 32(4):511-523 (2017).
Kabb, Christopher P. et al. Photoreversible Covalent Hydrogels for Soft-Matter Additive Manufacturing. ACS Applied Materials and Interfaces 10(19):16793-16801(2018).
Kar, Mrityunjoy et al.,Poly(ethylene glycol) hydrogels with cell cleavable groups for autonomous cell delivery. Biomaterials. 77:186-197 (2016).
Kharkar, Prathamesh M. et al. Design of Thiol- and Light-sensitive Degradable Hydrogels using Michael-type Addition Reactions. Polymer Chemistry. 6(31):5565-5574 (2015).
Kharkar, Prathamesh M. et al. Designing degradable hydrogels for orthogonal control of cell microenvironments. Chem Soc Rev 42(17):7335-7372 (2013).
Lei, Yuguo and Segura, Tatiana. DNA Delivery from Matrix Metalloproteinase Degradable Poly (ethylene glycol) Hydrogels to Mouse Cloned Mesenchymal Stem Cells. Biomaterials. 30(2): 254-265 (2009).
Levalley, Paige J. et al. On-demand and tunable dual wavelength release of antibody using light-responsive hydrogels. ACS Appl Bio Mater 3(10):6944-6958 (2020).
Neumann, Alexander J. et al. Nondestructive evaluation of a new hydrolytically degradable and photo-clickable PEG hydrogel for cartilage tissue engineering. Acta biomaterialia 39:1-11 (2016).
PCT/US2024/059913 International Search Report and Written Opinion dated Apr. 10, 2025.
PCT/US2024/059913 Invitation to Pay Additional Fees dated Feb. 20, 2025.
Shih, Han and Lin, Chien-Chi. Cross-linking and degradation of step-growth hydrogels formed by thiol-ene photoclick chemistry. Biomacromolecules 13(7):2003-2012 (2012).
Yom-Tov et al. PEG-Thiol based hydrogels with controllable properties. European Polymer Journal 74:1-12 (2016).

* cited by examiner

Effect of concentration:
Lysis of 10X cPEG gels by GSH at 1mM and 10mM in Tris pH 8.6

| Date | GSH Concentration [mM] of working solution | Composition of working solution | pH of working solution (measured) | Gel lysis time (min) for 2s cages | Gel lysis time (min) 4s+ cages |
|---|---|---|---|---|---|
| 29-Jun | 1 | Tris | 8.6 | 18 | 24 |
| 29-Jun | 10 | Tris | 8.6 | 2 | 2.5 |

FIG. 2A

Fast lysis with Tris buffer at higher pH:
Lysis of 10% cPEG gels by GSH 10mM in Tris at pH8.0 and pH8.6

| Date | GSH Concentration [mM] of working solution | Composition of working solution | pH of working solution (measured) | Gel lysis time (min) for 2s cages | Gel lysis time (min) 4s+ cages |
|---|---|---|---|---|---|
| 29-Jun | 10 | Tris | 8.6 | 2 | 2.5 |
| 30-Jun | 10 | Tris | 8.0 | 4 | 5 |

FIG. 2B

| Date | GSH Concentration [mM] | Composition of working solution | pH of working solution (measured) | Gel lysis time (min) for 2s cages | Gel lysis time (min) 4s cages |
|---|---|---|---|---|---|
| 12-Jul | 10 | RPMI (+NaOH) | 8.1 | 4 | 5 |
| 11-Jul | 10 | RPMI (+NaOH) | 8.1 | 5 | 6 |
| 12-Jul | 10 | RPMI (+NaOH) 1day old | 8.1 | 6 | 7 |
| 13-Jul | 10 | PBS (+NaOH) | 8.0 | 6 | 7 |
| 13-Jul | 10 | RPMI (+NaOH) | 7.8 | 7 | 8 |
| 13-Jul | 10 | PBS (+NaOH) | 7.8 | 9 | 10 |
| 11-Jul | 10 | RPMI (+NaOH) | 7.5 | 15 | 16 |
| 13-Jul | 10 | PBS (+NaOH) | 7.5 | 15 | 17 |
| 6-Jul | 10 | RPMI | 6.8 | 80 | Not measured |

FIG. 3

Day 0 (post-caging)
Minimal exposure to cPEG precursor solution

Day 1

Day 2

3 hr exposure to cPEG precursor
solution prior to caging - Day 0

Day 1

Day 2 - Similar rates of cell viability and proliferation of K562 cells when exposed to cPEG precursor solution for 3 hours prior to caging Nominal porogen cages
Constant loading of cPEG and photoinitiator +50% porogen
Constant loading of cPEG and photoinitiator Nominal porogen cages 1 minute after addition of
CD56 PE (30 uL/mL)

Nominal porogen cages 10 minutes after addition of CD56 PE (30 uL/mL)

| | 701 | | 702 | |
|---|---|---|---|---|
| **Part A components** | **vol (µL)** | **vol %** | **vol (µL)** | **vol %** |
| cPEG stock solution (20% w/v) | 21 | 58.3% | 21 | 58.3% |
| Porogen stock solution (25% w/v) | 6 | 16.7% | 9 | 25% |
| PBS | 9 | 25.0% | 6 | 16.7% |
| | | | | |
| totals | 36 µL | 100.0 % | 36 µL | |

FIG. 9A

| **Part A + B formulation** | **vol (µL)** | **vol %** |
|---|---|---|
| Part A | 36 | 30% |
| Part B (15 mg/mL LAP solution in PBS buffer) | 24 | 20% |
| PBS | 60 | 50% |
| | | |
| total volume (µL) | 120 | 100% |

| Effect of cPEG loading on pore size – formulations | | | | |
|---|---|---|---|---|
| Component | cPEG conc. vs nominal | | | |
| | 0.75x **(1101)** | Nominal **(1102)** | 1.1x **(1103)** | 1.2x **(1104)** |
| cPEG stock solution (20% w/v) | 14.6 µL | 19.5 µL | 21.5 µL | 23.4 µL |
| Porogen stock | 6.00 µL | 6.00 µL | 6.00 µL | 6.00 µL |
| LAP solution (3 mg/mL) | 12.0 µL | 12.0 µL | 12.0 µL | 12.0 µL |
| PBS buffer | 87.4 µL | 82.5 µL | 80.6 µL | 78.6 µL |
| beads | 0.6 µL | 0.6 µL | 0.6 µL | 0.6 µL |
| total vol | 120.6 µL | 120.6 µL | 120.7 µL | 120.6 µL |

FIG. 11

Caging

Before degradation

CD56+ cells marked in green

After degradation

120px, 60px wall, 3s exposure

After rinse

Corner markers used ti line up BMP for degrading partition 3s exposure

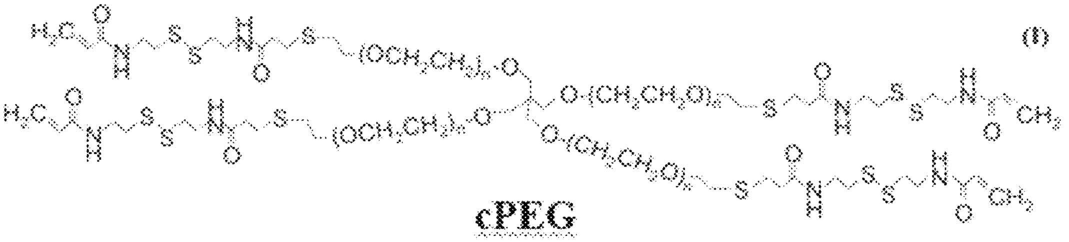
(I)
cPEG
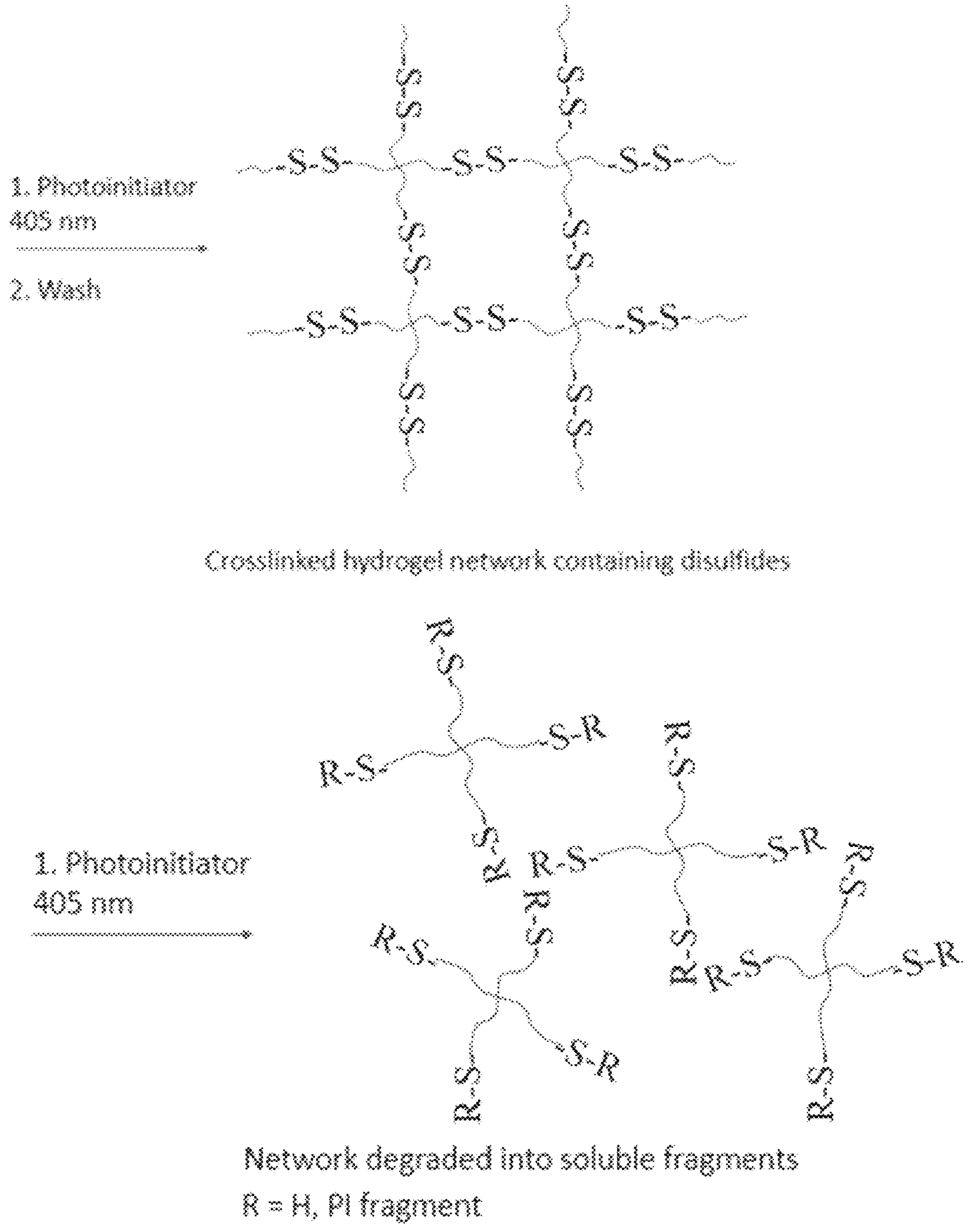
FIG. 21

DEVICES AND METHODS FOR ANALYZING BIOLOGICAL SAMPLES

CROSS-REFERENCE

This application is a continuation of International PCT Application No. PCT/US2024/059913, filed Dec. 12, 2024, which claims the benefit of U.S. Provisional Application No. 63/609,847, filed Dec. 13, 2023, which is incorporated herein by reference in its entirety.

BACKGROUND

In the field of cellular biology, single-cell analysis can include the study of genomics, transcriptomics, proteomics, metabolomics, and cell-cell interactions at the single-cell level. Due to the heterogeneity seen in both eukaryotic and prokaryotic cell populations, analyzing a single cell can make it possible to discover mechanisms not seen when studying a bulk population of cells. In single-cell analysis, changes in single cells can be tracked or observed at the level of genes, proteins, or other cellular components. For example, in cancer, where cells may be mutating, it can be of interest to see how cancers change at the genetic level. These patterns of somatic mutations and copy number aberrations can be observed using single-cell sequencing.

SUMMARY

Recognized herein is a need for a compartmentalizing components of a biological sample to perform one or more assays on an individual component within a compartment. The one or more assays may be performed with or without the need for additional processing of the individual component (e.g., without the need for nucleotide amplification steps), while retaining spatial information of the individual components. Compartments may be generated or deconstructed on demand to localize or release targeted components of the biological sample.

Provided in certain embodiments herein is a system comprising a fluidic device containing one or more biological components and one or more polymer precursors. The system may further comprise at least one energy source in communication with the fluidic device. In some embodiments, the at least one energy source supplies energy to the fluidic device to cause the one or more polymer precursors to form at least one polymer matrix on or adjacent to the biological component.

In some embodiments, the polymer matrix forms a plurality of gel structures adjacent to each other, wherein the gel structures are degradable. In further embodiments, degrading at least part of at least two adjacent gel structures allows the contents of the at least the two adjacent gel structures to be combined.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, where only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

Provided in certain embodiments, described herein is a method for processing a chemical or biological material, comprising: (a) inputting (i) said chemical or biological material and (ii) one or more polymer precursors into a fluidic device; (b) supplying a stimulus to said fluidic device to generate one or more polymer matrices, wherein said one or more polymer matrices comprise: (i) a first gel structure from said one or more polymer precursors within said fluidic device, wherein said first gel structure at least partially encapsulates said chemical or biological material, and wherein said first gel structure comprises a first interior region; and (ii) a second gel structure adjacent to said first gel structure, wherein said second gel structure comprises a second interior region; and (c) degrading a portion of said first gel structure, said second gel structure, or both, thereby yielding a third interior region, wherein said third interior region comprises said first interior region of said first gel structure and said second interior region of said second gel structure.

In some embodiments, the first gel structure and said second gel structure each comprise one or more polymer matrix walls. In some embodiments, the first gel structure and said second gel structure share a polymer matrix wall of the one or more polymer matrix walls. In some embodiments, the portion of said first gel structure, said second gel structure, or both degraded in (c) comprises said shared polymer matrix wall.

In an aspect, described herein is a method for processing a chemical or biological material, comprising: (a) inputting (i) said chemical or biological material and (ii) one or more polymer precursors into a fluidic device; (b) supplying a stimulus to said fluidic device to generate one or more polymer matrices from said one or more polymer precursors within said fluidic device, wherein a polymer matrix of said one or more polymer matrices at least partially encapsulates said chemical or biological material, and wherein said polymer matrix is formed in less than 3 seconds following contact of said one or more polymer precursors with said stimulus.

In some embodiments, the polymer matrix is formed in less than 2 seconds following contact of said one or more polymer precursors with said energy. In some embodiments, the polymer matrix is formed in less than 1 second following contact of said one or more polymer precursors with said energy. In some embodiments, the polymer matrix is formed in less than 0.5 seconds following contact of said one or more polymer precursors with said energy.

In an aspect, described herein is a method for processing a chemical or biological material, comprising (a) inputting (i) said chemical or biological material and (ii) one or more polymer precursors into a fluidic device; (b) supplying a stimulus to said fluidic device to generate one or more polymer matrices from said one or more polymer precursors within said fluidic device, wherein a polymer matrix of said one or more polymer matrices at least partially encapsulates said chemical or biological material; and (c) performing one or more operations on said chemical or biological material within said polymer matrix, wherein said one or more operations comprise a temporal duration of at least one day, wherein no more than 20% of said polymer matrix degrades during said temporal duration.

In some embodiments, no more than 15% of said polymer matrix degrades during said temporal duration. In some embodiments, no more than 10% of said polymer matrix degrades during said temporal duration. In some embodiments, no more than 5% of said polymer matrix degrades during said temporal duration. In some embodiments, no more than 1% of said polymer matrix degrades during said temporal duration. In some embodiments, the temporal duration comprises at least three days. In some embodiments, the temporal duration comprises at least five days. In some embodiments, the temporal duration comprises at least seven days. In some embodiments, the temporal duration comprises at least fourteen days.

In an aspect, described herein is a method for processing a chemical or biological material, comprising: (a) inputting (i) one or more chemical or biological materials and (ii) one or more polymer precursors into a fluidic device; (b) supplying a stimulus to said fluidic device to generate one or more polymer matrices from said one or more polymer precursors within said fluidic device, wherein said one or more polymer matrices at least partially encapsulate said one or more chemical or biological materials; and (c) performing one or more operations on said one or more chemical or biological materials within said one or more polymer matrices, wherein said one or more operations comprise a temporal duration of at least one day, wherein at least 80% of said one or more chemical or biological materials are viable during said temporal duration. In some embodiments, at least 85% of said one or more chemical or biological materials are viable during said temporal duration. In some embodiments, at least 90% of said one or more chemical or biological materials are viable during said temporal duration. In some embodiments, at least 95% of said one or more chemical or biological materials are viable during said temporal duration. In some embodiments, at least 99% of said one or more chemical or biological materials are viable during said temporal duration. In some embodiments, the temporal duration comprises at least three days. In some embodiments, the temporal duration comprises at least five days. In some embodiments, the temporal duration comprises at least seven days. In some embodiments, the temporal duration comprises at least fourteen days.

In an aspect, described herein is a method for processing a chemical or biological material, comprising: (a) inputting (i) said one or more chemical or biological materials and (ii) one or more polymer precursors into a fluidic device; and (b) maintaining a fluidic communication between said one or more chemical or biological materials and said polymer precursors for a temporal duration of at least ten minutes, wherein at least 80% of said one or more chemical or biological materials are viable during said temporal duration.

In some embodiments, the at least 85% of said one or more chemical or biological materials are viable during said temporal duration. In some embodiments, the at least 90% of said one or more chemical or biological materials are viable during said temporal duration. In some embodiments, the at least 95% of said one or more chemical or biological materials are viable during said temporal duration. In some embodiments, the at least 99% of said one or more chemical or biological materials are viable during said temporal duration. In some embodiments, the temporal duration comprises at least 30 minutes. In some embodiments, the temporal duration comprises at least one hour. In some embodiments, the temporal duration comprises at least two hours. In some embodiments, the temporal duration comprises at least three hours. In some embodiments, the temporal duration comprises at least one day. In some embodiments, the method further comprises supplying a stimulus to said fluidic device to generate one or more polymer matrices from said one or more polymer precursors within said fluidic device, wherein said one or more polymer matrices at least partially encapsulate said one or more chemical or biological materials. In some embodiments, the stimulus comprises light. In some embodiments, the one or more polymer matrices comprises a polymerized form of a cPEG monomer.

In some embodiments, the one or more polymer matrices comprise a polymerized form of a monomer including a structure of structure (I):

(I)

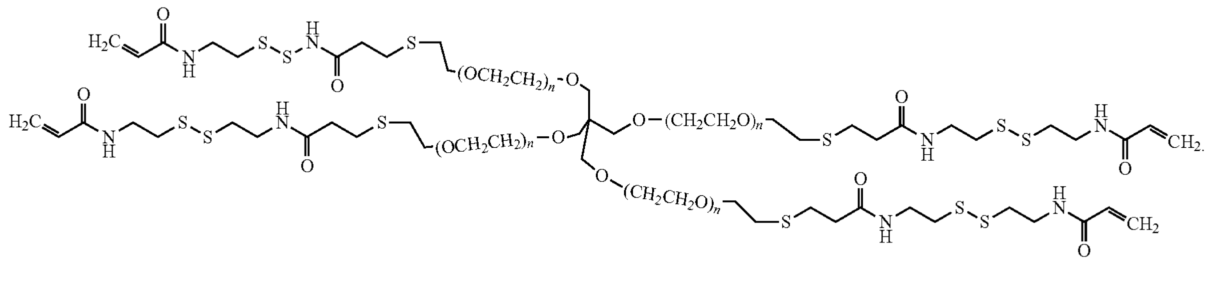

In some embodiments, the one or more polymer matrices comprise a polymerized form of a monomer including a structure (II):

(II)

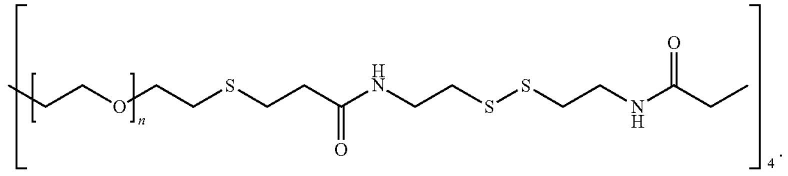

In some embodiments, the n is between about 0 to about 10. In some embodiments, the one or more polymer precursors comprise at least 40 μL of solution.

In some embodiments, the one or more polymer matrices comprise a polymerized form of a monomer including a structure (III):

(III)

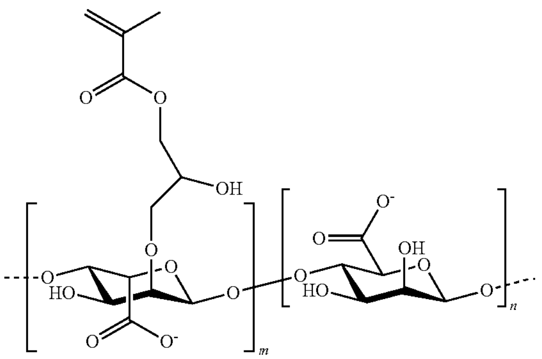

In some embodiments, the one or more polymer matrices comprise a polymerized form of a monomer including a structure (IV):

(IV)
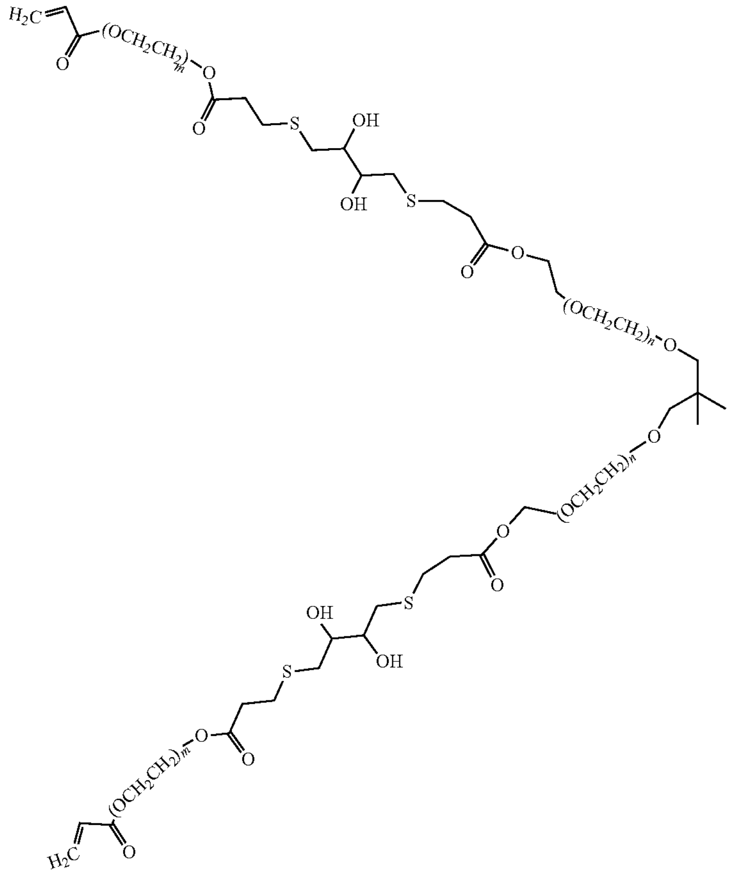
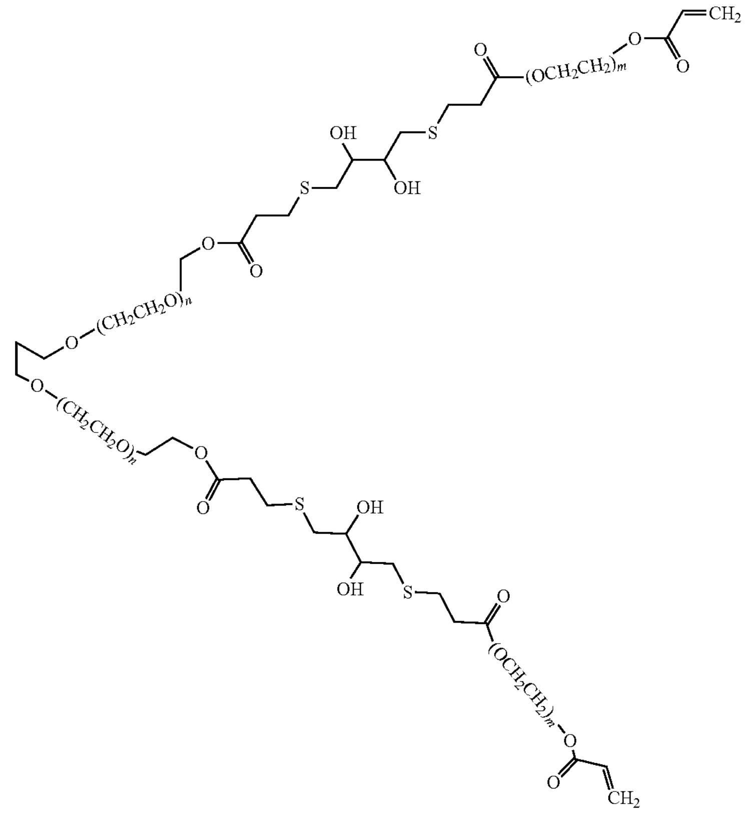

In some embodiments, the one or more polymer matrices comprise a polymerized form of a monomer including a structure (V):

(V)

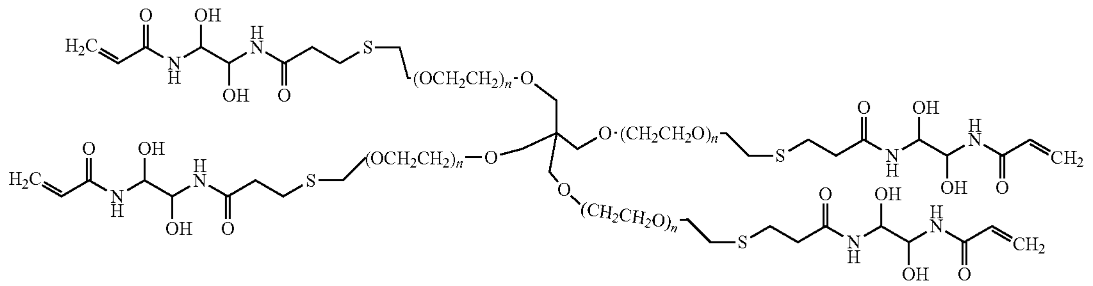

In some embodiments, the one or more polymer matrices comprise a polymerized form of a monomer including a structure (VI):

(VI)

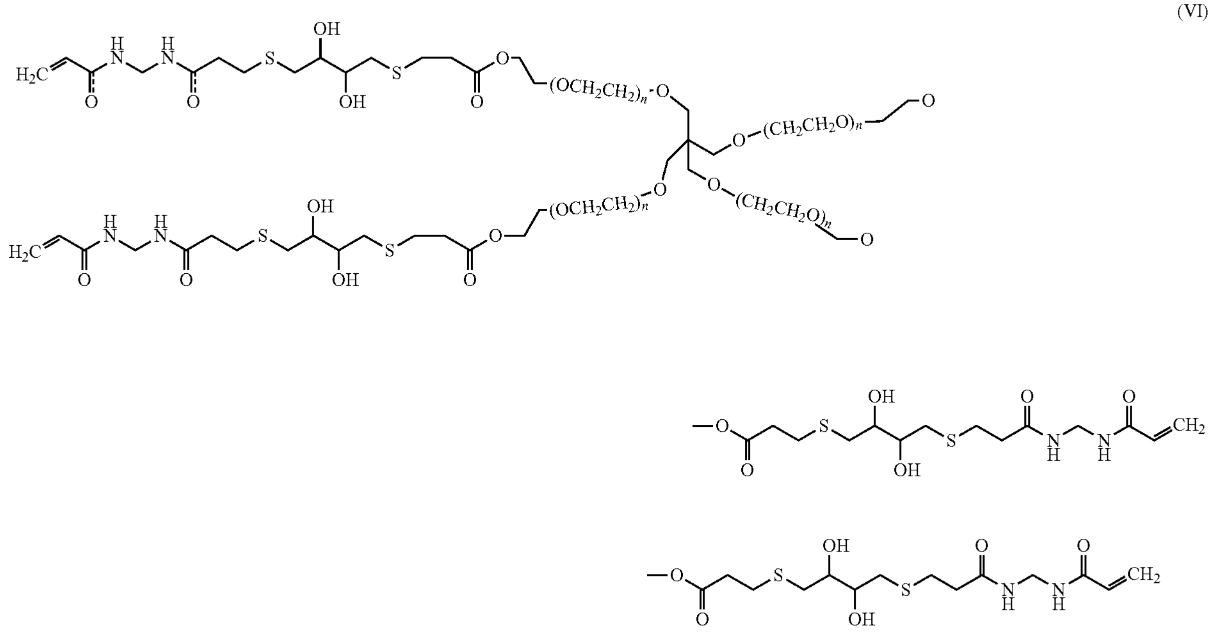

In some embodiments, the one or more polymer matrices comprise a polymerized form of a monomer including a structure (VII):

(VII)

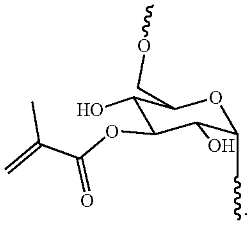

In some embodiments, the one or more polymer matrices comprise a polymerized form of a monomer including a structure (VIII):

(VIII)

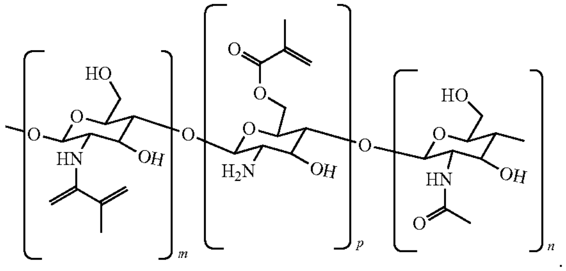

In some embodiments, the one or more polymer matrices comprise a polymerized form of a monomer including a structure (IX):

(IX)

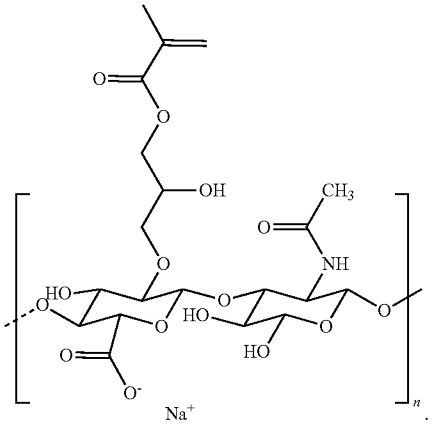

In some embodiments, the one or more polymer matrices comprise a polymerized form of a monomer including a structure (X):

(X)

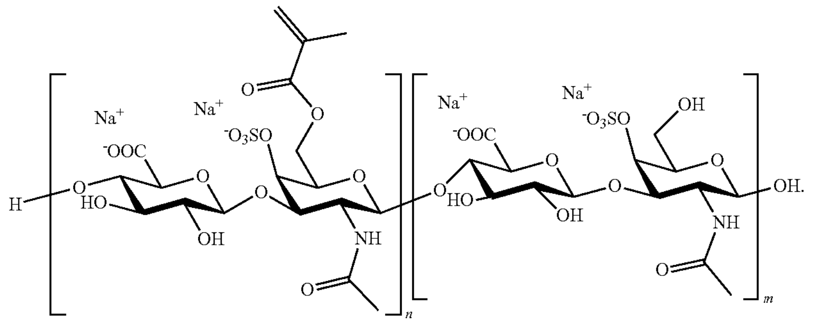

In some embodiments, the one or more polymer matrices comprise a polymerized form of a monomer including a structure (XI):

(XI)

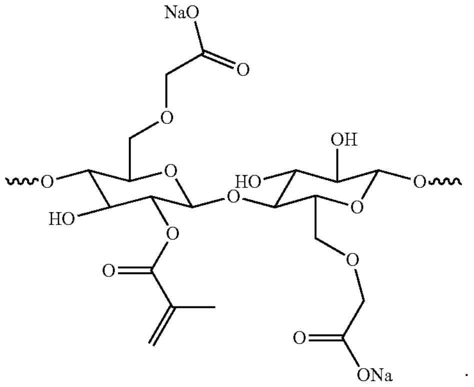

In some embodiments, the one or more polymer matrices comprise a polymerized form of a monomer including a structure (XII):

(XII)

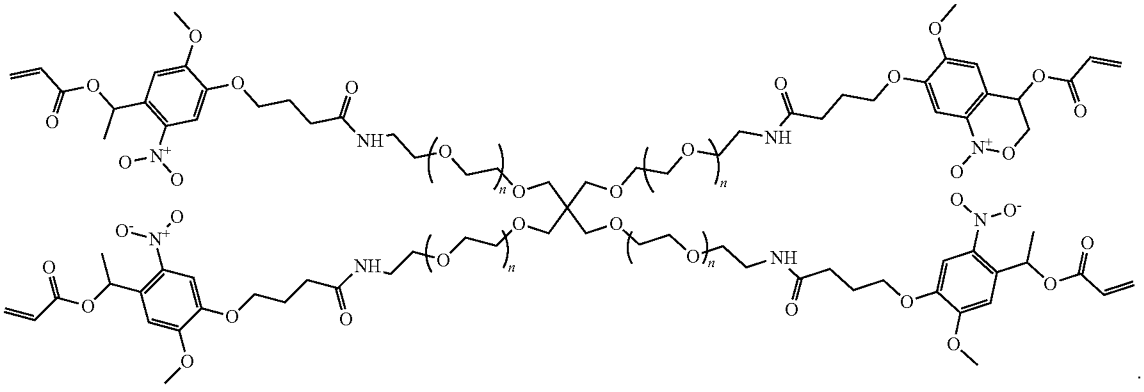

In some embodiments, the one or more polymer matrices comprise a polymerized form of a monomer including a structure (XIII):

(XIII)

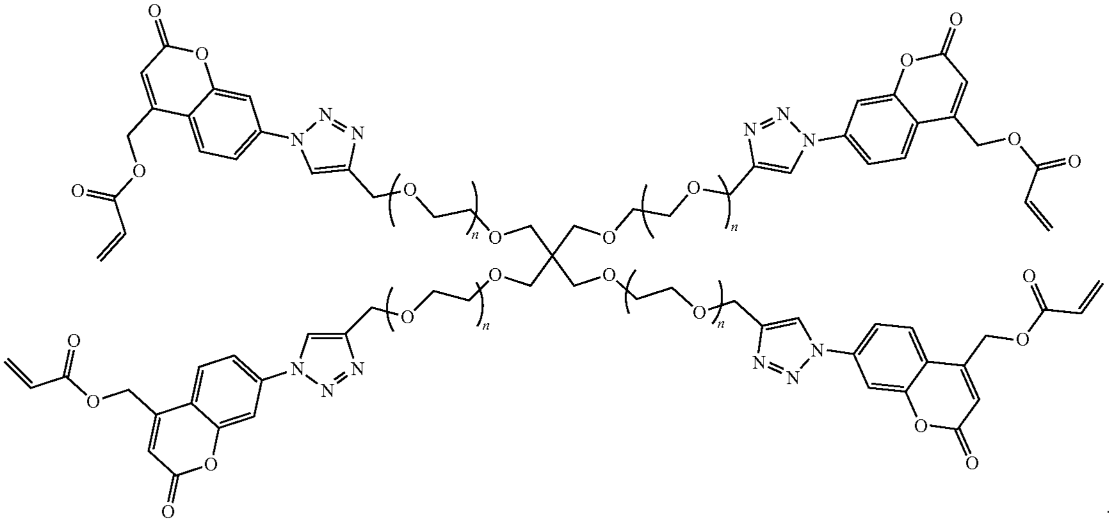

In some embodiments, one or more polymer matrices comprise a polymerized form of a monomer, the monomer comprising: an oligomeric domain comprising three or more arms, wherein each arm of said oligomeric domain comprises a degradable functional group and a crosslinkable functional group, wherein the crosslinkable functional group of an arm of the three or more arms is configured to crosslink with another crosslinkable functional group of another polymer precursor in response to a first stimulus, thereby obtaining the polymerized form of the monomer, and wherein the degradable functional group is configured to be cleaved in response to a second stimulus, thereby solubilizing the polymerized form of the monomer.

In some embodiments, the oligomeric domain comprises four or more arms.

In some embodiments, the one or more polymer matrices comprise a degradable functional group. In some embodiments, the degradable function group comprises disulfide, Beta-thioether ester, Amidomethylol and vicinal diol, vicinal diol, alginate backbone, dextran backbone, chitosan backbone, hyaluronic acid backbone, chondroitin sulfate backbone, or carboxy methyl cellulose backbone, or a combination thereof. In some embodiments, the one or more polymer matrices comprise a hydrogel. In some embodiments, the hydrogel comprises cPEG, cSEL-BTEEC, cSEL-DHEBA, cSEL-diol, cSEL-alginate, cSEL-dextran, cSEL-chitosan, cSEL-hyaluronic acid, cSEL-chondroitin sulfate, or cSEL-cellulose, or a combination thereof. In some embodiments, the one or more polymer matrices comprise a degradation reagent. In some embodiments, the degradation reagent comprises DTT, TCEP, BME, GSH, DMEM, RPMI, PBS buffer, DMEM, RPMI, PBS buffer, sodium (meta)periodate, Alginatelyase (enzyme), Dextranase, Lysozyme and chitinase, Hyaluronidase, Chondroitinase, or Cellulases, or a combination thereof.

In some embodiments, the one or more polymer matrices comprise at least one beta-thioether ester. In some embodiments, the one or more polymer matrices comprise a PEG-moiety containing beta-thioether esters. In some embodiments, the beta-thioether ester is formed by reacting an acrylate with a thiol. In some embodiments, the or more polymer matrices degrade overnight in the presence of commonly used cell culture media, thereby providing a biocompatible degradation pathway for selective retention experiments. In some embodiments, the one or more polymer matrices comprise a Michael donor. In some embodiments, the Michael donor is PEG-thiol. In some embodiments, the one or more polymer matrices comprise a cSEL beta-thioether ester with one beta-thioether ester per arm. In some embodiments, the one or more polymer matrices comprises are formed from any material that comprises a PEG with a Michael acceptor chain. In some embodiments, the Michael acceptor chain comprises PEG-acrylamide, PEG-vinyl sulfone, PEG-maleimide, or PEG-carbonyl acrylic, or any combination thereof.

In some embodiments, the one or more polymer matrices are degradable by cleavage of disulfide bonds. In some embodiments, the disulfide bonds are cleavable by one or more reducing agents. In some embodiments, the one or more reducing agents comprise DTT, TCEP, BME, or GSH, or any combination thereof. In some embodiments, the one or more polymer matrices comprise one or more arms each comprising one or more amides. In some embodiments, the one or more polymer matrices are degradable by oxidative cleavage of vicinal diol by sodium (meta)periodate. In some embodiments, the method further comprises: (a) using a caging workflow, (b) performing selective retention of cells when used with cPEG or other hydrogel with orthogonal degradation mechanism, or (c) performing long-term cell incubation, using reducing agents in cell-culture media without affecting cage stability. In some embodiments, the one or more polymer matrices comprise a vicinal diol functionality that can be cleaved via oxidation of one or more hydroxyls. In some embodiments, the one or more polymer matrices are used to formulate a stable hydrogel. In some embodiments, the one or more polymer matrices comprise a polymerized form of a photocleavable 4-arm PEG-monomer. In some embodiments, the one or more polymer matrices are photodegradable via ortho-nitrobenzyl moiety. In some embodiments, the one or more polymer matrices comprises a polymerized form of a Coumarin-based photodegradable monomer. In some embodiments, the one or more polymer matrices comprise a 4-arm PEG-acrylamide comprising one or more disulfides. In some embodiments, the one or more polymer matrices comprise one or more cage disulfide bonds in a hydrogel cage formation, wherein the hydrogel cages degrade using light and a photoinitiator. In some embodiments, the one or more polymer matrices enables hydrogel formation, and wherein the hydrogel enables spatiotemporal control of hydrogel cage degradation, therefore enabling selective retention of cells with a single hydrogel formulation. In some embodiments, the one or more polymer matrices enable hydrogel formation, and wherein the hydrogel enables the ability to selectively degrade cages and release their contents using light and photoinitiator as reagents.

In some embodiments, the one or more polymer precursors enable formation of a hydrogel up to 2 mm thick, and wherein the hydrogel can be degraded in 120 s at low light intensity (e.g., 10 $mW/cm^2$, about 50 to 1000 $mW/cm^2$, or about 100 to 700 $mW/cm^2$ at 265 nm).

In some embodiments, upon exposure to light, photogenerated radicals that initial multiple fragmentation and disulfide exchange reactions, thereby permitting and promoting photodeformation, photowelding and photodegradation of the one or more polymer matrices.

In some embodiments, the one or more polymer precursors enable hydrogel formation, wherein the hydrogel exhibits a chemical or physical change in response to an external stimulus.

In some embodiments, the one or more polymer matrices comprise a photolabile nitrobenzyl ester which lyses upon photon absorption, thereby allowing a user to exogenous control degradation of the one or more polymer matrices.

In some embodiments, the one or more polymer precursors enable hydrogel formation, and wherein the method further comprises controlling a network degradation of the hydrogel by concentration of a photoinitatior infused in the hydrogel.

In some embodiments, the one or more polymer precursors comprise thiol groups that are quenched after formation of the one or more polymer matrices.

In some embodiments, a higher concentration of bis-acrylamide in the one or more polymer matrices leads to a greater pore size.

In some embodiments, the degradation of the one or more polymer matrices is dependent upon a type of encapsulated cells, a cell number, or a fraction of disulfide moieties present in the one or more polymer matrices. In some embodiments, a grafting efficiency of one or more polymer matrices is at least 96%.

In some embodiments, one or more polymer precursors are in a solution having a pH of at least 8.0.

In some embodiments, the one or more polymer precursors comprises a porogen, and increasing porogen loading results in an increased pore size of the one or more polymer matrices. In some embodiments, the increasing the porogen concentration increases a rate of diffusion by about 20%. In some embodiments, the increased pore size increases the speed of diffusion of a fluorescently labeled antibody into the one or more polymer matrices. In some embodiments, the fluorescently labeled antibody is CD56 PE. In some embodiments, the one or more polymer precursors are photopolymerized via photocrosslinking by UV light.

Another aspect of the present disclosure provides a flow cell for sequencing a gene, comprising: a plurality of cells, a plurality of nanowells, and one or more polymer precursors; wherein a polymer matrix is formed from said one or more polymer precursors in less than 10 seconds following contact of said one or more polymer precursors with energy.

In some embodiments, the method comprises the chemical or biological material comprises a first cell in the first interior region and a second cell in the second interior region.

In some embodiments, the method comprises the first cell comprises one of a killer cell, an activation cell, and a suppression cell, and wherein the first cell interacts with the second cell after the degrading in (c).

In some embodiments, the method comprises the chemical or biological material comprises a polymer bead comprising one or more oligonucleotides disposed thereon.

In some embodiments, the method comprises the chemical or biological material includes one or more cells or components thereof. In some embodiments, the method further comprises one or more polymer precursors comprise: (a) a macromonomer, (b) a photoinitiator, and (c) a porogen. In some embodiments, the method further comprises the degrading in (c) is caused by cleavage of one or more disulfide bonds of the first gel structure, the second gel structure, or both.

Another aspect of the present disclosure provides a polymer precursor, comprising: an oligomeric domain comprising three or more arms, wherein each arm of said oligomeric domain comprises a degradable functional group and a crosslinkable functional group, wherein the crosslinkable functional group of an arm of the three or more arms is configured to crosslink with another crosslinkable functional group of another polymer precursor in response to a first stimulus, thereby obtaining a polymerized form of the polymer precursor, and wherein said degradable functional group is configured to be cleaved in response to a second stimulus, thereby solubilizing the polymerized form of the polymer precursor.

In some embodiments, the oligomeric domain comprises four or more arms. In some embodiments, the oligomeric domain is hydrophilic. In some embodiments, the oligomeric domain comprises poly(ethylene glycol), poly(N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), Poly(2-vinyl-1-methylpyridinium bromide), poly(N,N-diethylacrylamide), poly(N,N-dimethylacrylamide), poly(2-hydroxyethyl acrylate), poly(2-hydroxy methacrylate-co-methacrylic acid), poly(propylene oxide), poly(2-(dimethylamino)ethyl methacrylate), or poly (N-(2-hydroxypropyl)methacrylamide), or a combination thereof. In some embodiments, the oligomeric domain comprises poly(ethylene glycol). In some embodiments, the oligomeric domain comprises poly(N-vinylpyrrolidone). In some embodiments, the oligomeric domain comprises poly (acrylic acid). In some embodiments, the oligomeric domain comprises poly(methacrylic acid). In some embodiments, the oligomeric domain comprises poly(vinyl alcohol). In some embodiments, the oligomeric domain comprises poly (L-lysine). In some embodiments, the oligomeric domain comprises poly(2-ethyl-2-oxazoline). In some embodiments, the oligomeric domain comprises poly(maleic acid). In some embodiments, the oligomeric domain comprises poly(vinyl phosphoric acid). In some embodiments, the oligomeric domain comprises poly(acrylamide). In some embodiments, the oligomeric domain comprises poly(vinylamine). In some embodiments, the oligomeric domain comprises poly(ethylene oxide-co-propylene oxide).

In some embodiments, the oligomeric domain comprises poly(N-isopropylacrylamide). In some embodiments, the oligomeric domain comprises poly(vinyl phosphonic acid). In some embodiments, the oligomeric domain comprises Poly(2-vinyl-1-methylpyridinium bromide). In some embodiments, the oligomeric domain comprises poly(N,N-diethylacrylamide). In some embodiments, oligomeric domain comprises poly(N,N-dimethylacrylamide). In some embodiments, the oligomeric domain comprises poly(2-hydroxyethyl acrylate). In some embodiments, the oligomeric domain comprises poly(2-hydroxy methacrylate-co-methacrylic acid). In some embodiments, the oligomeric domain comprises poly(propylene oxide). In some embodiments, the oligomeric domain comprises poly(2-(dimethylamino)ethyl methacrylate). In some embodiments, the oligomeric domain comprises poly(N-(2-hydroxypropyl) methacrylamide).

In some embodiments, the degradable functional group comprises disulfide, beta-thioether ester, amidomethylol, vicinal diol, peptide, polysaccharides (e.g. alginate, dextran, chitosan, chondroitin), an oligosaccharide, ortho-nitrobenzyl, coumarin, acetal, ketal, ester, ortho ester, anhydride, imine, hydrazone, carbonate, carbamate, azo, phosphate, cinnamoyl, or benzoin ether, or a combination thereof. In some embodiments, the degradable functional group comprises disulfide. In some embodiments, the degradable functional group comprises beta-thioether ester. In some embodiments, the degradable functional group comprises disulfide, beta-thioether ester, amidomethylol, vicinal diol, peptide, polysaccharides (e.g. alginate, dextran, chitosan, chondroitin), ortho-nitrobenzyl, coumarin, acetal, ketal, ester, ortho ester, anhydride, imine, hydrazone, carbonate, phosphate, cinnamoyl, or benzoin ether, or a combination thereof.

In some embodiments, the degradable functional group comprises disulfide. In some embodiments, the degradable functional group comprises beta-thioether ester. In some embodiments, the degradable functional group comprises a disaccharide. In some embodiments, the degradable functional group comprises amidomethylol. In some embodiments, the degradable functional group comprises vicinal diol. In some embodiments, the degradable functional group comprises a peptide. In some embodiments, the degradable functional group comprises one or more polysaccharides.

In some embodiments, the one or more polysaccharides comprise alginate. In some embodiments, the one or more polysaccharides comprise dextran. In some embodiments, the one or more polysaccharides comprise chitosan. In some embodiments, the one or more polysaccharides comprise chondroitin. In some embodiments, the degradable functional group comprises ortho-nitrobenzyl. In some embodiments, the degradable functional group comprises coumarin. In some embodiments, the degradable functional group comprises acetal. In some embodiments, the degradable functional group comprises ketal. In some embodiments, the degradable functional group comprises ester. In some embodiments, the degradable functional group comprises ortho ester. In some embodiments, the degradable functional group comprises anhydride. In some embodiments, the degradable functional group comprises imine. In some embodiments, the degradable functional group comprises hydrazone.

In some embodiments, the degradable functional group comprises carbonate. In some embodiments, the degradable functional group comprises phosphate. In some embodiments, the degradable functional group comprises cinnamoyl. In some embodiments, the degradable functional group comprises benzoin ether. In some embodiments, the degradable functional group comprises azo. In some embodiments, the degradable functional group comprises carbamate. In some embodiments, the degradable functional group comprises an oligosaccharide. In some embodiments, the oligosaccharide comprises 2, 3, or 4 monomeric units (e.g., 2, 3, or 4 hexoses, pentoses, heptoses, a combination thereof, etc.). In some embodiments, the oligosaccharide is a disaccharide.

In some embodiments, the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

In some embodiments, the crosslinkable functional group comprises acrylate. In some embodiments, the crosslinkable functional group comprises methacrylate. In some embodiments, the crosslinkable functional group comprises acrylamide. In some embodiments, the crosslinkable functional group comprises methacrylamide. In some embodiments, the crosslinkable functional group comprises norbornyl. In some embodiments, the crosslinkable functional group comprises styrene. In some embodiments, the crosslinkable functional group comprises vinyl ether. In some embodiments, the crosslinkable functional group comprises vinyl pyrrolidone.

In some embodiments, the crosslinkable functional group comprises vinyl ester. In some embodiments, the crosslinkable functional group comprises maleimide. In some embodiments, the crosslinkable functional group comprises allyl. In some embodiments, the crosslinkable functional group comprises alkyne. In some embodiments, the crosslinkable functional group comprises azide. In some embodiments, the crosslinkable functional group comprises thiol. In some embodiments, the crosslinkable functional group comprises alkene. In some embodiments, the crosslinkable functional group comprises epoxide. In some embodiments, the first stimulus comprises an energy source. In some embodiments, the energy source comprises a light source. In some embodiments, the light source is at a wavelength between 300-500 nm. However, the wavelength may be selected to be suitable for a particular photoinitiator. For example, for 2-Hydroxy-2-Methyl-Phenyl-Propane-1-one, a wavelength of about 275 nm may be selected; for lithium phenyl-2,4,6-trimethylbenzoylphosphinate (LAP), a wavelength of about 405 nm may be selected; for 1,4-bis(pentylamino) anthraquinone, a wavelength of about 635 nm may be selected; and so forth.

In some embodiments, the second stimulus comprises an energy source in a presence of a photoinitiator and an absence of polymer precursor. In some embodiments, the energy source comprises a light source. In some embodiments, the light source is at a wavelength between 300-500 nanometers (nm). In some embodiments, the light source is at a wavelength between 380 nm-420 nm. In some embodiments, the light source is at a wavelength of between about 250 to 700 nm, between about 250 to 300 nm, between about 250 to 400 nm, between about 300 to 450 nm, or between about 400 to 700 nm.

In some embodiments, the second stimulus comprises introduction of a degradation reagent. In some embodiments, the degradation reagent comprises dithiothreitol (DTT).

In some embodiments, the degradation reagent comprises tris (2-carboxyethyl) phosphine (TCEP). In some embodiments, the degradation reagent comprises 2-mercaptoethanol (BME). In some embodiments, the degradation reagent comprises glutathione reductase (GSH). In some embodiments, the degradation reagent comprises DMEM. In some embodiments, the degradation reagent comprises RPMI. In some embodiments, the degradation reagent comprises PBS buffer. In some embodiments, the degradation reagent comprises sodium (meta)periodate. In some embodiments, the degradation reagent comprises alginate lyase. In some embodiments, the degradation reagent comprises dextranase. In some embodiments, the degradation reagent comprises lysozyme. In some embodiments, the degradation reagent comprises chitinase. In some embodiments, the degradation reagent comprises hyaluronidase. In some embodiments, the degradation reagent comprises chondroitinase.

In some embodiments, the degradation reagent comprises cellulases.

Another aspect of the present disclosure provides a kit, comprising: (a) a porogen; and (b) a polymer precursor described anywhere in this disclosure.

In some embodiments, the porogen comprises poly(ethylene glycol).

In some embodiments, the ratio of the porogen to the polymer precursor by weight is between about 1:1 and 1:6. In some embodiments, the ratio of the porogen to the polymer precursor by weight is between about 1:2 and 1:5. In some embodiments, the ratio of the porogen to the polymer precursor by weight is between about 1:3 and 1:4. In some embodiments, the ratio of the porogen to the polymer precursor by weight is about 1:3.5.

In some embodiments, (a) the porogen; and (b) the polymer precursor are contained in a single container. In some embodiments, the kit further comprises (c) a photoinitiator contained in another container.

In some embodiments, the photoinitiator includes one of lithium phenyl-2,4,6-trimethylbenzoylphosphinate (LAP), Irgacure 2959, diphenyl(2,4,6-trimethylbenzoyl)phosphine oxide (TPO) nanoparticles, 2,2'-azobis[2-methyl-N-(2-hydroxyethyl) promionamide](VA-086), BAPO-Oli, BAPO-Ona, Eosin-Y, Riboflavin, and combination thereof.

In some embodiments, the oligomeric domain further comprises an amide moiety. In some embodiments, the oligomeric domain further comprises a beta thioether moiety.

In an aspect, described herein is a method for processing a chemical or biological material, comprising: (a) inputting (i) said chemical or biological material and (ii) one or more polymer precursors into a fluidic device, wherein the one or more polymer precursors comprise a porogen, a macromonomer, and a photoinitiator; (b) supplying an optical stimulus to said fluidic device to generate two or more polymer matrices, wherein said two or more polymer matrices comprise: (i) a first hydrogel structure formed within said fluidic device, wherein said first hydrogel structure encapsulates said chemical or biological material, and wherein said first hydrogel structure comprises a first interior region; and (ii) a second hydrogel structure formed within said fluidic device, wherein said second hydrogel structure encapsulates said chemical or biological material, and wherein said first hydrogel structure comprises a second interior region; and (c) inputting a solution containing the photoinitiator into the fluidic device; and (d) supplying the optical stimulus to said fluidic device to selectively degrade at least one of the first hydrogel structure or said second hydrogel structure.

In some embodiments, the inputting the solution containing the photoinitiator into the fluidic device includes removing the porogen and the macromonomer from the fluidic device. In some embodiments, the macromonomer comprises a disulfide moiety, wherein two or more polymer matrices comprises the disulfide moiety, the disulfide moiety configured to be cleaved when exposed to the supplied optical stimulus.

In some embodiments, the at least partially encapsulates said chemical or biological material is fully encapsulates said chemical or biological material. In some embodiments, the gel structure is a hydrogel structure. In some embodiments, the one or more biological materials that are viable comprise live cells.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 2A illustrates the effect of concentration of a buffer in the polymer matrix precursor solution on the speed of degradation of the polymer matrix, according to some embodiments;

FIG. 2B illustrates the lysis of a polymer matrix by a degradation reagent in buffer of varying pH, according to some embodiments;

FIG. 3 illustrates the lysis of a polymer matrix by a degradation reagent in buffer of varying pH, according to some embodiments;

FIG. 9A-9B show illustrative examples of precursor solution composition by volume for formation of polymer matrix compartments configured to encapsulate of one or more biological components in a flow cell, according to some embodiments;

FIG. 11 shows an illustrative examples of precursor solution composition by volume for formation of polymer matrix compartments configured to encapsulate of one or more biological components in a flow cell, according to some embodiments;

FIG. 17A is a brightfield image of the hydrogel chambers following 5 minutes of incubation in the presence of a degradant. FIG. 17B is a brightfield image of the hydrogel chambers following 10 minutes of incubation in the presence of a degradant. FIG. 17C is a brightfield image of the hydrogel chambers following 20 minutes of incubation in the presence of a degradant.

FIG. 19A is an image of hydrogel chambers formed from 1 second of irradiation. FIG. 19B is an image of hydrogel chambers formed using 2 seconds of irradiation. FIG. 19C is an image of hydrogel chambers formed using 3 seconds of irradiation.

FIG. 20A is a series of images of hydrogel chambers enclosing adherent cells immediately following hydrogel chamber formation and prior to adherent cell adherence to fluidic device surfaces. FIG. 20B is a series of images of the hydrogel chambers enclosing adherent cells 72 hours after hydrogel chamber formation.

FIG. 21 is a schematic that shows photopolymerization and photodegradation of a polymer precursor.

DETAILED DESCRIPTION

Figure 1A:
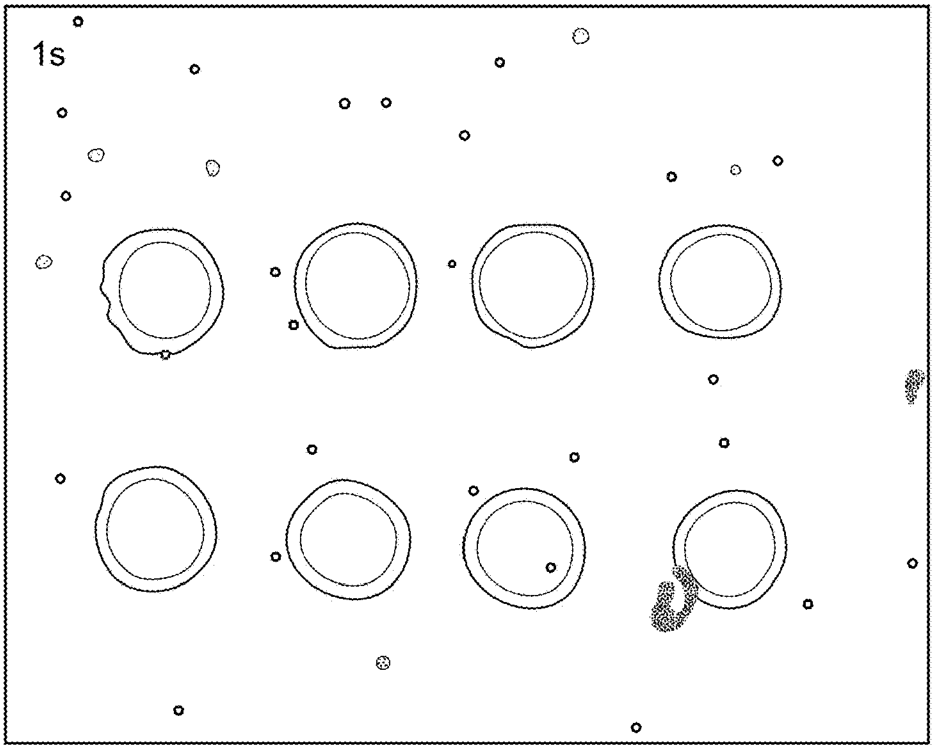
FIG. 1A-1E shows an illustrative example of a micrograph of polymer matrix compartments formation over time and encapsulation of one or more biological components in a flow cell, according to some embodiments.
Figure 1B:
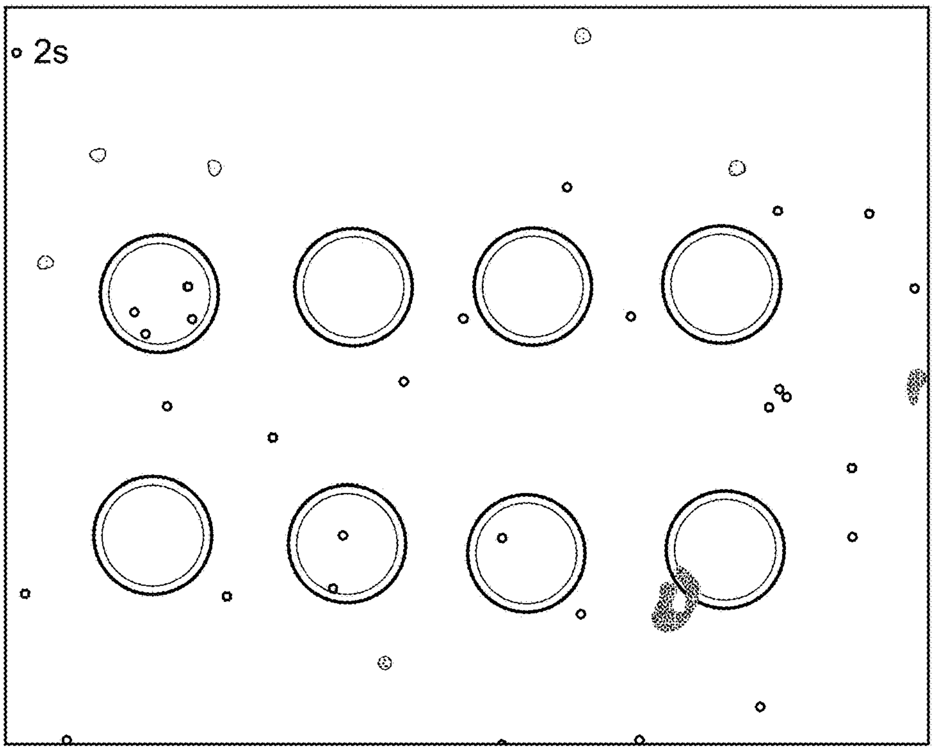
Figure 1C:
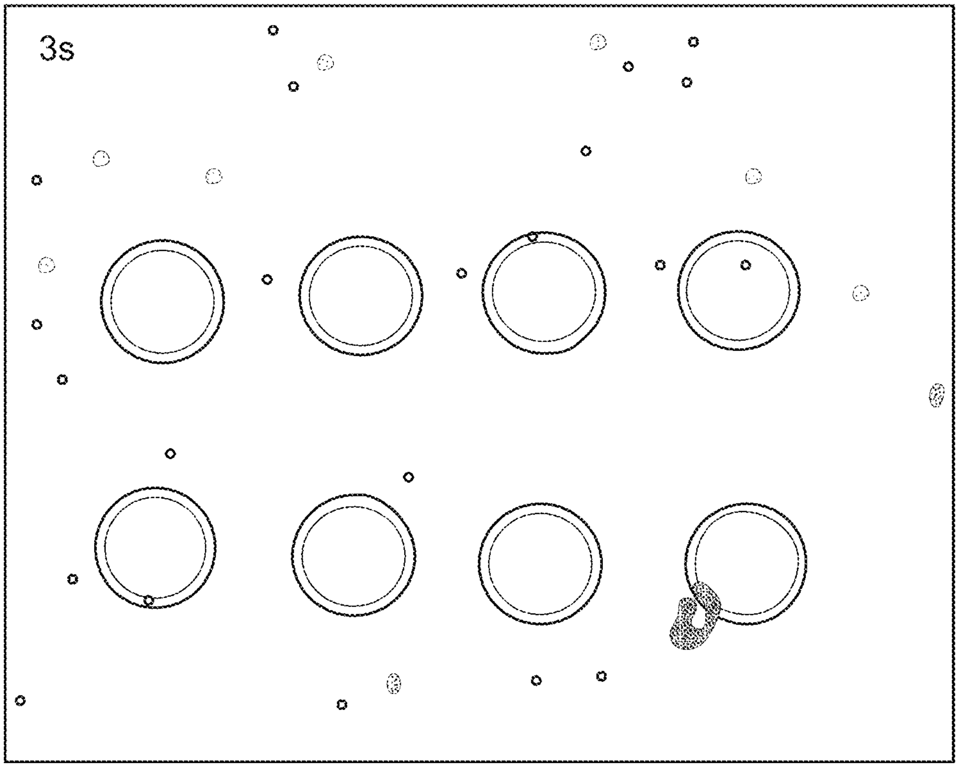
Figure 1D:
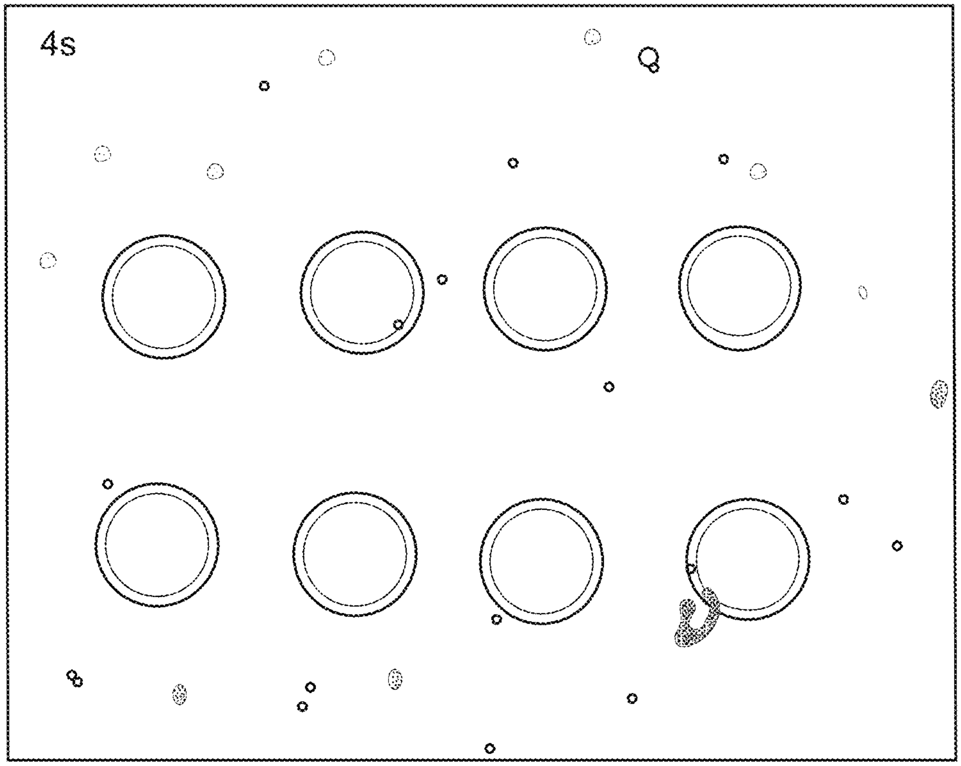
Figure 1E:
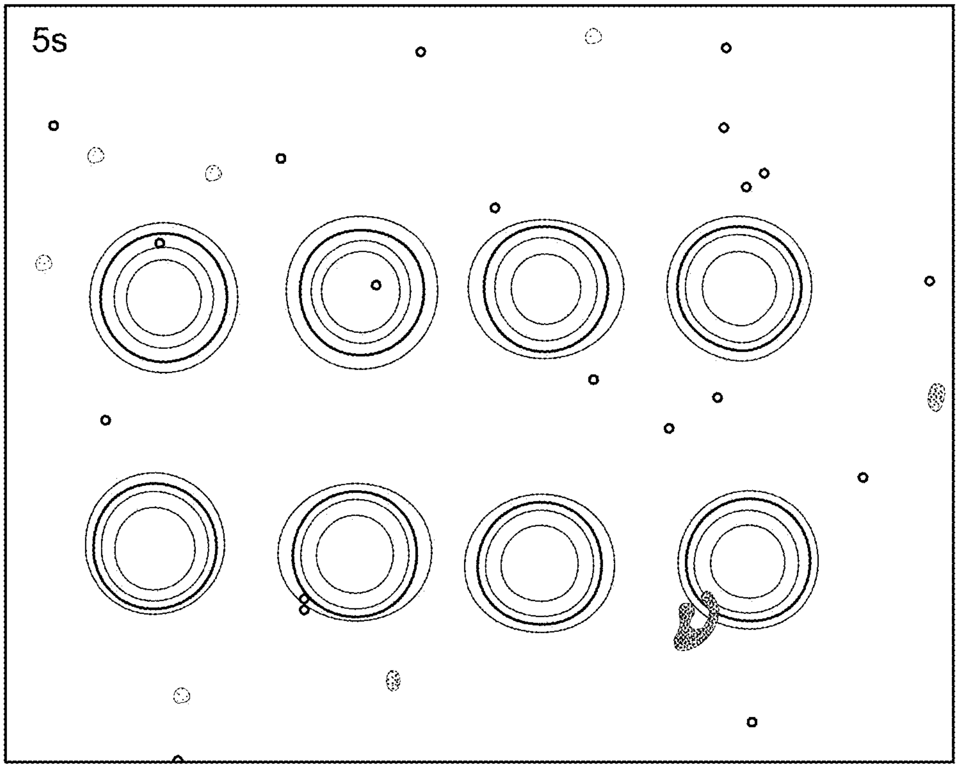

Analyzing biological samples on a level of a cell's physical properties, proteome, transcriptome, genome, epigenome, methylome, secretome, or metabolome can be performed on single cells or on a population of cells. For example, genetic material from a cell can be analyzed separately from, or in combination with, genetic materials from other cells. While analyzing components of a sample individually may generate data with higher resolution and less noise or cross-contamination, this approach can be costly and time consuming. On the other hand, analyzing a sample or a plurality of samples in bulk can be cost and time efficient but may generate undesired, or less desired, output (e.g., due to heterogeneity). For example, a particular datum may not be trackable to a source in the sample. A spatial association of the sample components may also be lost. For example, two components of a sample may be adjacent to one another in their biologically relevant state but after pooling a plurality of samples or components of a sample, the spatial information between the two components may be lost.

To avoid generating heterogenous samples, individual components of the sample may be compartmentalized. This can allow individual components of a sample to be processed simultaneously, or substantially simultaneously, while retaining spatial information intact and reducing processing steps. Additionally, by preventing cross-contamination and loss of material during extraneous sample processing, the generated data may be of higher quality (e.g., the data may have a higher signal to noise ratio as appropriate). Some methods may preserve spatial information by barcoding individual or groups of compartments in a sample. These methods may combine the barcoded components and may not perform multiple assays on the same component within a compartment or analysis chamber. Some of these methods may require nucleotide amplification steps that can introduce biases in the generated data.

In order to compartmentalize individual components of a biological sample, a polymer matrix (e.g., a hydrogel matrix) can be formed adjacent to or around at least of portion of an individual component in a fluidic device. The hydrogel matrix may be selectively generated to surround a component after the system detects the component or hydrogel matrices can be generated according to a predefined pattern in a fluidic device. The hydrogel matrix may allow reagents and smaller entities to pass while retaining the individual component of the biological sample in place. Because one or more individual components can be localized within a fluidic device (e.g., encapsulated) and the localized components be exposed to one or more reagents and/or washing solutions during and/or in between analyses, multiple assays can be performed within the compartments (e.g., simultaneously, substantially simultaneously, serially, etc.).

Disclosed herein are compositions, systems, and methods for forming polymer matrices in spatially-controlled manners within biological samples. The polymer matrices can be formed by photopolymerizing crosslinkable monomers at defined locations within a fluidic device. For example, the compositions and systems disclosed herein can be utilized to form chambers around cells in a fluidic device, such as those shown in FIGS. 1A-E, 5A-E, 6A-F, 8A-D, 12A-G, 17A-C, 19A-C, and 20A-B by identifying the positions of cells and then irradiating regions surrounding the cells to photopolymerize a polymer precursor. In order to facilitate this process for various embodiments, polymer precursors can fulfill one or more of the following characteristics. First, the polymer precursors can polymerize rapidly to prevent cell migration away from chambers during polymerization. Second, in order to facilitate longitudinal cell assays the polymer precursors can be stable (e.g., retain structural fidelity for days, weeks, or months). Third, the polymerized polymer precursors can be biocompatible, and in particular have low toxicity towards cells in the pre-polymerized and polymerized form. Fourth, the polymers can be stable in the presence of cells; oxidative (e.g., superoxide-containing), reductive (e.g., thiol-containing), and/or exoenzyme-containing (e.g., hydrolase, thioredoxin, and/or nuclease-containing) extracellular environments; and cell-induced mechanical stresses. Finally, the polymers can be rapidly degradable to facilitate whole cell, cell secretion, and cell lysate collection. The polymer precursors of the present application fulfill an unmet need by exhibiting one or more of the combination of characteristics required for spatially and temporally-controlled cell capture, culture, and/or analysis. For various embodiments, it was surprisingly discovered that multi-arm polymer precursors with a crosslinkable functional group (e.g., acrylate or acrylamide), a degradable functional group (e.g., disulfide or vicinal diol), and an oligomeric domain (e.g., polyethylene glycol) on each arm provides one or more characteristics suitable for use with the disclosed biological partitioning assays (e.g., photopolymerizing chambers to enclose select cells from a biological sample).

Different assays may be performed in different locations of the fluidic device, for example, to test the effects of different treatment conditions. Additionally, because components are not generally mixed and combined, low concentrations of components (e.g., due to dilution) can be prevented. For example, when analyzing genomic material, an amplification step can be avoided due to the preservation of the genetic material in each compartment. By having two or more components within a compartment, interactions between components can be studied as well. The polymer matrix can be degradable "on demand" allowing for controlled localization and release mechanisms. The solutions provided herein can retain spatial information of the components and generate data on a cellular, proteomic, transcriptomic, or genomic level. Since spatial information is retained, the data can be associated (e.g., linked) with phenotypic data. Further, the solutions provided herein can retain spatial information of the components and link data (e.g., phenotypic data) on a cellular, proteomic, transcriptomic, or genomic level.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least" precedes the first numerical value in a series of two or more numerical values, the term "at least" applies to each of the numerical values in that series of numerical values. For example, at least 1, 2, or 3 is equivalent to at least 1, at least 2, or at least 3.

Whenever the term "less than" precedes the first numerical value in a series of two or more numerical values, the term "less than" applies to each of the numerical values in that series of numerical values. For example, less than 3, 2, or 1 is equivalent to less than 3, less than 2, or less than 1.

The terms "coupled to," "connected to," and "in communication with," as used herein, generally refer to any form of interaction between two or more entities, including mechanical, electrical, magnetic, electromagnetic, fluid, biological, and thermal interaction. Two components may be coupled to each other even though they are not in direct contact with each other.

The terms "polypeptide" and "peptide," as used interchangeably herein, generally refer to a polymer of amino acids in which an amino acid may be linked to another amino acid by a peptide bond. In some examples, a polypeptide is a protein. The amino acid may be a naturally occurring amino acid or a non-naturally occurring amino acid (e.g., an amino acid analogue). The polypeptide can be linear or branched. The polypeptide can include modified amino acids. The polypeptide may be interrupted by non-amino acids. A polypeptide can occur as a single chain or an associated chain. The polypeptide may include a plurality of amino acids. The polypeptide may have a secondary and tertiary structure (e.g., the polypeptide may be a protein). In some examples, the polypeptide can comprise at least 2, 3, 4, 5, 6, 7, 8, 9, 10, 20, 30, 40, 50, 100, 1,000, 10,000, or more amino acids. The polypeptide may be a fragment of a larger polymer. In some examples, the polypeptide can be a fragment of a larger polypeptide, such as a fragment of a protein.

The term "amino acid," as used herein, generally refers to a naturally occurring or non-naturally occurring amino acid (e.g., an amino acid analogue). The non-naturally occurring amino acid may be an engineered or synthesized amino acid.

The term "sample," as used herein, generally refers to a chemical or biological sample containing a biological component. The biological component may comprise a cell, a nucleic acid, a microbiome, a protein, a combination of cells, a metabolite, a combination thereof, or any other suitable component of a biological sample. For example, a sample can be a biological sample including one or more cells. For another example, a sample can be a biological sample including one or more polypeptides. The biological sample can be obtained (e.g., extracted or isolated) from or include blood (e.g., whole blood), plasma, serum, urine, saliva, mucosal excretions, sputum, stool, and tears. The biological sample can be a fluid or tissue sample (e.g., skin sample). In some instances, the sample may be derived from a homogenized tissue sample (e.g., brain homogenate, liver homogenate, or kidney homogenate). In certain embodiments, the sample may include a specific type of cell (e.g., a neuronal cell, muscle cell, liver cell, or kidney cell,). The sample may comprise or be acquired from a diseased cell or tissue (e.g., a tumor cell or a necrotic cell), In some embodiments, the sample may include or may be from a disease-associated inclusion (e.g., a plaque, a biofilm, a tumor, or a non-cancerous growth). In certain embodiments, the sample may include or may be obtained from a cell-free bodily fluid, such as whole blood, saliva, or urine. In various embodiments, the sample can include circulating tumor cells. In some cases, the sample may include or may be an environmental sample (e.g., soil, waste, or ambient air), industrial sample (e.g., samples from any industrial processes), or a food sample (e.g., dairy product, vegetable product, or meat product). The sample may be processed prior to loading into a microfluidic device. For example, the sample may be processed to purify a certain cell type or polypeptide and/or to include reagents.

As used herein, the term "polymer matrix" generally refers to a phase material (e.g., continuous phase material) that comprises at least one polymer. In some embodiments, the polymer matrix refers to the at least one polymer as well as the interstitial space not occupied by the polymer. A polymer matrix may be composed of one or more types of polymers. A polymer matrix may include linear, branched, and crosslinked polymer units. A polymer matrix may also contain non-polymeric species intercalated within its interstitial spaces not occupied by polymer chains. The intercalated species may be solid, liquid, or gaseous species. For example, the term "polymer matrix" may encompass desiccated hydrogels, hydrated hydrogels, and hydrogels containing glass fibers. A polymer matrix may comprise a polymer precursor, which generally refers to one or more molecules that upon activation can trigger or initiate a polymeric reaction.

A polymer precursor can be activated by electrochemical energy, photochemical energy, a photon, magnetic energy, or any other suitable energy.

As generally used, herein the term "viability" or "cell viability" or "percent viability" refers to the percentage of living, healthy cells within a population, typically expressed as a ratio or percentage. In some embodiments, viability is a measure of the cells' ability to survive and function as compared to the total number of cells in a given sample. In some embodiments, evaluating cell viability provides insights into the health, viability, and overall functionality of a cell population under specific conditions or treatments. In some embodiments, techniques such as staining with certain dyes or using assays are employed to assess cell viability in laboratory settings.

As discussed below, a wide variety of photo-synthesizable gels and degradable gels are available for implementing the systems and methods described herein. Guidance for selecting such gels for desired properties including, but not limited to, biocompatibility, gelation speed, degradation speed, and like properties, is provided in the following references, which are incorporated by reference: Kharkar et al, Chem. Soc. Rev., 42: 7335-7372 (2013); Kharkar et al, Polymer Chem., 6(31): 5565-5574 (2015); Neumann et al, Acta Biomater., 39: 1-11 (2016); DeForest et al, Nature Chemistry, 3(12): 925-931 (2012); Bowman et al, U.S. Pat. No. 9,631,092; LeValley et al, ACS Appl. Bio. Mater., 3(10): 6944-6958 (2020); Kabb et al, ACS Appl. Mater. Interfaces, 10: 16793-16801 (2018); Fairbanks et al, Macromolecules, 44: 2444-2450 (2011); Fairbanks et al, Adv. Mater., 21(48): 5005-5010 (2009); Sugiura et al, U.S. patent publication US2016/0177030; Shih et al, Biomacromolecules, 13(7): 2003-2012 (2012); and the like. In some embodiments, photo-synthesized gels are formed using a photo-initiator for radical polymerization. In some embodiments, photo-initiators comprise Irgacure 2959, Lithium phenyl-2,4,6-trimethylbenzoylphosphinate (LAP), or Eosin-Y (e.g. see Choi et al, Biotechniques, 66(1): 40-53 (2019)). In some embodiments, hydrogel precursors comprise hyaluronic acid, chitosan, heparin, alginate, polyethylene glycol (PEG), multi-arm PEG, poly(ethylene glycol)-b-poly(propylene oxide)-b-poly (ethylene glycol) (PEG-PPO-PEG), poly(lactic acid-co-glycolic acid)-b-poly(ethylene glycol)-b-poly(lactic acid-co-glycolic acid) (PLGA-PEG-PLGA), and poly(vinyl alcohol). In some embodiments, polymer precursors comprise PEG or multi-arm PEG. In some embodiments, polymer precursors comprise an enzymatically degradable cross-linker. In some embodiments, such enzymatically degradable cross-linker is degradable by an esterase or a peptidase. In some embodiments, polymer precursors comprise a photo-degradable cross-linker. In some embodiments, such photo-degradable cross-linker comprises a nitrobenzyl group. In some embodiments, such photo-degradable cross-linker comprises a coumarin moiety. In some embodiments, photo-degradable hydrogels are used with methods described herein, for example, because photo-degradation of hydrogel chambers may be carried out selectively and on-demand, so that specified hydrogel chambers may be degraded without affecting non-selected hydrogel chambers are unaffected. In some embodiments, hydrogel chambers are degraded non-selectively, so that all hydrogel chambers in a given channel (or other vessel) are degraded simultaneously. In some embodiments, such non-selective degradation is carried out with a cleavage reagent that specifically cleaves a labile bond in a hydrogel. For example, such cleavage agent comprises a reducing agent. In some embodiments, such non-specific degradation is carried out with an enzyme that cleaves a bond or chemical element in a hydrogel. For example, chemical elements include, but are not limited to, peptides, polysaccharides and oligonucleotides.

Figure 14A:
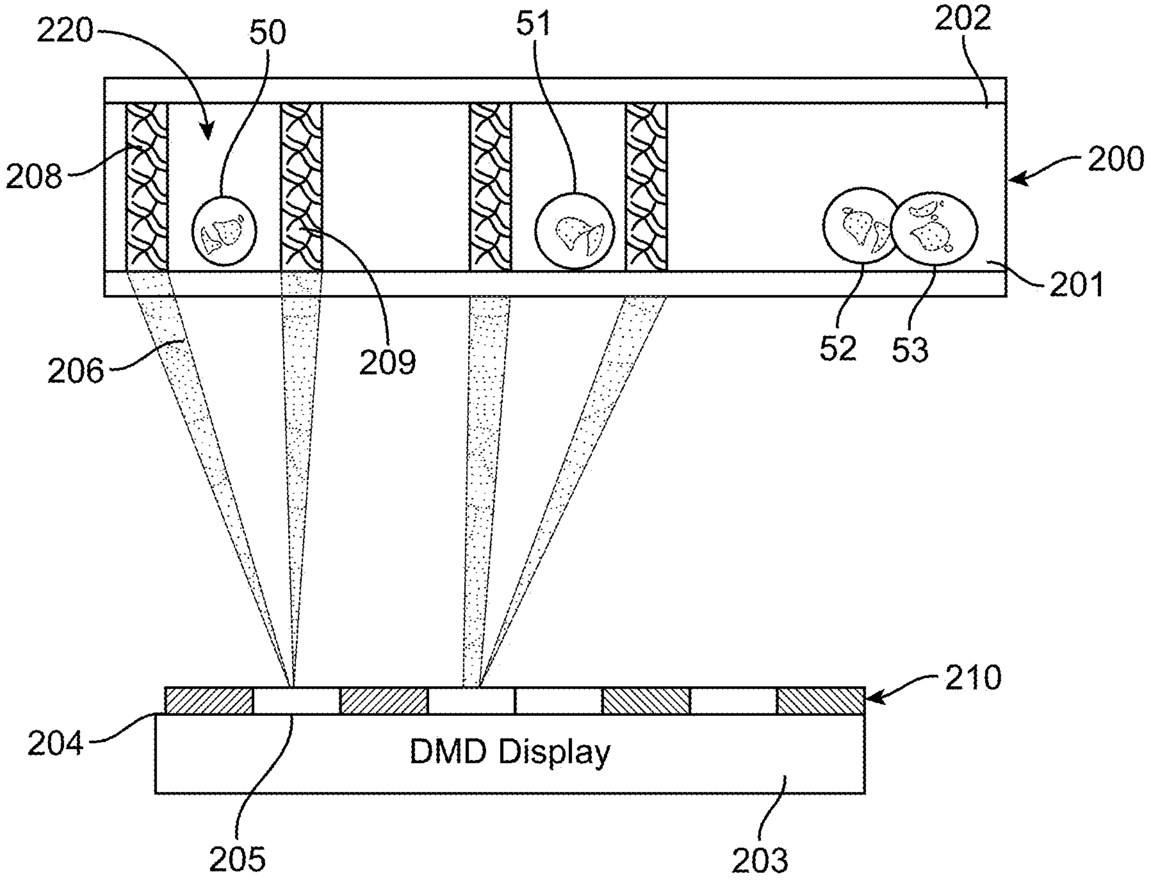
FIG. 14A shows a portion of a system as provided herein including an energy source, according to some embodiments.
Figure 14B:
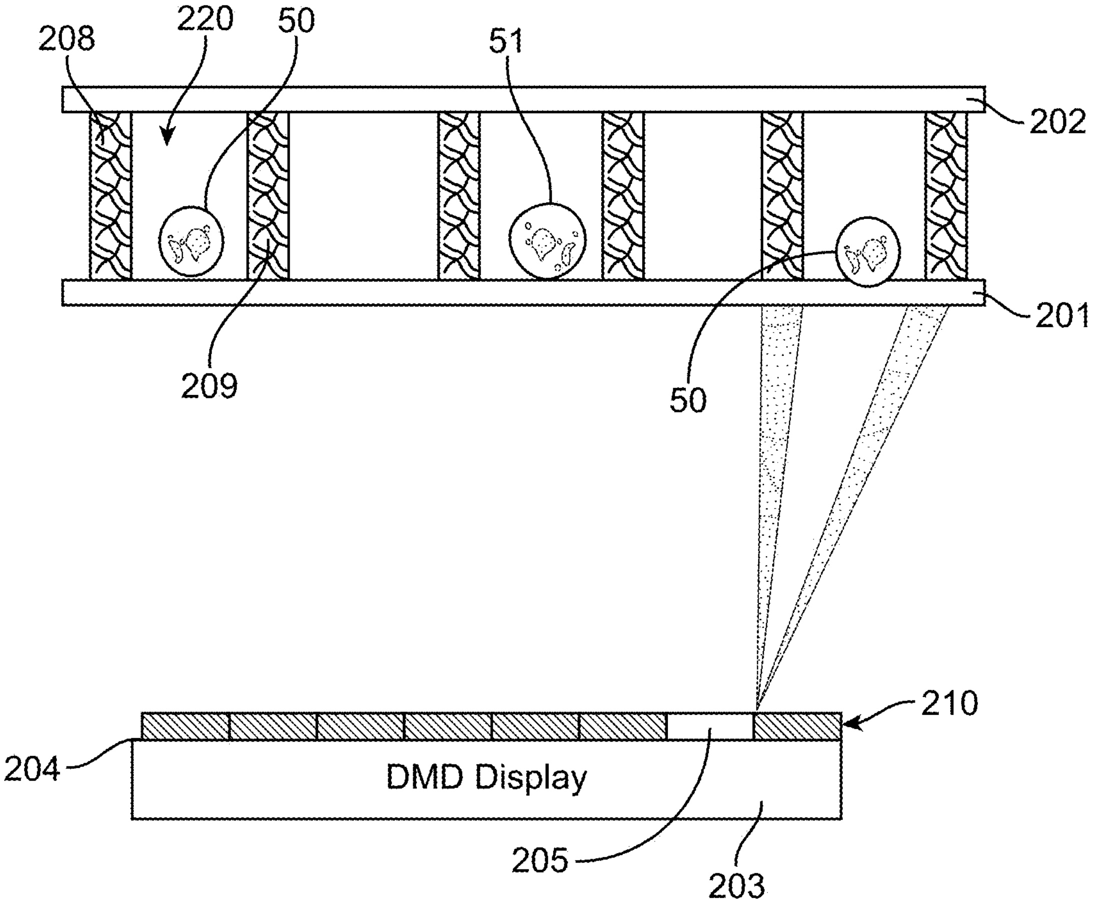
FIG. 14B shows a polymer matrix being formed around a biological component in a portion of a system as provided herein, according to some embodiments.
Figure 14C:
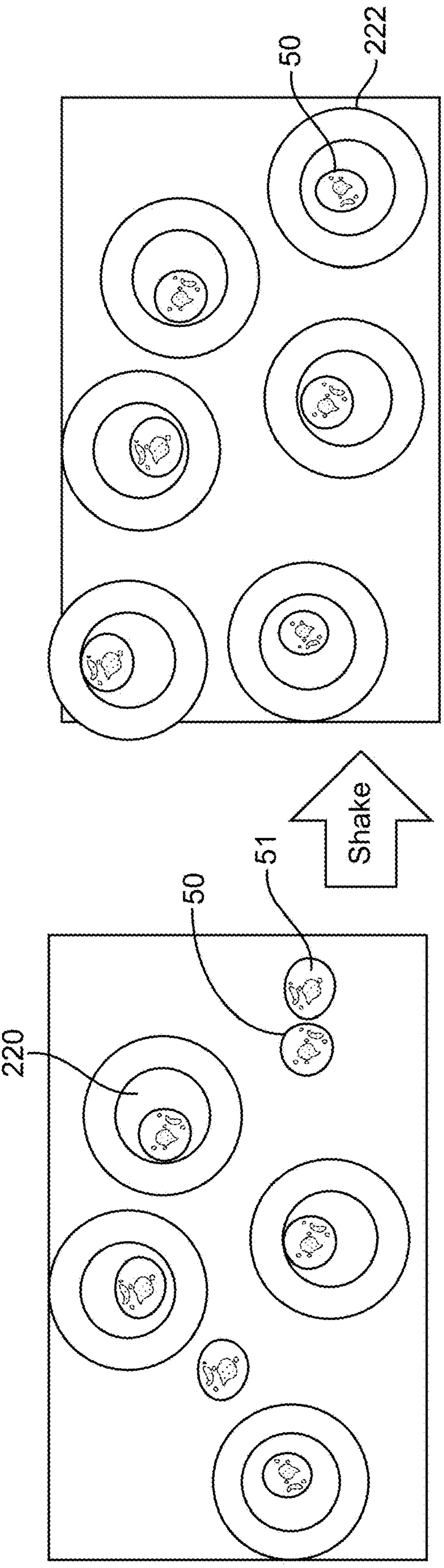
FIG. 14C shows a method of forming a polymer matrix around a biological component in a system as provided herein, according to some embodiments.
Figure 15:
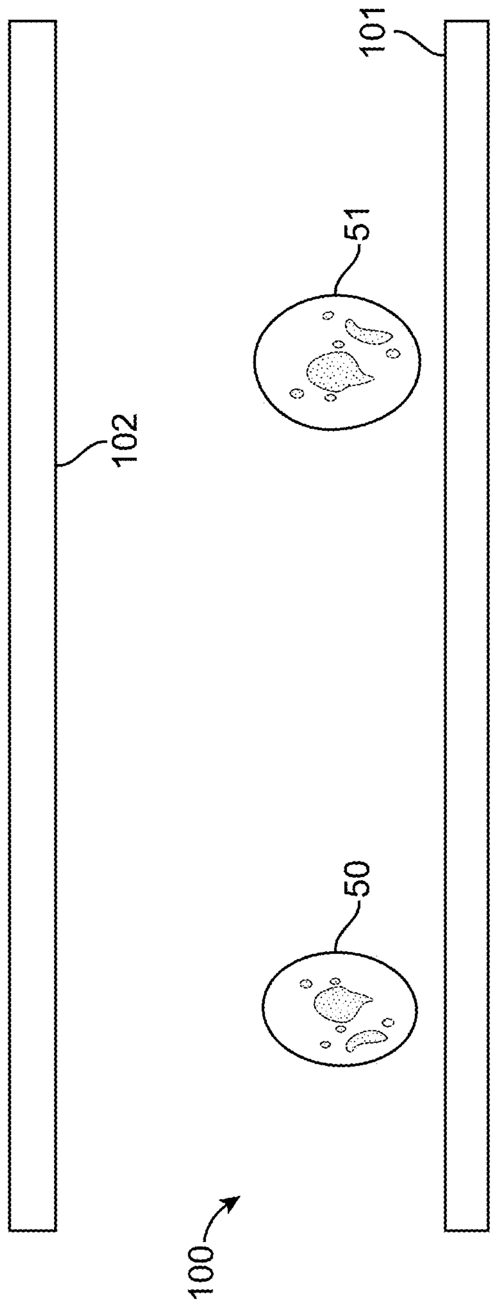
FIG. 15 shows a schematic illustration of a portion of a channel disposed in a fluidic device, according to some embodiments.

FIG. 14A shows a portion of a system as provided herein including an energy source. FIG. 14B shows a polymer matrix being formed around a biological component in a portion of a system as provided herein. FIG. 14C shows a method of forming a polymer matrix around a biological component in a system as provided herein. FIG. 15 shows a schematic illustration of a portion of a channel disposed in a fluidic device.

A channel or chamber of a fluidic device may receive or be configured to receive a biological sample. FIG. 15 shows a schematic illustration of a portion of a channel 100 that may be disposed in at least a portion of a fluidic device of a system as provided herein. The fluidic device may comprise a channel 100. The channel 100 may comprise a first surface 101. Further, the channel 100 may comprise a second surface 102. In some embodiments, the first surface 101 and the second surface 102 are disposed, placed, or positioned opposite of one another (e.g., as depicted in FIG. 15). In some embodiments, the first surface 101 may be a lower surface. In certain embodiments, the second surface 102 may be an upper surface. The terms “lower” and “upper” are not intended to be limiting and are used herein for convenience when referring to the Figures. The channel 100 may receive a biological sample comprising one or more biological components 50, 51. The channel 100 may receive one or more polymer precursors. As illustrated in FIG. 15, the biological components 50, 51 may include cells. However, as discussed herein, the biological components may include tissues, proteins, nucleic acids, etc. In some embodiments, the first surface 101, the second surface 102, or both surfaces may couple or receive, or be configured to couple or receive, at least one of the one or more biological components 50, 51. In some cases, the first surface 101 may couple or receive, or be configured to couple or receive, a biological component (e.g., biological components 50, 51). In certain cases, the second surface 102 may couple or receive, or be configured to couple or receive, a biological component (e.g., biological components 50, 51).

In certain cases, a channel may have a rectangular, circular, semi-circular, oval cross-section, or other suitably shaped cross-section. Accordingly, the channel may have a single, internal surface. In some cases, a channel may have a triangular, square, rectangular, polygonal, or other cross-section. Accordingly, the channel may have three or more internal surfaces. One or more of the internal surfaces may be couple or receive, or be configured to couple or receive, the one or more biological components.

In some cases, the first surface 101, the second surface 102, or both surfaces 101, 102 may be functionalized, for example, with a coating (e.g., a surface coating). In some embodiments, the surface coating may be a surface polymer. Some non-limiting examples of surface coatings may include a capture reagent (e.g., pyridinecarboxaldehyde (PCA)), a functional group to capture one or more moieties (e.g., a chemical moiety), an acrylamide, an agarose, a biotin, a streptavidin, a strep-tag II, a linker, a functional group comprising an aldehyde, a phosphate, a silicate, an ester, an acid, an amide, an alkyne, an azide, an aldehyde dithiolane, or a combination thereof. In various embodiments, the surface coating may include a functional group to capture one or more moieties. For example, the acrylamide, the agarose, etc. may include such a functional group. In certain embodiments, the surface polymer may comprise polyethylene glycol (PEG), a thiol, an alkene, an alkyne, an azide, or combinations thereof. In various embodiments, the surface polymer may comprise a silane polymer. In some embodiments, the surface polymer may be functionalized with at least one of an oligonucleotide, an antibody, a cytokine, a chemokine, a protein, an antibody derivative, an antibody fragment, a carbohydrate, a toxin, or an aptamer.

In some cases, the first surface 101, the second surface 102, or both surfaces 101, 102 may comprise one or more barcodes (e.g., nucleic acid barcodes). In some embodiments, the first surface 101, the second surface 102, or both surfaces 101, 102 may comprise 1, 2, 3, 4, 5, 6, 7, 8, 9, 10, 15, 20, 30, 40, 50, 100, 200, 300, 400, 500, 600, 700, 1,000, 10,000, 50,000, 100,000, 250,000, 500,000, 1,000,000, 2,000,000, 5,000,000, 10,000,000, 15,000,000 barcodes, or any number of barcodes between any of the two numbers mentioned herein. The barcodes may cover an area of about 500 $nm^2$ to about 500 $nm^2$. In some embodiments, the first surface 101, the second surface 102, or both surfaces 101, 102 may comprise at most about 10,000,000 total number of barcodes. The barcodes may be different from one another (e.g., each barcode may be unique). In certain embodiments, a first portion or subset of the barcodes may be different from a second portion or subset of the barcodes. There may be 2, 3, 4, 5, 10, 15, 20, 25, 50, 75, 100, 1,000, 10,000 portions or subsets of the barcodes, or any number of portions or subsets of the barcodes between any of the two numbers mentioned herein. In some cases, a barcode (or a portion/subset of barcodes) may be associated with the location of the barcode on a surface (location coordinates (e.g., x-, y-coordinates) on a surface of a channel). A barcode may be attached to or coupled to the captured biological component. In some embodiments, the barcode may be a unique identifier that distinguishes a biological component from other biological components (e.g., that identifies a first biological component versus a second biological component). In some embodiments, a barcode may comprise a nucleic acid sequence (e.g., common sequence) to capture a biological component, or used in amplification. In some embodiments, a barcode may comprise a unique identifier comprising a unique nucleic acid sequence (e.g., DNA sequence, RNA sequence, etc.), protein tag, antibody, or an aptamer. In some embodiments the barcode may comprise a fluorescent molecule. In some embodiments, a location of the captured biological component may be associated with the unique identifier to, for example, retain spatial information of a biological component.

In some embodiments, the fluidic device may be a flow cell. For example, the fluidic device may be used for sequencing (e.g., DNA or RNA sequencing). In some embodiments, the fluidic device may be a microfluidic device. In certain embodiments, the fluidic device may be a nanofluidic device.

The system disclosed herein may comprise one or more energy sources. The energy source may be in communication with the fluidic device. In some cases, the energy source can be used to form one or more polymer matrices in the fluidic device (e.g., on or adjacent to a surface of a channel or chamber of the fluidic device). In some embodiments, the energy source may comprise a light generating device, a heat generating device, an electrochemical reaction generating device, an electrode, or a microwave device. A polymer matrix may be formed in a channel of the fluidic device. The energy source may direct or transfer energy to a predetermined position in the fluidic device. The energy may cause or activate the one or more polymer precursors to form a polymer matrix (e.g., to polymerize) in the predetermined position.

In some embodiments, the polymer matrix may comprise a hydrogel. In some embodiments, the hydrogel may be porous enough, or have pores of a suitable size, to allow movement or transfer of a reagent (e.g., an enzyme, a chemical compound, a small molecule, an antibody, etc.) through the polymer matrix, while the hydrogel may not allow movement or transfer of the biological component (e.g., DNA, RNA, a protein, a cell, etc.) through the polymer matrix. In some embodiments, the pores may have a diameter from 5 nm to 100 nm. In some embodiments, the pores may have a diameter from 5 nm to 10 nm, 10 nm to 20 nm, 20 nm to 30 nm, 30 nm to 40 nm, 50 nm to 60 nm, 60 nm to 70 nm, 70 nm to 80 nm, 80 nm to 90 nm, 90 nm to 100 nm. In some embodiments, the pores may have a diameter larger than 100 nm. In some embodiments, the pores may have a diameter smaller than 5 nm. The reagent may comprise an enzyme or a primer having a size of less than 50 base pairs (bp). A primer may comprise a single-stranded DNA (ssDNA). In some embodiments, a primer may have a size from 5 bp to 50 bp. In some embodiments, a primer may have a size from 5 bp to 10 bp, 10 bp to 20 bp, from 20 bp to 30 bp, 30 bp to 40 bp, or 40 bp to 50 bp. In some embodiments, a primer may have a size of more than 50 bp. In certain cases, a primer may have a size of less than 5 bp.

A reagent may comprise a lysozyme, a proteinase K, hexamers (e.g., random hexamers), a polymerase, a transposase, a ligase, a catalyzing enzyme, a deoxyribonuclease, a deoxyribonuclease inhibitor, a ribonuclease, a ribonuclease inhibitor, DNA oligos, deoxynucleotide triphosphates, buffers, detergents, salts, divalent cations, or any other suitable reagent.

In some embodiments, the polymer matrix may comprise a hydrogel. In some embodiments, the hydrogel may be porous enough, or have pores of a suitable size, to allow movement or transfer of a reagent (e.g., an enzyme, a chemical compound, a small molecule, an antibody, etc.) through the polymer matrix, while the hydrogel may not allow movement or transfer of the biological component (e.g., DNA, RNA, a protein, a cell, etc.) through the polymer matrix. In some embodiments, the pores may have a diameter from 5 nm to 100 nm. In some embodiments, the pores may have a diameter from 5 nm to 10 nm, 10 nm to 20 nm, 20 nm to 30 nm, 30 nm to 40 nm, 50 nm to 60 nm, 60 nm to 70 nm, 70 nm to 80 nm, 80 nm to 90 nm, 90 nm to 100 nm. In some embodiments, the pores may have a diameter larger than 100 nm. In some embodiments, the pores may have a diameter smaller than 5 nm. The reagent may comprise an enzyme or a primer having a size of less than 50 base pairs (bp). A primer may comprise a single-stranded DNA (ssDNA). In some embodiments, a primer may have a size from 5 bp to 50 bp. In some embodiments, a primer may have a size from 5 bp to 10 bp, 10 bp to 20 bp, from 20 bp to 30 bp, 30 bp to 40 bp, or 40 bp to 50 bp. In some embodiments, a primer may have a size of more than 50 bp. In certain cases, a primer may have a size of less than 5 bp.

A reagent may comprise a lysozyme, a proteinase K, hexamers (e.g., random hexamers), a polymerase, a transposase, a ligase, a catalyzing enzyme, a deoxyribonuclease, a deoxyribonuclease inhibitor, a ribonuclease, a ribonuclease inhibitor, DNA oligos, deoxynucleotide triphosphates, buffers, detergents, salts, divalent cations, or any other suitable reagent.

FIG. 14A shows a portion of a system as provided herein including an energy source 203. The embodiment of FIG. 14A may include components that resemble components of FIG. 15 in some respects. For example, the embodiment of FIG. 14A includes a channel 200 that may resemble the channel 100 of FIG. 15. It will be appreciated that the illustrated embodiments may have analogous features. Accordingly, like features are designated with like reference numerals, with the leading digits incremented to "2." Relevant disclosure set forth above regarding similarly identified features thus may not be repeated hereafter. Moreover, specific features of the system provided herein, and related components shown in FIG. 14A may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the system and related components of FIG. 14A. Any suitable combination of the features, and variations of the same, described with respect to the system and components illustrated in FIG. 15, can be employed with the system and components of FIG. 14A, and vice versa. This pattern of disclosure applies equally to further embodiments depicted in subsequent Figures and described hereafter.

With continued reference to FIG. 14A, the channel 200 of the system may include a first surface 201 and a second surface 202. In some embodiments, the energy source 203 may comprise one or more energy emitting portions (e.g., an energy emitting portion 205). In some embodiments, the energy source 203 may comprise one or more non-emitting portions (e.g., a non-emitting portion 204). The non-emitting portion 204 may not emit, or be configured to emit, energy. In some embodiments, the emitting portion 205 can emit energy in the form of electromagnetic waves (e.g., microwaves, light, heat, etc.) to at least a portion of the fluidic device. In certain embodiments, the emitting portion 205 can emit energy to the fluidic device. In some embodiments, the fluidic channel may be coupled to or be disposed on a movable stage. In other embodiments, light may be projected to or onto at least a portion of the fluidic channel to generate one or more polymer matrices. The light may be directed to various parts of the fluidic channel. In some embodiments, the emitting portion 205 may be coupled to an objective (e.g., a microscope objective or lens), where the objective may be moved to different portions of the fluidic device. The objective may provide a shape (e.g., virtual or physical mask) to allow light to form a pattern on the fluidic device, in order to form a polymer matrix similar or complementary to the pattern. In various embodiments, the one or more polymer precursors in the fluidic device or mixed with the biological sample can absorb emitted energy 206. In some embodiments, the emitted energy 206 can form, or be sufficient to form, a polymer matrix from the one or more polymer precursors. For example, a portion of the one or more polymer precursors within the channel 200 of the fluidic device may be activated by the emitted energy and a polymerization reaction may be initiated to form a polymer matrix.

In some embodiments, the energy source may emit energy to a larger portion of the fluidic channel or almost the entire surface of the fluidic channel. A physical mask may be used to block the energy emitted to one or more portions of the fluidic channel. The energy source (e.g., light source) may be coupled to the fluidic device via an objective (e.g., a microscope objective or lens). The energy source may be directed to a portion of the fluidic channel (e.g., via a movable objective). In some cases, the light source, the objective, and/or the fluidic channel are movable to allow emission of energy to the fluidic channel so as to generate a pattern on at least a portion of a surface of the fluidic device. The polymer matrix may be formed similarly or complementary to the pattern of energy emission.

A polymer precursor may comprise an activating molecule that can absorb the emitted energy 206 to initiate polymerization of the one or more polymer precursors in the fluidic device. Non-limiting examples of the activating molecule may include a photocatalyst, a photoactivator, a photoacid generator, or a photobase generator. In some embodiments, a first polymer matrix 208 and/or a second polymer matrix 209 can be formed on or adjacent to a biological component 50. In certain embodiments, the first polymer matrix 208 and the second polymer matrix 209 can form an analysis chamber or compartment 220 that separates (e.g., physically separates) the biological component 50 from other biological components (e.g., biological components 51, 52, or 53) in the fluidic device. Stated another way, the polymer matrix may compartmentalize the channel (e.g., channel 200). In various embodiments, the polymer matrix may partially surround a biological component. For example, a polymer structure surrounding a biological component may form a closed structure (e.g., a hollow cylinder-shaped polymeric structure) or a partially open structure (e.g., a crescent-shaped polymeric structure). In some embodiments, two or more polymer matrices may be formed adjacent to a biological component forming a compartment separating the biological component from other biological components. In certain embodiments, the polymer matrix may comprise or form a wall (e.g., a polymer matrix wall).

In various embodiments, the polymer matrix comprises a hydrogel. In some embodiments, the polymer matrix wall may be a hydrogel wall. In some embodiments, a hydrogel or hydrogel wall may comprise polyethylene glycol (PEG)-thiol, PEG-acrylate, acrylamide, N,N'-bis(acryloyl)cystamine (BAC), PEG, polypropylene oxide (PPO), polyacrylic acid, poly(hydroxyethyl methacrylate) (PHEMA), poly(methyl methacrylate) (PMMA), poly(N-isopropylacrylamide) (PNIPAAm), poly(lactic acid) (PLA), poly(lactic-co-glycolic acid) (PLGA), polycaprolactone (PCL), poly(vinylsulfonic acid) (PVSA), poly(L-aspartic acid), poly(L-glutamic acid), polylysine, agar, agarose, alginate, heparin, alginate sulfate, dextran sulfate, dextran-acrylamide, hyaluronan, pectin, carrageenan, gelatin, chitosan, cellulose, collagen, bisacrylamide, diacrylate, diallylamine, triallylamine, divinyl sulfone, diethylene glycol diallyl ether, ethylene glycol diacrylate, polymethyleneglycol diacrylate, poly(ethyleneglycol) diacrylate, trimethylopropoane trimethacrylate, ethoxylated trimethylol triacrylate, ethoxylated pentaerythritol tetraacrylate, or combinations or mixtures thereof. A hydrogel or hydrogel wall may comprise a degradable cross-linker (e.g., N,N'-Bis(acryloyl) cystamine, chitosan, poly(ε-caprolactone) diacrylate, polylactide diacrylate, polylactide dimethacrylate, poly(lactide-co-glycolide, polycaprolactone molecules, or other suitable degradable cross-linkers).

In some embodiments, the surface of the polymer matrix or hydrogel may be functionalized by coupling a functional group to the polymer matrix or hydrogel. Some non-limiting examples of functional group may include a capture reagent (e.g., pyridinecarboxaldehyde (PCA)), an acrylamide, an agarose, a biotin, a streptavidin, a strep-tag II, a linker, a functional group comprising an aldehyde, a phosphate, a silicate, an ester, an acid, an amide, an aldehyde dithiolane, PEG, a thiol, an alkene, an alkyne, an azide, or a combination thereof. In some cases, the functionalized polymer matrix may be used to capture biomolecules inside a polymer matrix compartment formed adjacent to (e.g., around or on) the biological component. The biomolecule may be produced by the biological component (e.g., secretome from a cell). The functionalized surface of the polymer matrix inside the compartment may be used to capture reagents or molecules from outside the compartment. The functionalized surface may increase surface area covered by a reagent, a molecular sensor, or any molecule of interest (e.g., an antibody).

In some embodiments, the compartment surrounding a biological component may comprise a polygon base. In various embodiments, the compartment surrounding a biological component may comprise a circular or oval base (see, e.g., the compartment 220 or the compartment 222 in FIG. 14C). In certain embodiments, the polymer matrix wall of the compartment may have a thickness (e.g., a width) from 1 μm to 250 μm. The polymer matrix wall may have a thickness from 1 μm to 250 μm. The polymer matrix wall or compartment may have a thickness from 1 μm to 5 μm, 1 μm to 10 μm, 1 μm to 20 μm, 1 μm to 30 μm, 1 μm to 40 μm, 1 μm to 50 μM, 1 μm to 100 μm, 1 μm to 150 μm, 1 μm to 250 μm, 5 μm to 10 μm, 5 μm to 20 μm, 5 μm to 30 μm, 5 μm to 40 μm, 5 μm to 50 μm, 5 μm to 100 μm, 5 μm to 150 μm, 5 μm to 250 μm, 10 μm to 20 μm, 10 μm to 30 μm, 10 μm to 40 μm, 10 μm to 50 μm, 10 μm to 100 μm, 10 μm to 150 μm, 10 μm to 250 μm, 20 μm to 30 μm, 20 μm to 40 μm, 20 μm to 50 μm, 20 μm to 100 μm, 20 μm to 150 μm, 20 μm to 250 μm, 30 μm to 40 μm, 30 μm to 50 μm, 30 μm to 100 μm, 30 μm to 150 μm, 30 μm to 250 μm, 40 μm to 50 μm, 40 μm to 100 μm, 40 μm to 150 μm, 40 μm to 250 μm, 50 μm to 100 μm, 50 μm to 150 μm, 50 μm to 250 μm, 100 μm to 150 μm, 100 μm to 250 μm, or 150 μm to 250 μm. The polymer matrix wall or compartment may have a thickness of about 1 μm, about 5 μm, about 10 μm, about 20 μm, about 30 μm, about 40 μm, about 50 μm, about 100 μm, about 150 μm, or about 250 μm. The polymer matrix wall or compartment may have a thickness of at least 1 μm, 5 μm, 10 μm, 20 μm, 30 μm, 40 μm, 50 μm, 100 μm, 150 μm, 250 μm, or more. The polymer matrix wall or compartment may have a thickness of at most 5 μm, 10 μm, 20 μm, 30 μm, 40 μm, 50 μm, 100 μm, 150 μm, or 250 μm. The polymer matrix wall or compartment may have a thickness of less than 1 μm.

With continued reference to FIG. 14A, the polymer matrix 208, 209, or at least a portion of the polymer matrix 208, 209, may be coupled to the first surface 201, the second surface 202, or both surfaces 201, 202. In certain embodiments, the polymer matrix, or at least a portion of the polymer matrix, may be coupled to a third surface, a fourth surface, a fifth surface, etc. as appropriate. In various embodiments, the polymer matrix 208, 209 may extend from the first surface 201 to the second surface 202 (e.g., through at least a portion of a lumen of the channel 200 or a cavity of a chamber) such that the polymer matrix surrounds, or substantially surrounds, the biological component 50. In some embodiments, two or more biological components (e.g., biological components 50, 51 of FIG. 14C) that are in close physical proximity may be separated (e.g., by agitating or shaking the fluidic device). The fluidic device may be agitated or shaken by physical movement, use of a sonic pulse, changing a flow in the channel, or any other suitable method of agitation. A polymer matrix may then be formed that surrounds (or partially surrounds) the biological components that are separated. FIG. 14B shows polymer matrices 208, 209 formed surrounding the biological component 50 after being separated from the biological component 51. FIG. 14C shows a process, according to various embodiments, of separating the two biological components 50, 51, which are in close proximity. That is, by agitating or shaking the fluidic device the biological components 50, 51 can be separated. In some embodiments, separation of the biological components is achieved through fluidic pressure, flow pulsation, dielectrophoresis, optothermal flow, or some combination thereof. In some cases, separation of the biological components is achieved through acoustic vibration. FIG. 14C also shows a polymer matrix being formed to generate a compartment 222 surrounding the biological component 50 after the separation of the biological components 50, 51.

With continued reference to FIG. 14A, in some cases, the energy source 203 can, or be configured to, form or produce one or more emitting portions 205 and one or more non-emitting portions 204. The systems disclosed herein may further include a spatial energy modulating element to direct energy from the energy source to one or more targeted portions of the fluidic device. For example, the spatial energy modulating element may be configured to selectively direct the energy from the energy source to form a polymer matrix on at least a portion of or adjacent to a biological component. The spatial energy modulating element may be configured to selectively direct the energy by, for example, inhibiting or preventing energy from being directed to one or more portions other than the one or more targeted portions of the fluidic device. In some embodiments, the spatial energy modulating element may comprise a physical mask. In some cases, the spatial energy modulating element may comprise a virtual mask. In certain cases, the spatial energy modulating element may be configured to control one or more electrodes that can selectively provide energy to the one or more targeted portions of the fluidic device. The electrode concept may also be used to provide spatially modulated energy to form the hydrogel structure. In some implementations, one or more electrodes can be arranged at predetermined locations in the fluidic channel, thus allowing formation of the hydrogel in those locations. In alternative implementations, the electrodes can be in the form of an array. The elements of the array can be turned on or off on demand to create the desired spatial pattern of energy to form the desired shape of the hydrogels. For example, one or more electrodes (e.g., an array of electrodes) may be disposed within one or more portions of the fluidic device. For another example, one or more electrodes (e.g., an array of electrodes) may be in communication (e.g., electrical communication) with one or more portions of the fluidic device.

In some embodiments, a mask may prevent, or be configured to prevent, one or more portions of the energy emitting surface 210 of the energy source 203 from emitting energy (e.g., non-emitting portions 204). In some embodiments, the mask may be a virtual mask (e.g., a computer code or a digital system). In certain embodiments, the mask can prevent the energy from being emitted to a location where a biological component is present. This may allow or permit forming a polymer matrix adjacent to, on, or encapsulating the biological component (e.g., to retain a cell, proteins, DNA molecules, RNA molecules, or other target molecules at a location on the fluidic channel). In other embodiments, the mask may facilitate the polymerization such that the polymer matrix is on the biological component. In various embodiments, the mask may be a physical mask (e.g., an opaque material, a thermal shield, or an electromagnetic shield). In some embodiments, the mask (e.g., a virtual mask or a physical mask) can be generated using, or in combination with, a detector that detects or identifies a location of a biological component. In some embodiments, the detector comprises a camera. In some embodiments, the detector comprises a light detector, conductivity detector, an ultrasound detector, an ultrasonic sensor, a piezoelectric sensor, a combination thereof, or another suitable detecting device.

In some embodiments, the first surface 201 or the second surface 202 may comprise a detector that detects, or is configured to detect, one or more locations of one or more biological components in the fluidic device (e.g., in the channel 200). In certain embodiments, the energy source 203 can comprise, be coupled to, or be in communication with a detector that detects, or is configured to detect, a location of a biological component in the fluidic device. In various embodiments, a mask may be generated using an image obtained from at least a portion of the fluidic device. The mask may allow or permit the energy source 203 to emit energy in or toward one or more locations or positions where one or more biological components are present on or adjacent the first surface 201. The mask may inhibit or prevent the energy source 203 from emitting energy in or toward one or more locations or positions where one or more biological components are present on or adjacent to the first surface 201. In some embodiments, the image may be obtained from a camera (e.g., a digital camera, fluorescent imaging camera, etc.). In some embodiments, the camera may be coupled to, connected to, or in communication with the energy source 203. For example, the camera (not shown) may be in electrical communication with the energy source 203. In some embodiments, the energy source 203 may comprise the camera. In various embodiments, the energy source 203 may comprise a microscope (e.g., a fluorescence microscope, a confocal microscope, lens-free imaging system, a transmission electron microscopy (TEM), a scanning electron microscope (SEM), etc.). The microscope may be used to detect one or more positions of one or more biological components (e.g., in combination with the detector).

The present disclosure provides a polymer precursor. In some embodiments, the polymer precursor comprises an oligomeric domain. In some embodiments, the oligomeric domain comprises three or more arms. In some embodiments, each arm of the oligomeric domain comprises a degradable functional group and a crosslinkable functional group. In some embodiments, the crosslinkable functional group of an arm of the three or more arms is configured to crosslink with another crosslinkable functional group of another polymer precursor in response to a first stimulus, thereby obtaining a polymerized form of the polymer precursor. In some embodiments, the degradable functional group is configured to be cleaved in response to a second stimulus, thereby solubilizing the polymerized form of the polymer precursor. In some cases, the degradable functional group is configured to be cleaved in response to a second stimulus, thereby solubilizing the polymerized form of the monomer. In some cases, the oligomeric domain comprises four or more arms. In some cases, the polymer precursor comprises a monomer selected from structures (I), (II), (IV)-(VI), (XII), (XIII), (XIV)-(XVIII), (XX), and combinations thereof.

It was surprisingly discovered that including a degradable functional group and a crosslinkable functional group on each arm of a polymer precursor can improve its suitability for cell encapsulation methods. Such methods impose numerous requirements, including fast spatially and temporally controllable polymerization; fast spatially and temporally controllable degradation; controllable porosity; biocompatibility; and sufficient rigidity to withstand the mechanical stress of cell adherence. In some cases, each arm comprises an instance of the degradable functional group and an instance of the crosslinkable functional group. In some cases, each arm comprises an instance of the oligomeric domain. In some cases, each arm comprises a polyethylene glycol unit. In some cases, each polyethylene glycol unit contains between about 1 to 500, about 1 to 200, about 1 to 100, about 1 to 50, or about 20 to 50 glycol units. Accordingly, each arm may comprise a molecular weight of about 250 to 500 Daltons, about 250 to 1000 Daltons, about 250 to 2500 Daltons, about 250 to 5000 Daltons, about 250 to 10000 Daltons, about 250 to 15000 Daltons, about 250 to 25000 Daltons, about 500 to 1000 Daltons, about 500 to 2500 Daltons, about 500 to 5000 Daltons, about 500 to 10000 Daltons, about 500 to 15000 Daltons, about 500 to 25000 Daltons, about 1000 to 2500 Daltons, about 1000 to 5000 Daltons, about 1000 to 10000 Daltons, about 1000 to 15000 Daltons, about 1000 to 25000 Daltons, about 2500 to 5000 Daltons, about 2500 to 10000 Daltons, about 2500 to 15000 Daltons, about 2500 to 25000 Daltons, about 5000 to 10000 Daltons, about 5000 to 15000 Daltons, about 5000 to 25000 Daltons, about 10000 to 15000 Daltons, about 10000 to 25000 Daltons, or about 15000 to 25000 Daltons. In specific cases, each arm comprises a molecular weight of about 500 to 2500 or 500 to 5000 Daltons. Similarly, the polymer precursor may comprise a molecular weight of about 1000 to 2000 Daltons, about 1000 to 10000 Daltons, about 1000 to 20000 Daltons, about 1000 to 40000 Daltons, about 1000 to 60000 Daltons, about 1000 to 100000 Daltons, about 2000 to 4000 Daltons, about 2000 to 10000 Daltons, about 2000 to 20000 Daltons, about 2000 to 40000 Daltons, about 2000 to 60000 Daltons, about 2000 to 100000 Daltons, about 10000 to 20000 Daltons, about 10000 to 40000 Daltons, about 10000 to 60000 Daltons, about 10000 to 100000 Daltons, about 20000 to 40000 Daltons, about 20000 to 60000 Daltons, about 20000 to 100000 Daltons, about 40000 to 10000 Daltons, or about 60000 to 100000 Daltons. In specific cases, the polymer precursor comprises a molecular weight of about 2000 to 10000 or about 2000 to 20000 Daltons. In particular cases, each arm may be identical. Examples of such structures include structures (I), (II), (IV)-(VI), (XII), (XIII), (XIV)-(XVIII), (XX), and the generalized chemical structure presented in FIG. 16.

In many cases, the polymer precursor is the only polymerizable species in a hydrogel formulation. More broadly, in some cases, at least about 50%, at least about 60%, at least about 70%, at least about 80%, at least about 90%, at least about 95%, at least about 98%, or at least about 99% of polymerizable groups (e.g., crosslinkable functional groups such as acrylamide, acrylate, and the like) in a formulation are comprised by a type of polymer precursor structure (e.g., any one of structures (I)-(XX)) with respect to all of the polymerizable groups from one or more types of polymer precursor structures present in the formulation.

In some cases, the degradable functional group comprises disulfide, beta-thioether ester, amidomethylol and vicinal diol, vicinal diol, alginate backbone, dextran backbone, chitosan backbone, hyaluronic acid backbone, chondroitin sulfate backbone, or carboxy methyl cellulose backbone, or a combination thereof.

In some cases, the degradable functional group comprises a disulfide. Following polymer matrix synthesis, the polymer matrix can be cleaved with a thiol such as glutathione or betamercaptoethanol, a disulfide or such as glutathione disulfide, or a reducing agent such as TCEP or dithiothreitol. Such systems offer the advantage of being cleavable under mild, biologically compatible conditions while simultaneously being stable absent a disulfide-degradant.

In some cases, the degradable functional group comprises a vicinal diol. Vicinal diols offer the advantage of enhanced stability relative to hydrolysable and reductively cleavable functional groups, allowing their use in harsh conditions and with cells that are active in polymer cleavage. Many cells secrete reactive species that are capable of degrading reactive functional groups. For example, some neutrophils and macrophages extracellularly generate the oxidant superoxide, while many adherent cells secrete free thiols and regulate extracellular thiol and disulfide concentrations to mediate intercellular signaling. Reactive degradable functional groups such as disulfides and saccharides can thus be unstable in the presence of certain cell types, and can exhibit non-negligible background degradation rates in the presence of these cells. Vicinal diol degradable functional groups address this issue by, in general, being unreactive towards enzymes and molecules secreted by cells. At the same time, vicinal diols are readily cleavable with mild, biocompatible oxidizing agents such as periodate, permanganate, and peroxide in the presence of manganese catalysts. Polymer matrices formed from vicinal diol-containing monomers can thus be rapidly formed and degraded, for example as disclosed in Examples 9 and 10.

Examples of porogens consistent with the present disclosure include particles (e.g., polymeric, ceramic, metal, metal oxide, or hydrogel particles), polymers such as polyethylene glycol and alginate, and vesicles such as liposomes or micelles. In some embodiments, the porogen comprises poly(ethylene glycol). The size, concentration, and type of porogen(s) included in a polymer precursor may be selected based on a desired polymer matrix porosity.

Figure 16:
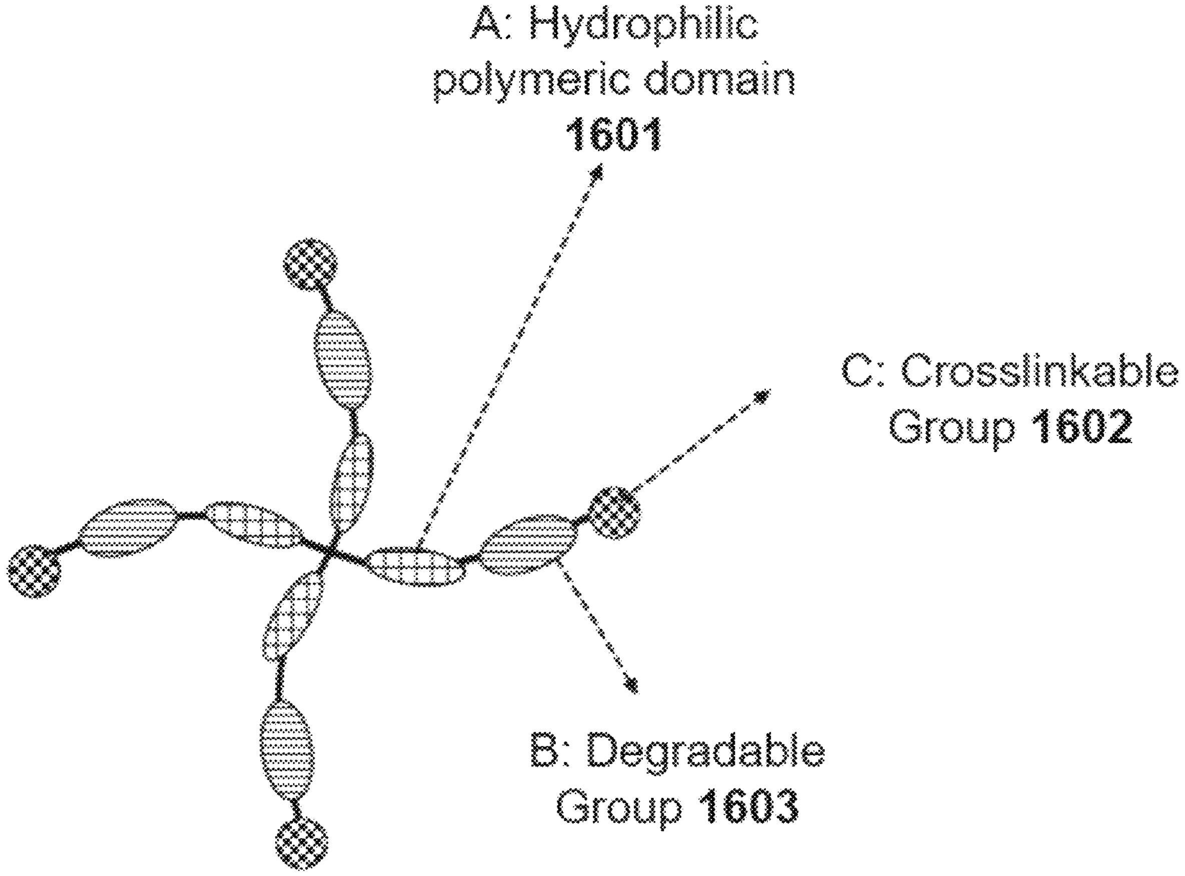
FIG. 16 shows a schematic illustration of an exemplary macromonomer, according to some embodiments.

FIG. 16 shows a schematic illustration of an exemplary macromonomer. In some embodiments, the macromonomer comprises a hydrophilic domain 1601, a crosslinkable functional group 1602, a degradable functional group 1603, or a combination thereof. In some cases, the hydrophilic domain comprises an oligomer such as polyethylene glycol.

In some embodiments, the oligomeric domain comprises four or more arms. In some embodiments, the oligomeric domain is hydrophilic. In some embodiments, the oligomeric domain comprises poly(ethylene glycol), poly(N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), Poly(2-vinyl-1-methylpyridinium bromide), poly(N,N-diethylacrylamide), poly(N,N-dimethylacrylamide), poly(2-hydroxyethyl acrylate), poly(2-hydroxy methacrylate-co-methacrylic acid), poly(propylene oxide), poly(2-(dimethylamino)ethyl methacrylate), or poly (N-(2-hydroxypropyl)methacrylamide), or a combination thereof. In some embodiments, the oligomeric domain comprises poly(ethylene glycol). In some embodiments, the oligomeric domain comprises poly(N-vinylpyrrolidone). In some embodiments, the oligomeric domain comprises poly (acrylic acid). In some embodiments, the oligomeric domain comprises poly(methacrylic acid). In some embodiments, the oligomeric domain comprises poly(vinyl alcohol). In some embodiments, the oligomeric domain comprises poly (L-lysine). In some embodiments, the oligomeric domain comprises poly(2-ethyl-2-oxazoline). In some embodiments, the oligomeric domain comprises poly(maleic acid).

In some embodiments, the oligomeric domain comprises poly(vinyl phosphoric acid). In some embodiments, the oligomeric domain comprises poly(acrylamide). In some embodiments, the oligomeric domain comprises poly(vinylamine). In some embodiments, the oligomeric domain comprises poly(ethylene oxide-co-propylene oxide). In some embodiments, the oligomeric domain comprises 1 to 500 monomer units (e.g., $PEG_{500}$)

In some embodiments, the oligomeric domain comprises poly(N-isopropylacrylamide). In some embodiments, the oligomeric domain comprises poly(vinyl phosphonic acid). In some embodiments, the oligomeric domain comprises Poly(2-vinyl-1-methylpyridinium bromide). In some embodiments, the oligomeric domain comprises poly(N,N-diethylacrylamide). In some embodiments, oligomeric domain comprises poly(N,N-dimethylacrylamide). In some embodiments, the oligomeric domain comprises poly(2-hydroxyethyl acrylate). In some embodiments, the oligomeric domain comprises poly(2-hydroxy methacrylate-co-methacrylic acid). In some embodiments, the oligomeric domain comprises poly(propylene oxide). In some embodiments, the oligomeric domain comprises poly(2-(dimethylamino)ethyl methacrylate). In some embodiments, the oligomeric domain comprises poly(N-(2-hydroxypropyl) methacrylamide).

In some embodiments, the degradable functional group comprises disulfide, beta-thioether ester, amidomethylol, vicinal diol, peptide, polysaccharides (e.g. alginate, dextran, chitosan, chondroitin), oligosaccharide, ortho-nitrobenzyl, coumarin, acetal, ketal, ester, ortho ester, anhydride, imine, hydrazone, carbonate, azo, carbamate, phosphate, cinnamoyl, or benzoin ether, or a combination thereof. In some embodiments, the degradable functional group comprises disulfide, beta-thioether ester, amidomethylol, vicinal diol, peptide, polysaccharides (e.g. alginate, dextran, chitosan, chondroitin), ortho-nitrobenzyl, coumarin, acetal, ketal, ester, ortho ester, anhydride, imine, hydrazone, carbonate, phosphate, cinnamoyl, or benzoin ether, or a combination thereof. In some embodiments, the degradable functional group comprises disulfide. In some embodiments, the degradable functional group comprises beta-thioether ester. In some embodiments, the degradable functional group comprises amidomethylol. In some embodiments, the degradable functional group comprises vicinal diol. In some embodiments, the degradable functional group comprises a peptide. In some embodiments, the degradable functional group comprises one or more polysaccharides.

In some embodiments, the one or more polysaccharides comprise alginate. In some embodiments, the one or more polysaccharides comprise dextran. In some embodiments, the one or more polysaccharides comprise chitosan. In some embodiments, the one or more polysaccharides comprise chondroitin. In some embodiments, the degradable functional group comprises ortho-nitrobenzyl. In some embodiments, the degradable functional group comprises coumarin. In some embodiments, the degradable functional group comprises acetal. In some embodiments, the degradable functional group comprises ketal. In some embodiments, the degradable functional group comprises ester. In some embodiments, the degradable functional group comprises ortho ester. In some embodiments, the degradable functional group comprises anhydride. In some embodiments, the degradable functional group comprises imine. In some embodiments, the degradable functional group comprises hydrazone.

In some embodiments, the degradable functional group comprises carbonate. In some embodiments, the degradable functional group comprises phosphate. In some embodiments, the degradable functional group comprises cinnamoyl. In some embodiments, the degradable functional group comprises benzoin ether. In some embodiments, the degradable functional group comprises carbamate. In some embodiments, the degradable functional group comprises azo. In some embodiments, the degradable functional group comprises an oligosaccharide. In some embodiments, the oligosaccharide comprises 2, 3, or 4 monomeric units (e.g., 2, 3, or 4 hexoses, pentoses, heptoses, a combination thereof, etc.). In some embodiments, the oligosaccharide is a disaccharide. Non-limiting examples of disaccharides suitable for use as cleavable functional groups include trehalose (which can be cleaved by the enzyme trehalase), maltose (which can be cleaved by the enzyme maltase), sucrose (which can be cleaved by the enzyme sucrase), β-D-mannuronate (which can be cleaved by the enzume alginase), or α-L-guluronate (which can be cleaved by the enzyme alginase). In some cases, each arm of the macromonomer includes a PEG group, a triazole, a disaccharide, and a crosslinkable functional group. In particular cases, each arm of the macromonomer includes, in order (with optional intervening groups), a PEG group, a triazole, a disaccharide, and a crosslinkable functional group. For example, each arm of the macromonomer may include, in order (with optional intervening groups), a PEG group, a triazole, a disaccharide, and an acrylate. Alternatively, each arm of the macromonomer may include, in order (with optional intervening groups), a PEG group, a triazole, a disaccharide, and an acrylamide.

As disclosed herein, oligosaccharide degradable functional groups confer numerous advantageous properties to polymer precursors and polymer matrices formed therefrom. Many oligosaccharides are targeted with high degrees of specificity by one or more enzymes. In the absence of such enzymes, oligosaccharides may be stable in a broad range of biocompatible conditions, including acidic tumor microenvironments and alkaline wash solutions. Additionally, as many oligosaccharide-targeted enzymes have high specificities for a single oligosaccharide or for small classes of oligosaccharides, polymer matrices with oligosaccharide degradable functional groups may be targeted with high specificity and degraded and crosslinked in highly controlled manners. In many cases, a lyase, monooxygenase, hydrolase, or other enzyme targeted to an oligosaccharide degradable functional group may be inactive towards other portions of a hydrogel matrix and towards other species present in a complex biological system, allowing polymer matrices to be degraded without affecting other constituents in the biological system. Accordingly, oligosaccharide degradable functional groups can afford biocompatible polymer matrix cleavage conditions in which cells remain viable. In particular, enzymatic degradation process, in which oligosaccharide degradable functional groups are cleaved by an enzyme, typically does not negatively impact the viability of cells.

In some embodiments, the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

In some embodiments, the crosslinkable functional group comprises acrylate. In some embodiments, the crosslinkable functional group comprises methacrylate. In some embodiments, the crosslinkable functional group comprises acrylamide. In some embodiments, the crosslinkable functional group comprises methacrylamide. In some embodiments, the crosslinkable functional group comprises norbornyl. In some embodiments, the crosslinkable functional group comprises styrene. In some embodiments, the crosslinkable functional group comprises vinyl ether. In some embodiments, the crosslinkable functional group comprises vinyl pyrrolidone.

In some embodiments, the crosslinkable functional group comprises vinyl ester. In some embodiments, the crosslinkable functional group comprises maleimide. In some embodiments, the crosslinkable functional group comprises allyl. In some embodiments, the crosslinkable functional group comprises alkyne. In some embodiments, the crosslinkable functional group comprises azide. In some embodiments, the crosslinkable functional group comprises thiol. In some embodiments, the crosslinkable functional group comprises alkene. In some embodiments, the crosslinkable functional group comprises epoxide.

In some embodiments, the first stimulus comprises an energy source. In some embodiments, the energy source comprises a light source. In some embodiments, the light source is at a wavelength between 300-500 nm. However, the energy of the light source can be tailored to match the absorbance of a photoinitiator in a polymer precursor formulation. For example, the energy of the light source can range from about 250 to 700 nm, from about 250 to 300 nm, from about 250 to 400 nm, from about 300 to 450 nm, or from about 400 to 700 nm.

In some embodiments, the second stimulus comprises an energy source in a presence of a photoinitiator and an absence of polymer precursor. In some embodiments, the energy source comprises a light source. In some embodiments, the light source is at a wavelength between 300-500 nanometers (nm). In some embodiments, the light source is at a wavelength between 380 nm-420 nm. However, the energy of the light source can be tailored to match the absorbance of a photoinitiator or a photocleavable group in a polymer matrix. For example, the energy of the light source can range from about 250 to 700 nm, from about 250 to 300 nm, from about 250 to 400 nm, from about 300 to 450 nm, or from about 400 to 700 nm.

As used herein, the term "photoinitiator" can denote a species that generates a radical upon photoexcitation. In many cases, a photoinitiator included in a polymer precursor formulation is a type I photoinitiator, that is a molecule that generates radicals through intramolecular cleavage (e.g., homolysis) upon photoexcitation, or a type II photoinitiator, that is a molecule that abstract an electron or hydrogen atom from a co-initiator following photoexcitation. Examples of photoinitiators utilizable in the present methods include acetophenone, anisoin, anthraquinone, anthraquinone-2-sulfonic acid, benzil, benzoin, benzophenone, 3,3',4,4'-benzophenonetetracarboxylic dianhydride, 4-benzoylbiphenyl, 2-benzyl-2-(dimethylamino)-4'-morpholinobutyrophenone, dibenzosuberenone, 2,2-diethoxyacetophenone, 2-ethylanthraquinone, ferrocene, 2-isopropylthioxanthone, lithium phenyl-2,4,6-trimethylbenzoylphosphinate (LAP), methyl-2-benzoylbenzoate, and thiooxanthen-9-one. In some cases, the photoinitiator in a polymer precursor is a type I photoinitiator. In some cases, the photoinitiator in a polymer precursor is water soluble. In many cases, the photoinitiator is biocompatible. In particular cases, the photoinitiator in a polymer precursor is lithium phenyl-2,4,6-trimethylbenzoylphosphinate (LAP).

In some embodiments, the second stimulus comprises introduction of a degradation reagent. In some embodiments, the degradation reagent comprises dithiothreitol (DTT).

In some embodiments, the degradation reagent comprises tris (2-carboxyethyl) phosphine (TCEP). In some embodiments, the degradation reagent comprises 2-mercaptoethanol (BME). In some embodiments, the degradation reagent comprises glutathione reductase (GSH).

In some embodiments, the degradation reagent comprises DMEM. In some embodiments, the degradation reagent comprises RPMI. In some embodiments, the degradation reagent comprises PBS buffer. In some embodiments, the degradation reagent comprises sodium (meta)periodate. In some embodiments, the degradation reagent comprises alginate lyase. In some embodiments, the degradation reagent comprises dextranase. In some embodiments, the degradation reagent comprises lysozyme. In some embodiments, the degradation reagent comprises chitinase. In some embodiments, the degradation reagent comprises hyaluronidase. In some embodiments, the degradation reagent comprises chondroitinase.

In some embodiments, the degradation reagent comprises cellulases.

In some embodiments, the degradation reagent comprises an oxidizing agent. The oxidizing agent may be configured to oxidatively cleave one or more degradable functional groups in a polymer matrix, such as one or more vicinal diols. For example, the oxidizing agent may comprise a periodate such as sodium metaperiodate or sodium orthoperiodate.

In some embodiments, the one or more polymer precursors comprises a porogen, and increasing porogen loading results in an increased pore size of the one or more polymer matrices. In some embodiments, the increasing the porogen concentration increases a rate of diffusion by about 20%. In some embodiments, the increased pore size increases the speed of diffusion of a fluorescently labeled antibody into the one or more polymer matrices. In some embodiments, the fluorescently labeled antibody is CD56 PE. In some embodiments, the one or more polymer precursors are photopolymerized via photocrosslinking by UV light.

In some embodiments, the method comprises the chemical or biological material comprises a first cell in the first interior region and a second cell in the second interior region.

In some embodiments, the method comprises the first cell comprises one of a killer cell, an activation cell, and a suppression cell, and wherein the first cell interacts with the second cell after the degrading in (c).

In some embodiments, the method comprises the chemical or biological material comprises a polymer bead comprising one or more oligonucleotides disposed thereon.

In some embodiments, the method comprises the chemical or biological material includes one or more cells or components thereof. In some embodiments, the method further comprises one or more polymer precursors comprise: (a) a macromonomer, (b) a photoinitiator, and (c) a porogen. In some embodiments, the method further comprises the degrading in (c) is caused by cleavage of one or more disulfide bonds of the first gel structure, the second gel structure, or both.

In some cases, a photocleavable 4-arm-PEG-macromonomer can be degraded into a crosslinked hydrogel network containing disulfides. In further cases, the crosslinked hydrogel network containing disulfides can be degraded into a network of soluble fragments.

In some cases, a photocleavable 4-arm-PEG-macromonomer can be photopolymerized and then degraded into a network of soluble fragments using the reaction scheme illustrated in FIG. 21. For simplicity, in this figure, the crosslinked hydrogel network is depicted as including one disulfide in each chain linking tertiary carbons. In various embodiments, it is worthwhile to note that polymers formed from structure (I) would have two disulfides in each chain that links tertiary carbons. In this figure "PI fragment" denotes "photoinitiator fragment". In FIG. 21, "PI fragment" denotes "photoinitiator fragment".

In some embodiments, disulfide based cPEG cages may be degraded using light and a photoinitiator. In some cases, degradation allows for spatiotemporal control of cPEG cage degradation enabling selective retention of cells with a single hydrogel formulation. As used herein, the terms "chamber" and "cage" can denote polymer matrix structures that enclose an interior space not filled by the polymer matrix. For example, a chamber or a cage may comprise a cylindrical polymer matrix that encloses an interior space not occupied by the polymer matrix, and that optionally extends between opposing surfaces of a fluidic device, such that the interior space is enclosed by the polymer matrix and the opposing surfaces of the fluidic device.

Another aspect of the present disclosure provides a kit, comprising: (a) a porogen; and (b) a polymer precursor described anywhere in this disclosure.

The polymer precursor may comprise a monomer selected from structures (I)-(XX). The polymer precursor may comprise a monomer selected from structures (I)-(XIII).

In some embodiments, the polymer precursor comprises a monomer that includes an oligomeric domain comprising three or more arms, wherein each arm of said oligomeric domain comprises a degradable functional group and a crosslinkable functional group. In some cases, the crosslinkable functional group of an arm of the three or more arms is configured to crosslink with another crosslinkable functional group of another polymer precursor in response to a first stimulus to form a polymerized form of the monomer. In some cases, the degradable functional group is configured to be cleaved in response to a second stimulus, thereby solubilizing the polymerized form of the monomer. In some cases, the oligomeric domain comprises four or more arms. In some cases, the polymer precursor comprises a monomer selected from structures (I), (II), (IV)-(VI), (XII), (XIII), (XIV)-(XVIII), (XX), and combinations thereof.

In some cases, the degradable functional group comprises disulfide, beta-thioether ester, amidomethylol and vicinal diol, vicinal diol, alginate backbone, dextran backbone, chitosan backbone, hyaluronic acid backbone, chondroitin sulfate backbone, or carboxy methyl cellulose backbone, or a combination thereof.

In some cases, the degradable functional group comprises a disulfide. Following polymer matrix synthesis, the polymer matrix can be cleaved with a thiol such as glutathione or betamercaptoethanol, a disulfide or such as glutathione disulfide, or a reducing agent such as TCEP or dithiothreitol. Such systems offer the advantage of being cleavable under mild, biologically compatible conditions while simultaneously being stable absent a disulfide-degradant.

In some cases, the degradable functional group comprises a vicinal diol. Vicinal diols offer the advantage of enhanced stability relative to hydrolysable and reductively cleavable functional groups, allowing their use in harsh conditions and with cells that are active in polymer cleavage. Many cells secrete reactive species that are capable of degrading reactive functional groups. For example, some neutrophils and macrophages extracellularly generate the oxidant superoxide, while many adherent cells secrete free thiols and regulate extracellular thiol and disulfide concentrations to mediate intercellular signaling. Reactive degradable functional groups such as disulfides and saccharides can thus be unstable in the presence of certain cell types, and can exhibit non-negligible background degradation rates in the presence of these cells. Vicinal diol degradable functional groups address this issue by, in general, being unreactive towards enzymes and molecules secreted by cells. At the same time, vicinal diols are readily cleavable with mild, biocompatible oxidizing agents such as periodate, permanganate, and peroxide in the presence of manganese catalysts. Polymer matrices formed from vicinal diol-containing monomers can thus be rapidly formed and degraded, for example as disclosed in Examples 9 and 10.

In some embodiments, the porogen comprises poly(ethylene glycol). The molecular weight and degree of crosslinking and branching of the poly(ethylene glycol) may be selected based on the desired porosity of the polymer matrix to be formed from the polymer precursor.

In some embodiments, the ratio of the porogen to the polymer precursor by weight is between about 1:1 and 1:6. In some embodiments, the ratio of the porogen to the polymer precursor by weight is between about 1:2 and 1:5. In some embodiments, the ratio of the porogen to the polymer precursor by weight is between about 1:3 and 1:4. In some embodiments, the ratio of the porogen to the polymer precursor by weight is about 1:3.5.

In some embodiments, (a) the porogen; and (b) the polymer precursor are contained in a single container. In some embodiments, the kit further comprises (c) a photoinitiator contained in another container.

In some embodiments, the photoinitiator includes one of lithium phenyl-2,4,6-trimethylbenzoylphosphinate (LAP), Irgacure 2959, diphenyl(2,4,6-trimethylbenzoyl)phosphine oxide (TPO) nanoparticles, 2,2'-azobis[2-methyl-N-(2-hydroxyethyl) promionamide](VA-086), BAPO-Oli, BAPO-Ona, Eosin-Y, Riboflavin, and combination thereof.

In some embodiments, the oligomeric domain further comprises an amide moiety. In some embodiments, the oligomeric domain further comprises a beta thioether moiety.

Provided in certain embodiments, described herein is a method for processing a chemical or biological material, comprising: (a) inputting (i) said chemical or biological material and (ii) one or more polymer precursors into a fluidic device; (b) supplying a stimulus to said fluidic device to generate one or more polymer matrices, wherein said one or more polymer matrices comprise: (i) a first gel structure from said one or more polymer precursors within said fluidic device, wherein said first gel structure at least partially encapsulates said chemical or biological material, and wherein said first gel structure comprises a first interior region; and (ii) a second gel structure adjacent to said first gel structure, wherein said second gel structure comprises a second interior region; and (c) degrading a portion of said first gel structure, said second gel structure, or both, thereby yielding a third interior region, wherein said third interior region comprises said first interior region of said first gel structure and said second interior region of said second gel structure.

In some embodiments, the first gel structure and said second gel structure each comprise one or more polymer matrix walls. In some embodiments, the first gel structure and said second gel structure share a polymer matrix wall of the one or more polymer matrix walls. In some embodiments, the portion of said first gel structure, said second gel structure, or both degraded in (c) comprises said shared polymer matrix wall.

Figure 12A:
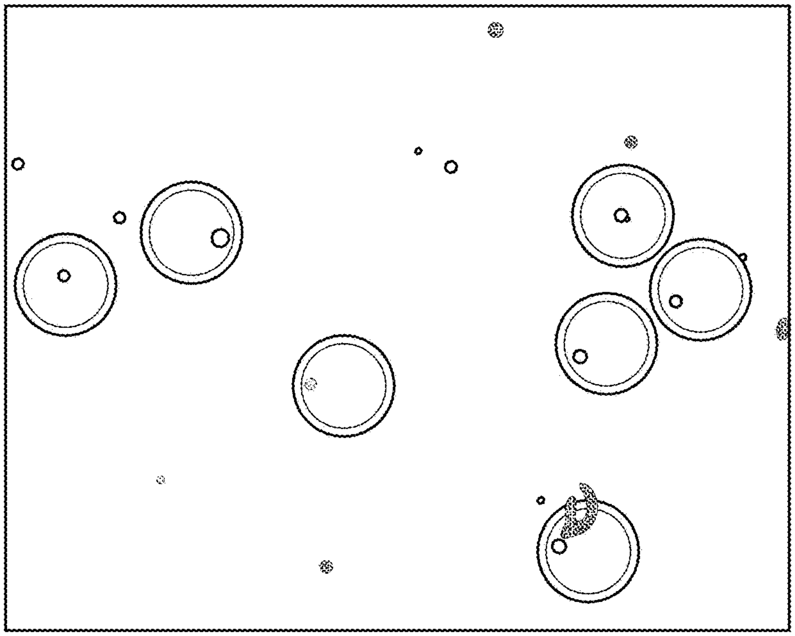
FIG. 12A-12D illustrates an example of a polymer matrix during caging, before degradation, after degradation, and after rinse, according to some embodiments.
Figure 12B:
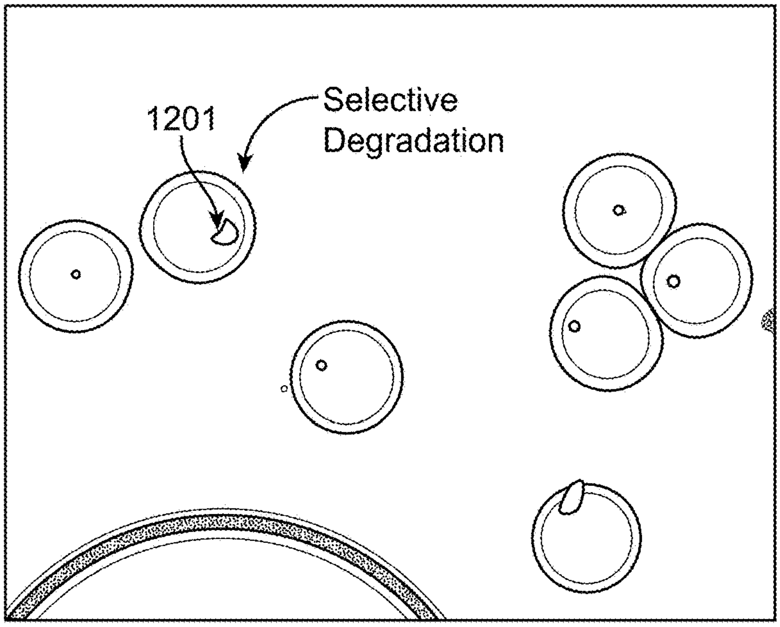
Figure 12C:
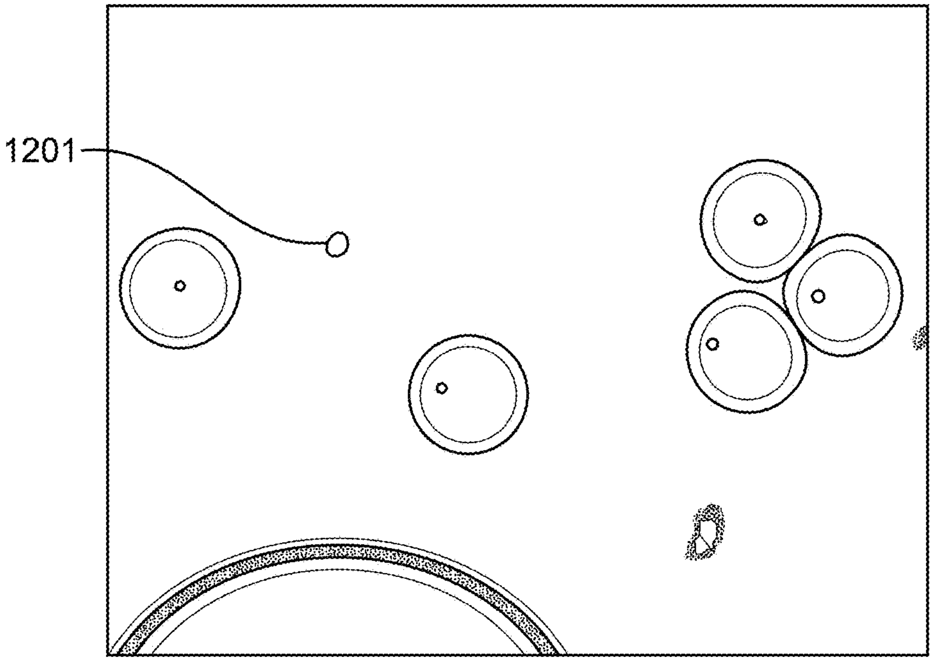
Figure 12D:
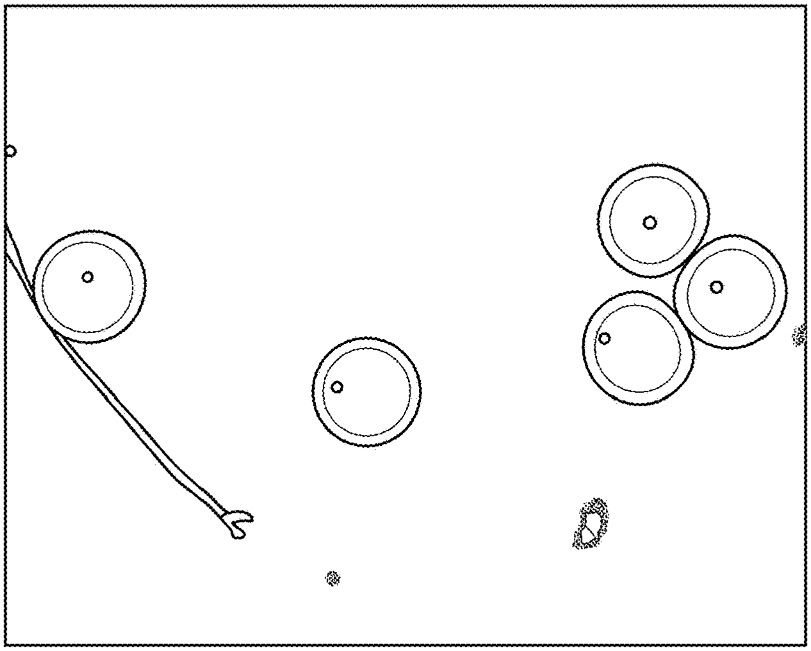

FIG. 12A-12D illustrates an example of a polymer matrix during caging, before degradation, after degradation, and after rinse. In the example of FIG. 12A, polymer caging is shown. In the example of FIG. 12B, polymer caging before degradation with CD56+ cells marked 1201 is shown. In the example of FIG. 12C, polymer caging after degradation 3 s after exposure with CD56+ cells marked 1201 is shown. In the example of FIG. 12D, polymer caging after rinse with CD56+ cells marked 1201 is shown.

Figure 12E:
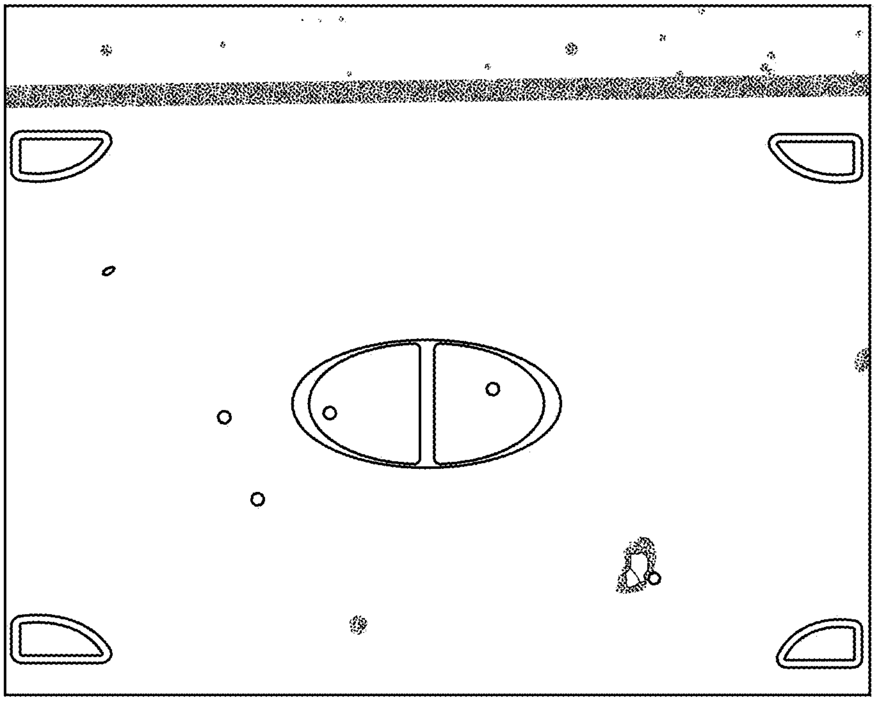
FIG. 12E-12G illustrates an example of degradation of a portion of a polymer matrix cage to combine elements in a polymer matrix, according to some embodiments.
Figure 12F:
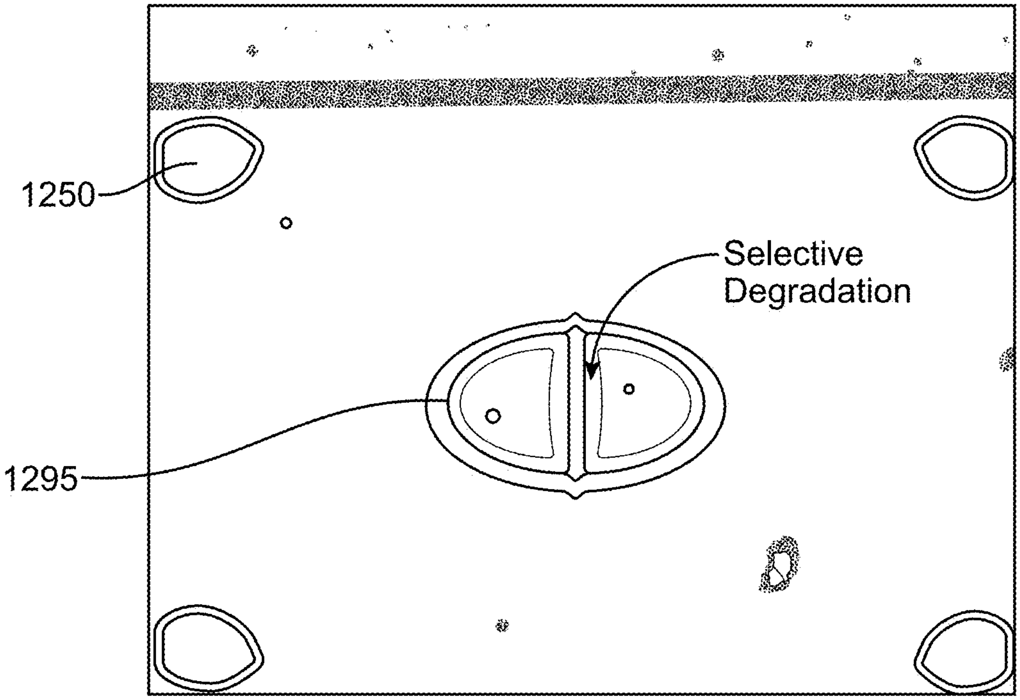
Figure 12G:
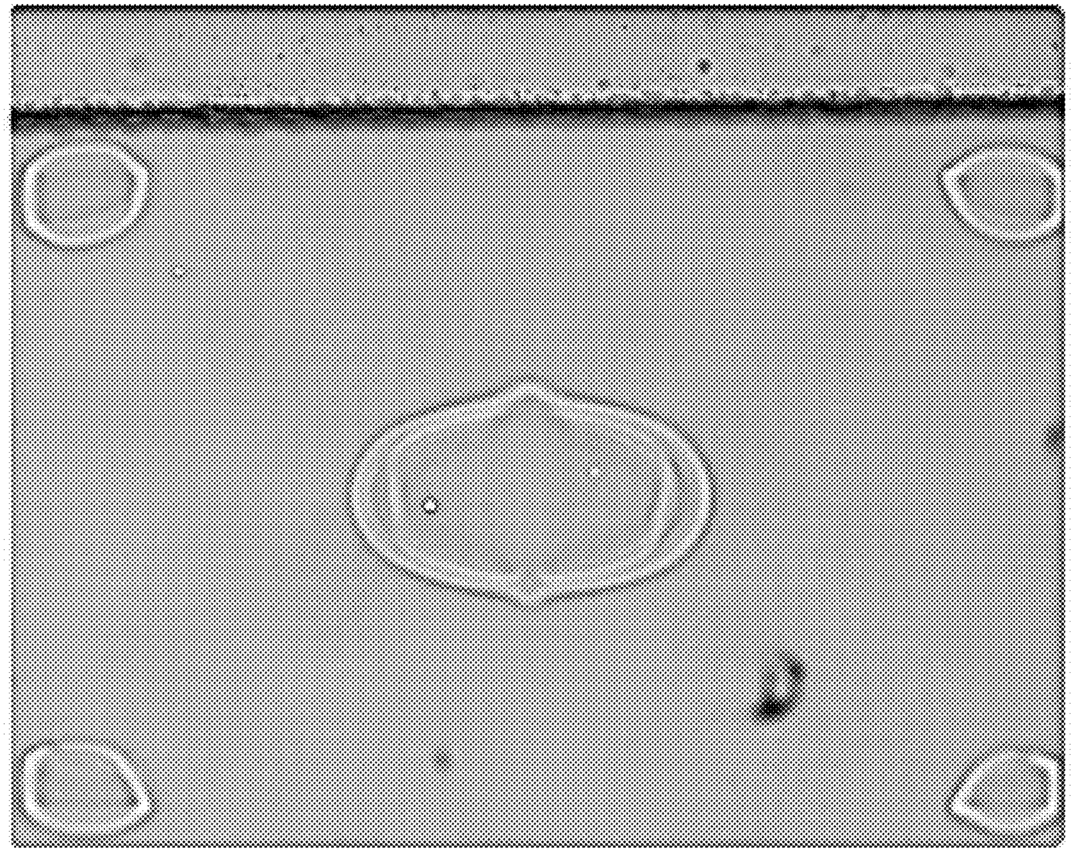

FIG. 12E-12G illustrates an example of degradation of a portion of a polymer matrix cage to combine elements in a polymer matrix. In the example of FIG. 12F, two adjacent cages are lined up at boundary 1250 to form a complex cage 1295. In the example of FIG. 12F, corner hydrogel markers are used to line up the at the boundary of both cages 1250 for degrading partition of complex cage 1295. In the example of FIG. 12G polymer caging after degradation 3 seconds after exposure is shown. As shown in the example of FIG. 12G, the boundary 1250 has substantially degraded and complex cage 1295 comprises one cage with substantially all the contents from the two adjacent cages.

In various embodiments, processing a chemical or biological material can include a sample preparation of a biological material and/or analysis of the biological material.

In some embodiments, the kit further comprises a polymer precursor essentially does not contain free thiol moieties, wherein the free thiol moieties are configured to degrade disulfide bonds. In some embodiments, the single container essentially does not contain free thiol moieties, wherein the free thiol moieties are configured to degrade disulfide bonds. In some embodiments, the free thiol concentration is less than 5%, 1%, 0.1%, 0.01%, or 0.001% (e.g., less than 5%, 1%, 0.1%, 0.01%, or 0.001% of disulfides in macromonomers are reduced to form free thiols). In some embodiments, the free thiol concentration in the single container is less than about 10 nM, less than about 5 nM, less than about 1 nM, less than about 500 pM, less than about 100 pM, less than about 50 pM, less than about 10 pM, less than about 5 pM, or less than about 1 pM.

In an aspect, described herein is a method for processing a chemical or biological material, comprising: (a) inputting (i) said chemical or biological material and (ii) one or more polymer precursors into a fluidic device; (b) supplying a stimulus to said fluidic device to generate one or more polymer matrices from said one or more polymer precursors within said fluidic device, wherein a polymer matrix of said one or more polymer matrices at least partially encapsulates said chemical or biological material, and wherein said polymer matrix is formed in less than 3 seconds following contact of said one or more polymer precursors with said stimulus.

In some embodiments, the polymer matrix is formed in less than 2 seconds following contact of said one or more polymer precursors with said energy. In some embodiments, the polymer matrix is formed in less than 1 second following contact of said one or more polymer precursors with said energy. In some embodiments, the polymer matrix is formed in less than 0.5 seconds following contact of said one or more polymer precursors with said energy.

In some embodiments, the polymer matrix is formed in less than 0.1 seconds following contact of said one or more polymer precursors with said energy.

In an aspect, described herein is a method for processing a chemical or biological material, comprising (a) inputting (i) said chemical or biological material and (ii) one or more polymer precursors into a fluidic device; (b) supplying a stimulus to said fluidic device to generate one or more polymer matrices from said one or more polymer precursors within said fluidic device, wherein a polymer matrix of said one or more polymer matrices at least partially encapsulates said chemical or biological material; and (c) performing one or more operations on said chemical or biological material within said polymer matrix, wherein said one or more operations comprise a temporal duration of at least one day, wherein no more than 20% of said polymer matrix degrades during said temporal duration.

In some embodiments, no more than 15% of said polymer matrix degrades during said temporal duration. In some embodiments, no more than 10% of said polymer matrix degrades during said temporal duration. In some embodiments, no more than 5% of said polymer matrix degrades during said temporal duration. In some embodiments, no more than 1% of said polymer matrix degrades during said temporal duration. In some embodiments, the temporal duration comprises at least three days. In some embodiments, the temporal duration comprises at least five days. In some embodiments, the temporal duration comprises at least seven days. In some embodiments, the temporal duration comprises at least fourteen days.

FIG. 1A-1E shows an illustrative example of a micrograph of polymer matrix compartments formation over time and encapsulation of one or more biological components in a flow cell. In some embodiments, the polymer matrix is formed during curing. In the example of FIG. 1A-1E, a light energy source comprising 12.7 $mW/cm^2$ at 405 nm wavelength light was directed towards a flow cell containing cPEG, PEG (20 kDa), Lithium phenyl-2,4,6-trimethylbenzoylphosphinate (LAP), and cells suspended in cellular media. The light intensity at the fluidic device was about 100 to 700 $mW/cm^2$. As shown in the example of FIG. 1A-1E, the polymer matrix compartments started to form after 1 second of exposure (FIG. 1A) and continued to form until 5 seconds of exposure (FIG. 1B-1E). Further, in the example of FIG. 1E, by 5 seconds the cages were overexposed. In some cases, longer exposure times are not preferable as disulfides can be degraded by photoinitiator after acrylamides have been converted to polymer. In various embodiments, the light energy source can emit light with an intensity ranging from about 10 to 20 mW per square centimeter, preferably 15 to 19 mW per square centimeter for the first stimulus and second stimulus. In further embodiments, the light source can provide an intensity of about 50 to 1000 $mW/cm^2$ or about 100 to 700 $mW/cm^2$ within the fluidic device. The duration of the first or second stimulus can range from less than 10 seconds, 1-10 seconds, 2-8 seconds, or about 2-4 seconds. The wavelength of the light energy can range from about 400 nm to about 410 nm, from about 250 to 700 nm, from about 250 to 300 nm, from about 250 to 400 nm, from about 300 to 450 nm, or from about 400 to 700 nm.

In some cases, a biological component may be localized within a hollow region of a polymer matrix compartment. In some other cases, a polymer matrix may be formed on a biological component. In some alternative cases, a polymer matrix may localize more than one biological component. A biological compartment polymer matrix may encapsulate one or more biological components. Emitted energy from an energy source may be modulated spatially as described herein to form a polymer matrix. In some instances, the polymer matrix may encapsulate the biological component. In certain instances, the biological component may be encapsulated by the walls of the channel in and/or with a polymer matrix. In some embodiments, a biological component is released from the cell upon exposure to an energy source. In some embodiments, the energy source is UV light for lysing cells. In some embodiments, the energy source is visible light for lysing cells. In some embodiments, the UV light is used to activate a photoactivated detergent and lyse the cell. In some embodiments, the visible light is used to activate a photoactivated detergent and lyse the cell.

In an aspect, described herein is a method for processing a chemical or biological material, comprising: (a) inputting (i) one or more chemical or biological materials and (ii) one or more polymer precursors into a fluidic device; (b) supplying a stimulus to said fluidic device to generate one or more polymer matrices from said one or more polymer precursors within said fluidic device, wherein said one or more polymer matrices at least partially encapsulate said one or more chemical or biological materials; and (c) performing one or more operations on said one or more chemical or biological materials within said one or more polymer matrices, wherein said one or more operations comprise a temporal duration of at least one day, wherein at least 80% of said one or more chemical or biological materials are viable during said temporal duration. In some embodiments, at least 85% of said one or more chemical or biological materials are viable during said temporal duration. In some embodiments, at least 90% of said one or more chemical or biological materials are viable during said temporal duration. In some embodiments, at least 95% of said one or more chemical or biological materials are viable during said temporal duration. In some embodiments, at least 99% of said one or more chemical or biological materials are viable during said temporal duration. In some embodiments, the temporal duration comprises at least three days. In some embodiments, the temporal duration comprises at least five days. In some embodiments, the temporal duration comprises at least seven days. In some embodiments, the temporal duration comprises at least fourteen days.

Figure 6A:
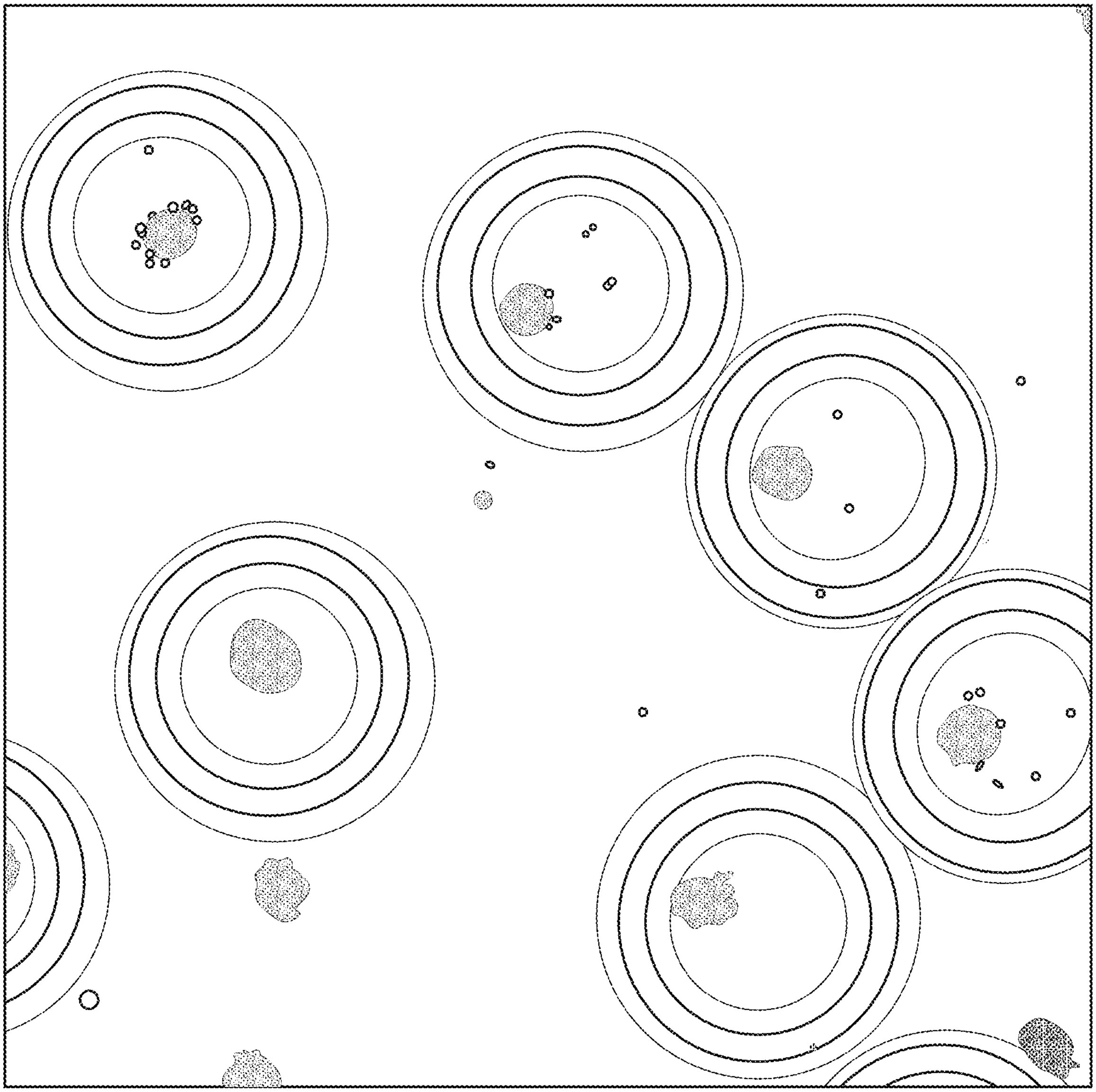
FIG. 6A-6C shows an illustrative example of a micrograph of polymer matrix compartments and encapsulation of one or more biological components in a flow cell from a period of time post-caging, according to some embodiments.
Figure 6B:
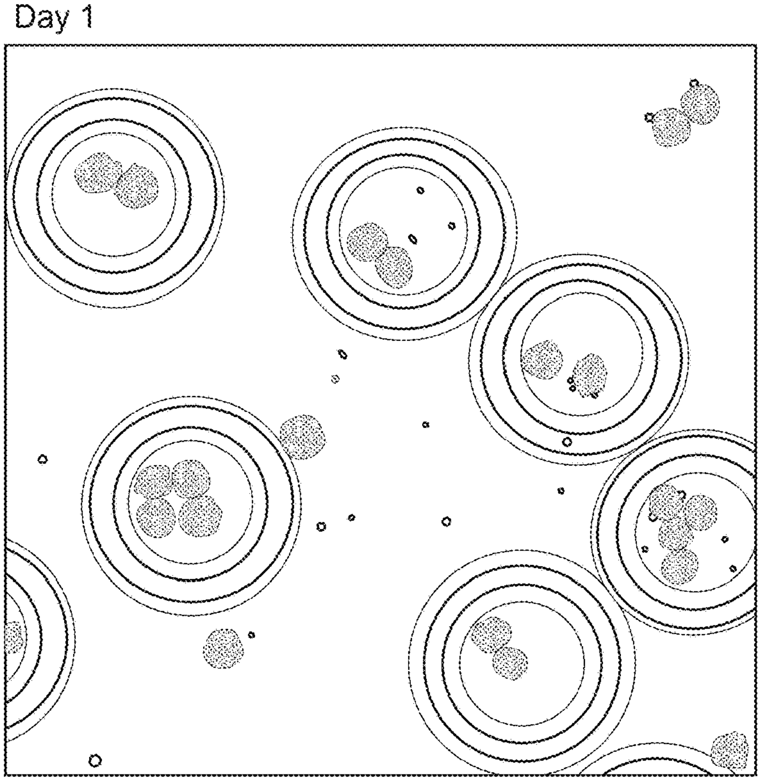
Figure 6C:
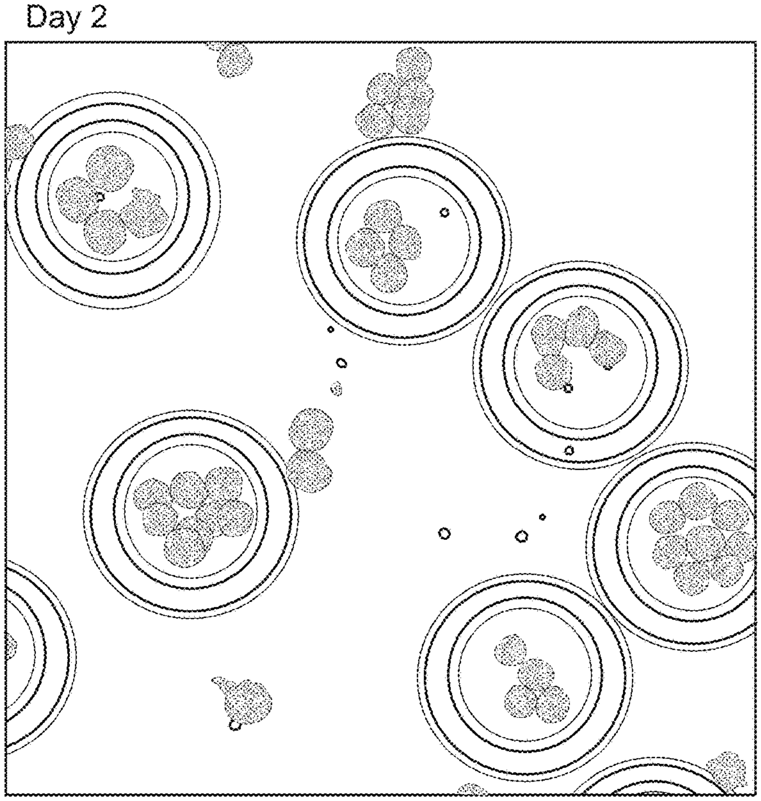

FIG. 6A-6C shows an illustrative example of a micrograph of polymer matrix compartments and encapsulation of one or more biological components in a flow cell from a period of time post-caging. FIG. 6A-6C shows an illustrative example of a micrograph of polymer matrix compartments and encapsulation of one or more biological components in a flow cell from Day 0 to Day 2 post-caging. In the example of FIG. 6A-6C, K562 cells were minimally exposed to the cPEG precursor solution prior to caging.

Figure 6D:
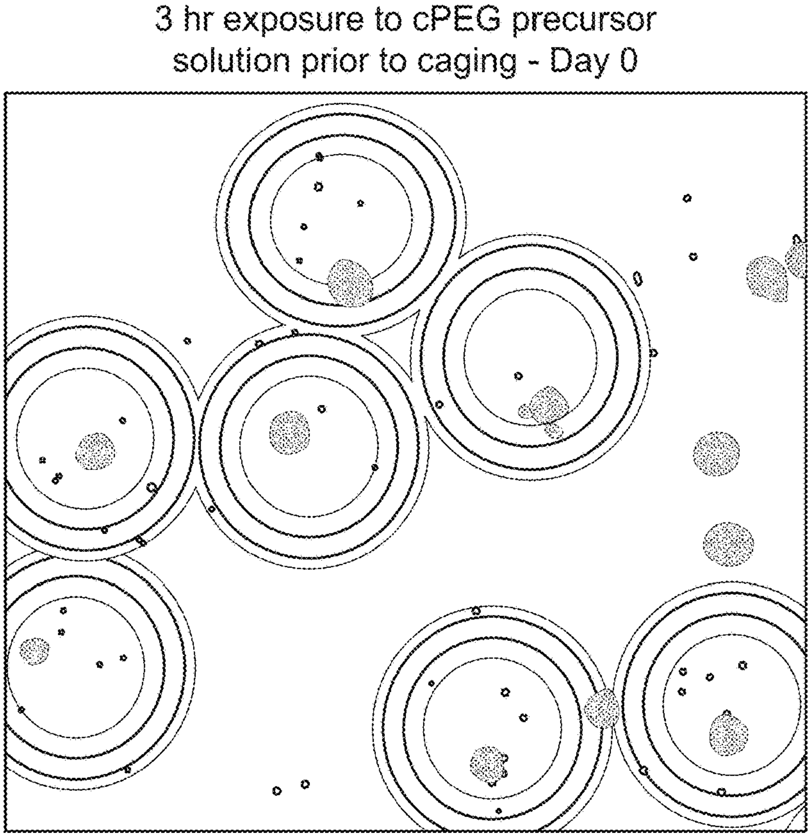
FIG. 6D-6F shows an illustrative example of a micrograph of polymer matrix compartments and encapsulation of one or more biological components in a flow cell a period of time post-caging, according to some embodiments, where the biological components were exposed to the polymer precursors for 3 hours prior to caging.
Figure 6E:
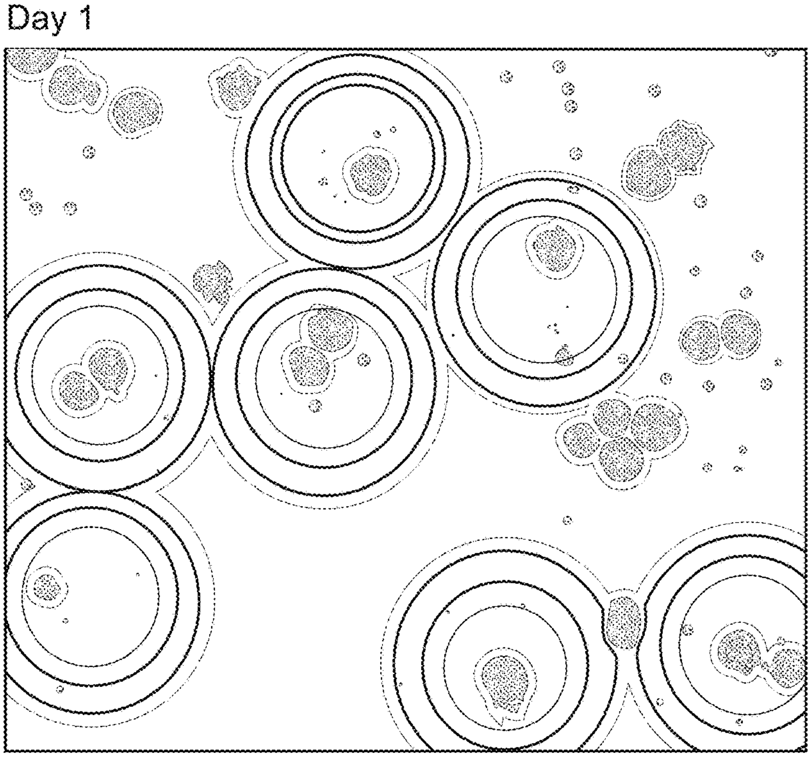
Figure 6F:
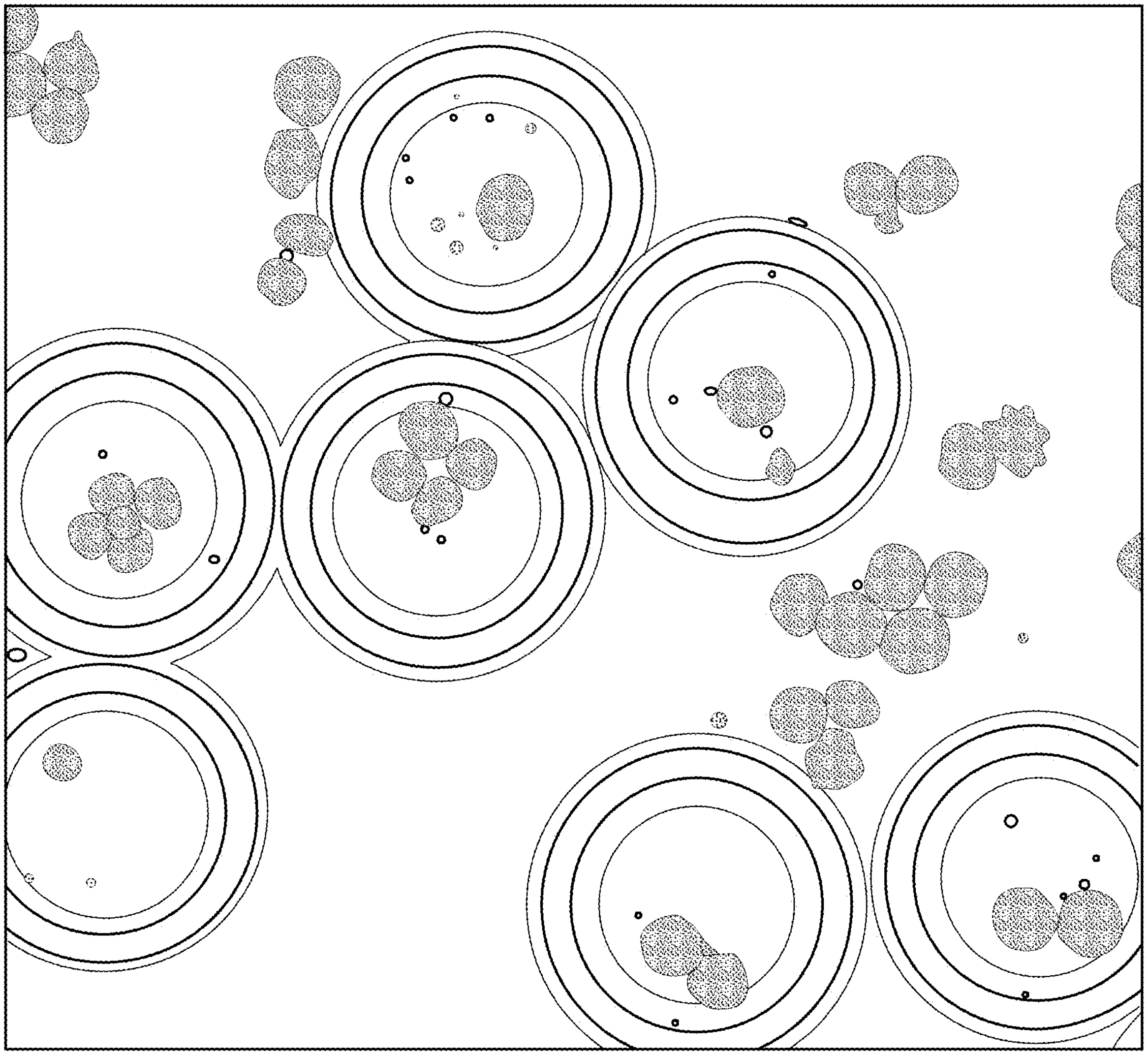

FIG. 6D-6F shows an illustrative example of a micrograph of polymer matrix compartments and encapsulation of one or more biological components in a flow cell a period of time post-caging. FIG. 6D-6F shows an illustrative example of a micrograph of polymer matrix compartments and encapsulation of one or more biological components in a flow cell from Day 0 to Day 2 post-caging. In the example of FIG. 6D-6F, K562 cells were exposed to the cPEG precursor solution for 3 hours prior to caging. As shown in the example of FIG. 6A-6F, the exposure of K562 cells to cPEG precursor solution for 3 hours prior to caging results in similar rates of cell viability and proliferation of K562 cells as compared to K562 cells which had minimal exposure to k562 solution prior to caging.

Temporal Duration

In some embodiments, the temporal duration comprises at least three days. In some embodiments, the temporal duration comprises at least five days. In some embodiments, the temporal duration comprises at least seven days. In some embodiments, the temporal duration comprises at least fourteen days.

Figure 5A:
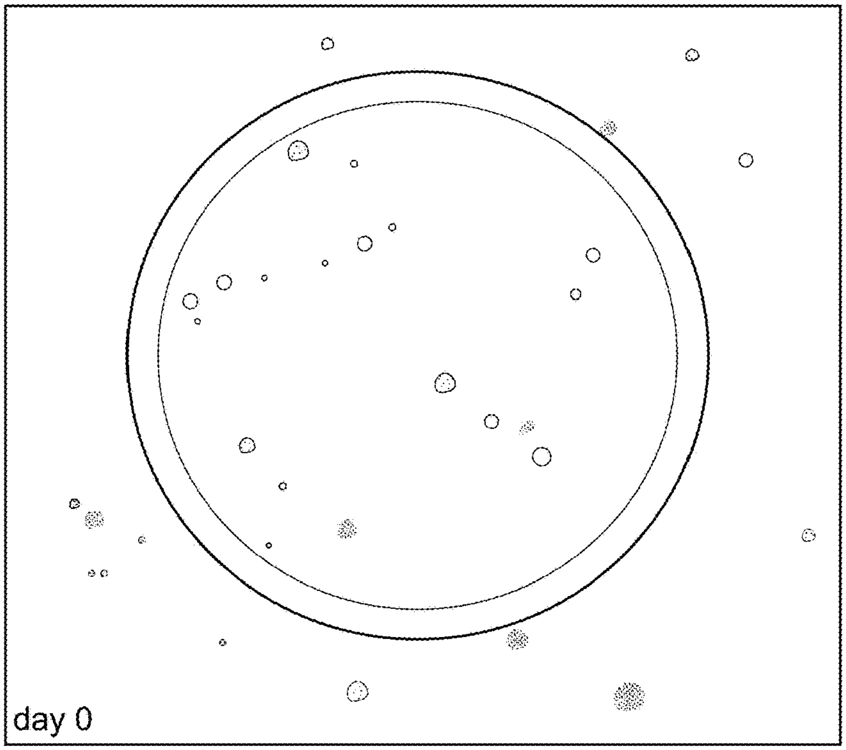
FIG. 5A-5D shows an illustrative example of a micrograph of polymer matrix compartments and encapsulation of one or more biological components in a flow cell from over a period of time after formation/curing, according to some embodiments.
Figure 5B:
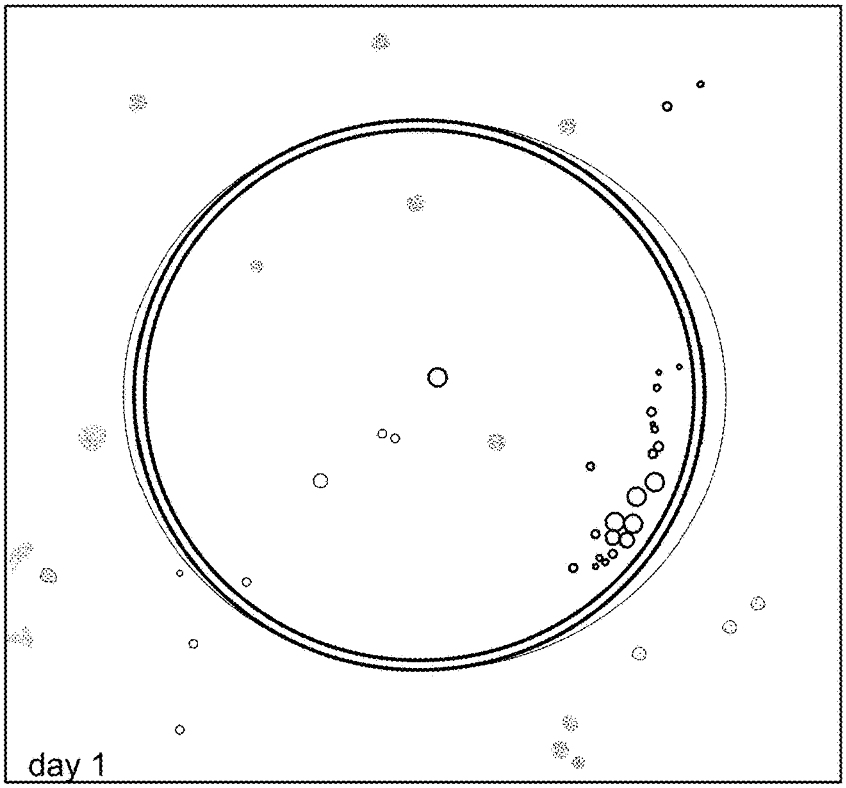
Figure 5C:
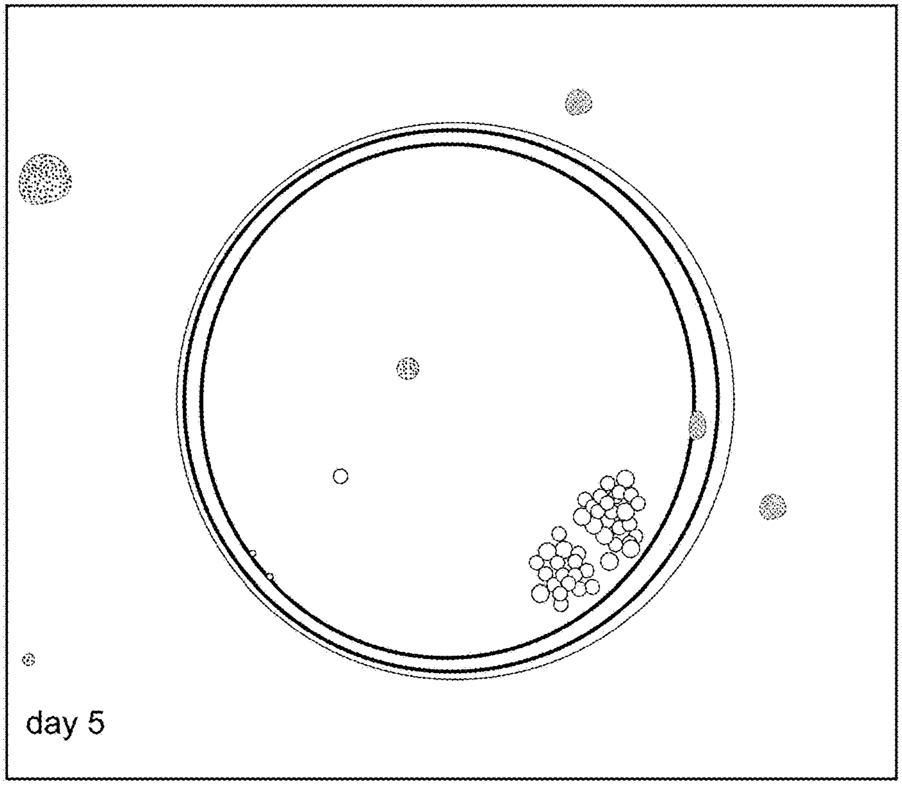
Figure 5D:
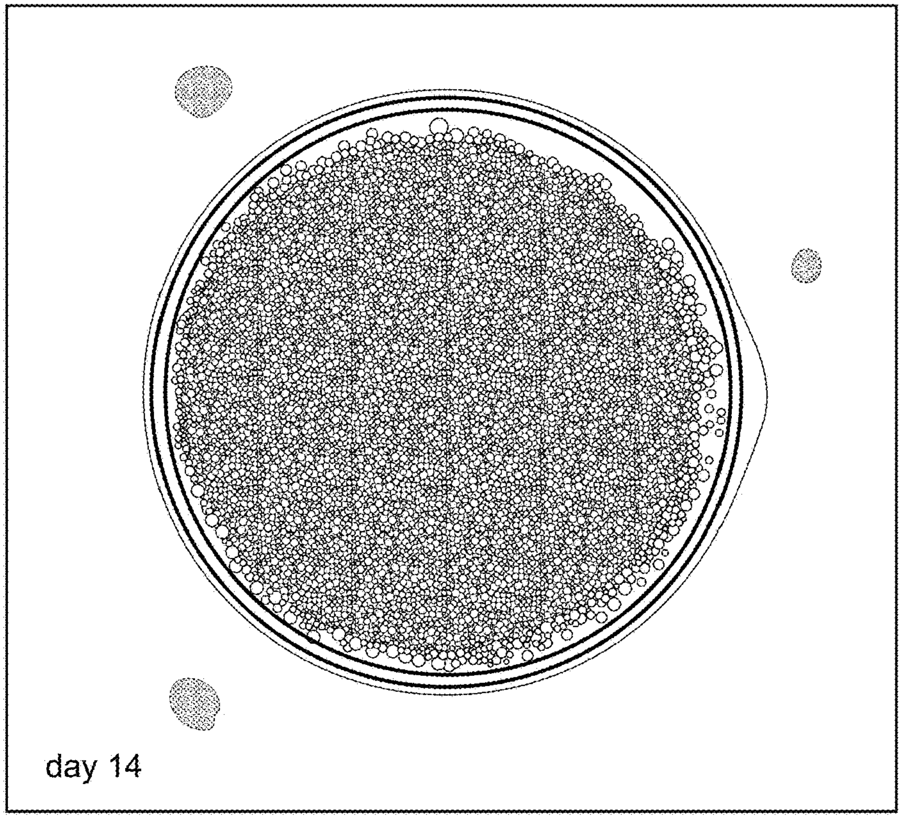

FIG. 5A-5D shows an illustrative example of a micrograph of polymer matrix compartments and encapsulation of one or more biological components in a flow cell from over a period of time after formation/curing. FIG. 5A-5D shows an illustrative example of a micrograph of polymer matrix compartments and encapsulation of one or more biological components in a flow cell from Day 0 to Day 14 after formation/curing. In the example of FIG. 5A, cPEG cages were formed and Jurkat cells were added on Day 0. As shown, in the example of FIG. 5A-5D, the cPEG cages were formed such that the proliferation of Jurkat cells was enabled for at least 14 days. In the example of FIG. 5B, after 1 day, a few Jurkat cells grew into a larger group of Jurkat cells. Further, in the example of FIG. 5C, after 5 days, a few Jurkat cells grew into an even larger group of Jurkat cells. Further, in the example of FIG. 5D, after 14 days, a few Jurkat cells grew into an even larger group of Jurkat cells, wherein the even larger group of Jurkat cells comprised substantially all of the volume of the cell cage.

Figure 5E:
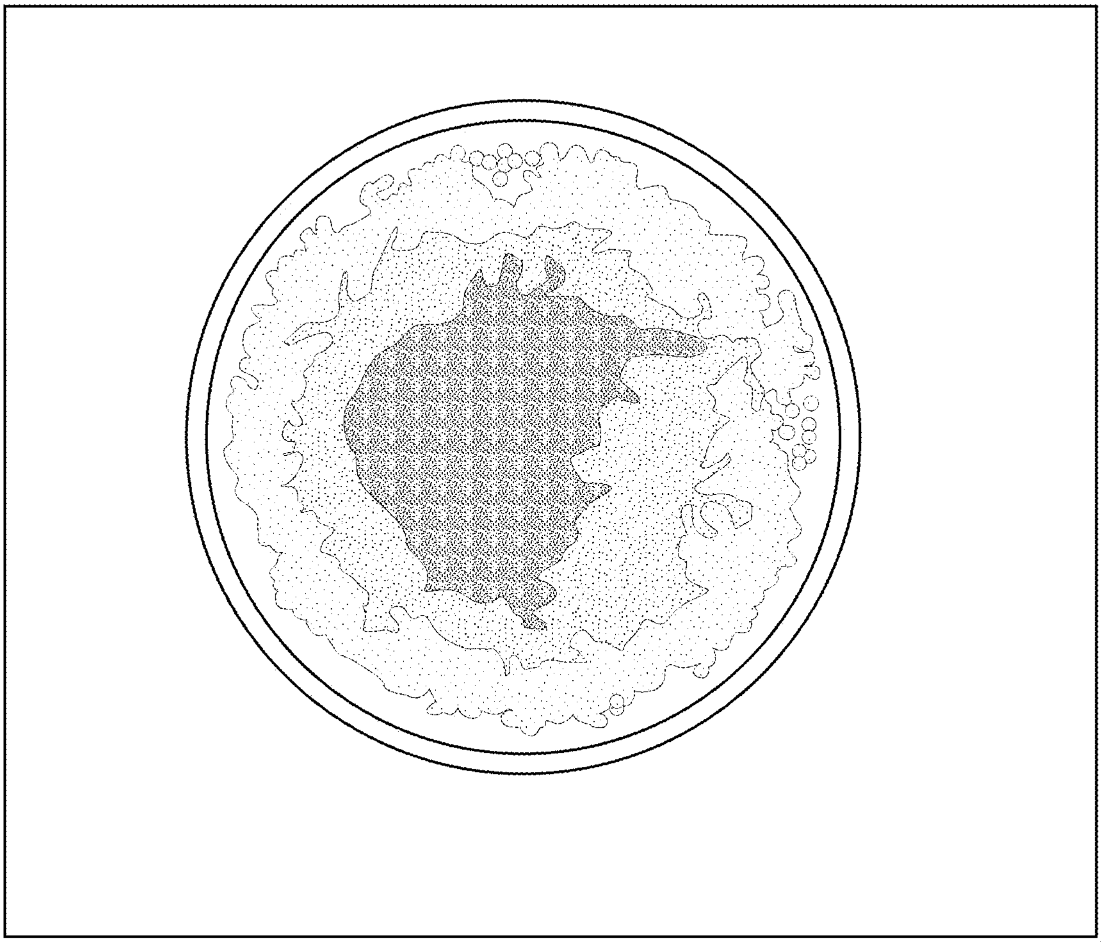
FIG. 5E shows an illustrative example of a fluorescent micrograph of polymer matrix compartments encapsulation of one or more biological components in a flow cell after a 14-day period after formation/curing, according to some embodiments.

FIG. 5E shows an illustrative example of a micrograph of polymer matrix compartments encapsulation of one or more biological components in a flow cell a period after formation/curing. FIG. 5E shows an illustrative example of a micrograph of polymer matrix compartments encapsulation of one or more biological components in a flow cell at Day 14 after formation/curing. In the example of FIG. 5E, the Jurkat cells were stained with calceinAM, indicating numerous live cells.

In an aspect, described herein is a method for processing a chemical or biological material, comprising: (a) inputting (i) said one or more chemical or biological materials and (ii) one or more polymer precursors into a fluidic device; and (b) maintaining a fluidic communication between said one or more chemical or biological materials and said polymer precursors for a temporal duration of at least ten minutes, wherein at least 80% of said one or more chemical or biological materials are viable during said temporal duration.

In some embodiments, the at least 85% of said one or more chemical or biological materials are viable during said temporal duration. In some embodiments, the at least 90% of said one or more chemical or biological materials are viable during said temporal duration. In some embodiments, the at least 95% of said one or more chemical or biological materials are viable during said temporal duration. In some embodiments, the at least 99% of said one or more chemical or biological materials are viable during said temporal duration. In some embodiments, the temporal duration comprises at least 30 minutes. In some embodiments, the temporal duration comprises at least one hour. In some embodiments, the temporal duration comprises at least two hours. In some embodiments, the temporal duration comprises at least three hours. In some embodiments, the temporal duration comprises at least one day. In some embodiments, the method further comprises supplying a stimulus to said fluidic device to generate one or more polymer matrices from said one or more polymer precursors within said fluidic device, wherein said one or more polymer matrices at least partially encapsulate said one or more chemical or biological materials. In some embodiments, the stimulus comprises light. In some embodiments, the one or more polymer matrices comprises a polymerized form of a cPEG monomer.

In some embodiments, the one or more polymer matrices comprise a polymerized form of a monomer including a structure (I):

(I)

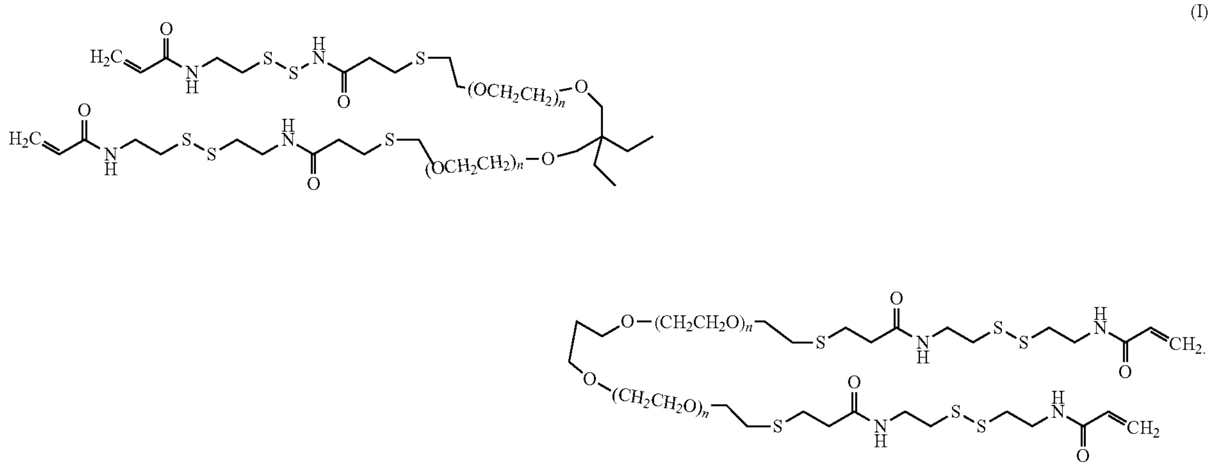

In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (II):

(II)

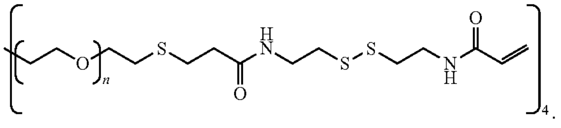

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the n is between about 0 to about 10. In some embodiments, the one or more polymer precursors comprise at least 40 μL of solution.

In some embodiments, the one or more polymer matrices comprise a polymerized form of a monomer including a structure (III):

(III)

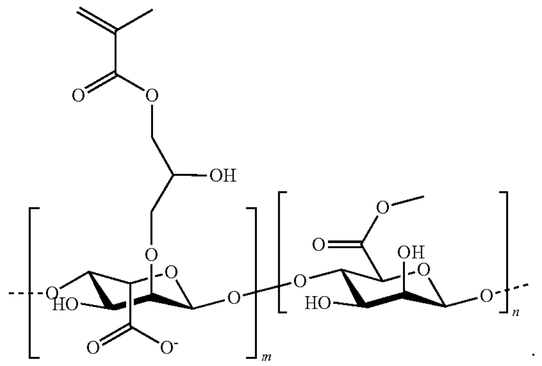

In some cases, n and m are independently integers selected from 0 to 500, wherein at least one of n and m is at least 1. In some cases, n and m are independently integers selected from 0 to 100, wherein at least one of n and m is at least 1. In some cases, n and m are independently integers selected from 1 to 100. In some cases, n and m are independently integers selected from 5 to 100. In some cases, n and m are independently integers selected from 5 to 50. In some cases, n and m are independently integers selected from 20 to 50. In some cases, n and m are independently integers selected from 0 to 10, wherein at least one of n and m is at least 1.

In some embodiments, the one or more polymer matrices comprise a polymerized form of a monomer including a structure (IV):

(IV)
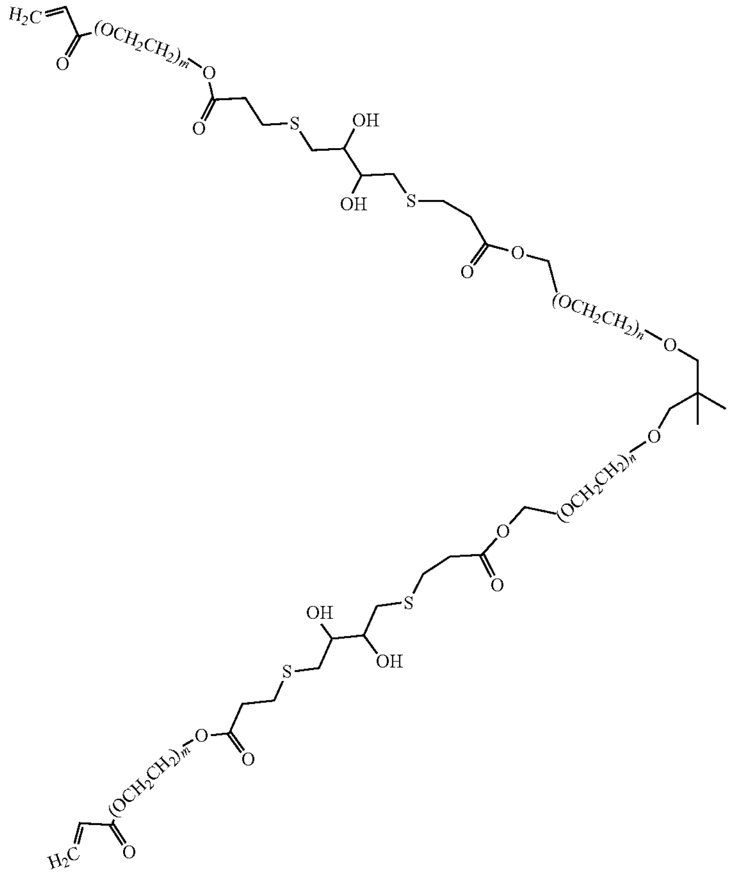
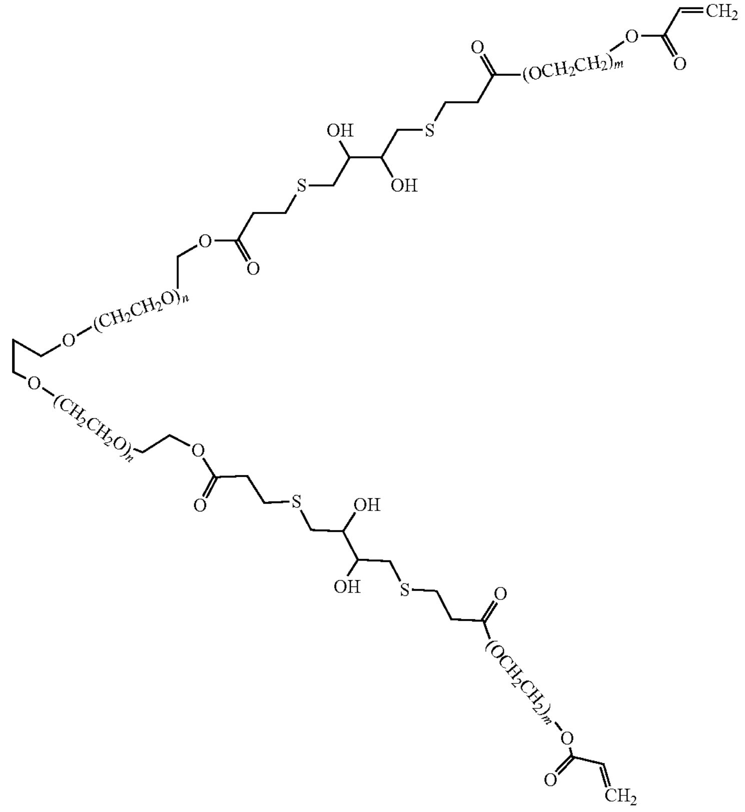

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10. In some cases, each instance of m is independently an integer selected from 0 to 500. In some cases, each instance of m is independently an integer selected from 0 to 100. In some cases, each instance of m is independently an integer selected from 1 to 100. In some cases, each instance of m is independently an integer selected from 5 to 100. In some cases, each instance of m is independently an integer selected from 5 to 50. In some cases, each instance of m is independently an integer selected from 20 to 50. In some cases, each instance of m is independently an integer selected from 0 to 10.

In some embodiments, the one or more polymer matrices comprise a polymerized form of a monomer including a structure (V):

(V)

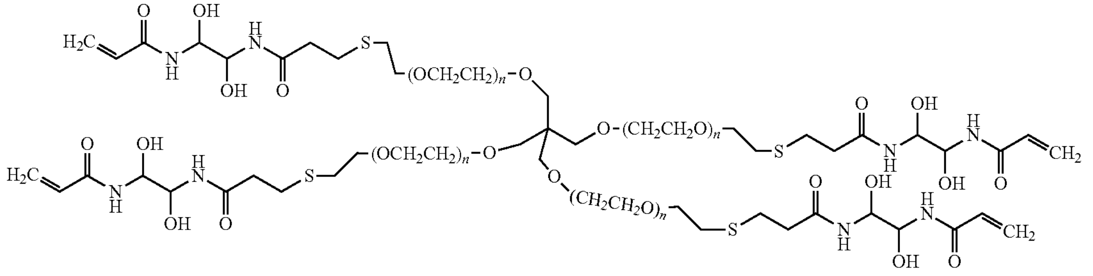

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (VI):

(VI)

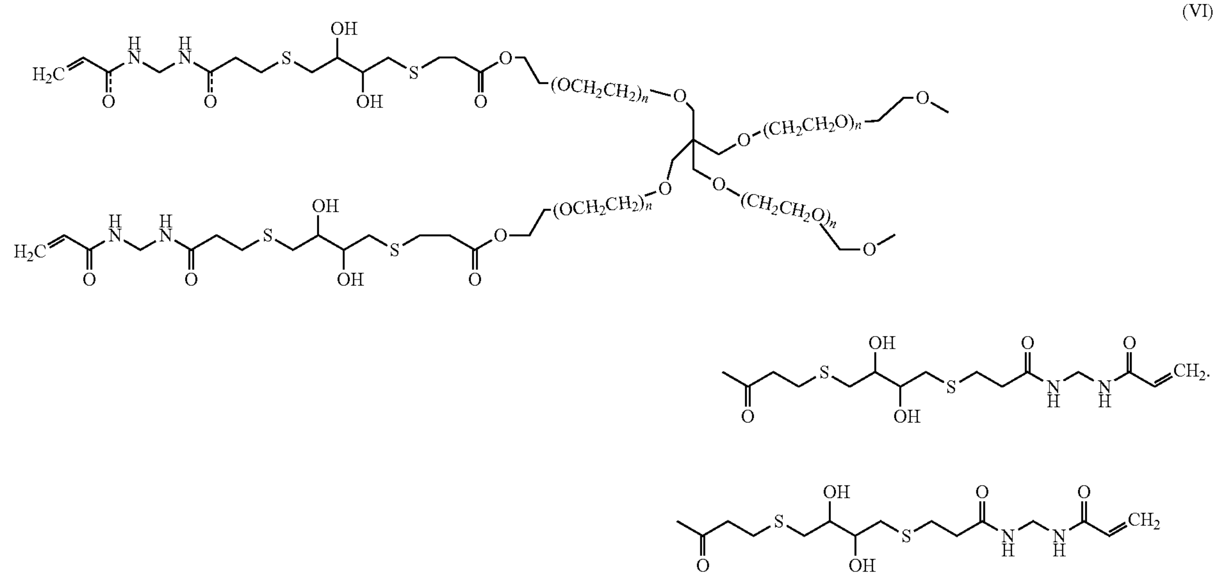

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (VII):

(VII)

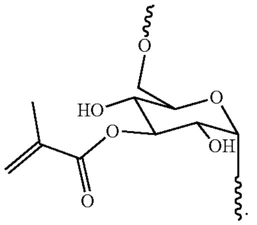

In some cases, a structure (VII) comprises between 1 and 500, 1 to 100, 5 to 100, 5 to 50, 20 to 50, or 1 to 10 monomeric units.

In some embodiments, the one or more polymer matrices comprise a polymerized form of a monomer including a structure (VIII):

(VIII)

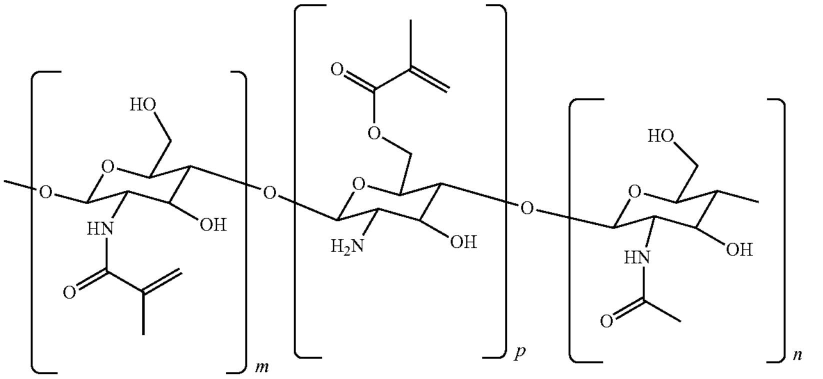

In some cases, n, m, and p are independently integers selected from 0 to 500, wherein at least one of n, m, and p is at least 1. In some cases, n, m, and p are independently integers selected from 0 to 100, wherein at least one of n, m, and p is at least 1. In some cases, n and m are independently integers selected from 1 to 100. In some cases, n, m, and p are independently integers selected from 5 to 100. In some cases, n, m, and p are independently integers selected from 5 to 50. In some cases, n, m, and p are independently integers selected from 20 to 50. In some cases, n, m, and p are independently integers selected from 0 to 10, wherein at least one of n, m, and p is at least 1.

In some embodiments, the one or more polymer matrices comprise a polymerized form of a monomer including a structure (IX):

(IX)

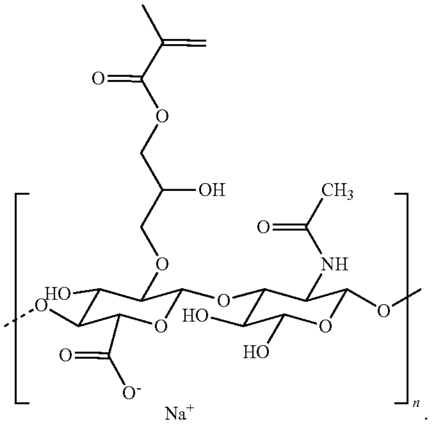

In some cases, n is an integer selected from 1 to 500. In some cases, n is an integer selected from 1 to 100. In some cases, n is an integer selected from 5 to 100 In some cases, n is an integer selected from 5 to 50. In some cases, n is an integer selected from 20 to 50. In some cases, n is an integer selected from 1 to 10.

In some embodiments, the one or more polymer matrices comprise a polymerized form of a monomer including a structure (X):

(X)

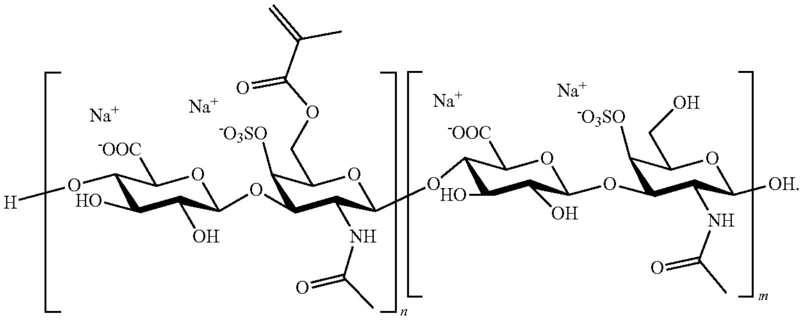

In some cases, n and m are independently integers selected from 0 to 500, wherein at least one of n and m is at least 1. In some cases, n and m are independently integers selected from 0 to 100, wherein at least one of n and m is at least 1. In some cases, n and m are independently integers selected from 1 to 100. In some cases, n and m are independently integers selected from 5 to 100. In some cases, n and m are independently integers selected from 5 to 50. In some cases, n and m are independently integers selected from 20 to 50. In some cases, n and m are independently integers selected from 0 to 10, wherein at least one of n and m is at least 1.

In some embodiments, the one or more polymer matrices comprise a polymerized form of a monomer including a structure (XI):

(XI)

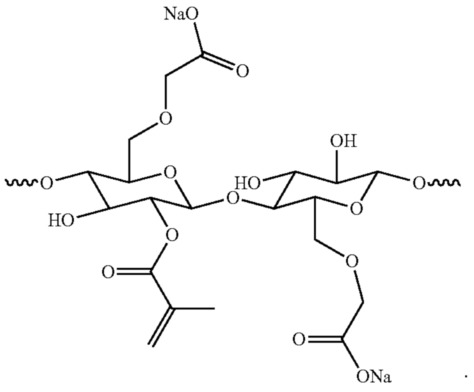

In some cases, a structure (XI) comprises between 1 and 500, 1 to 100, 5 to 100, 5 to 50, 20 to 50, or 1 to 10 monosaccharide units.

In some embodiments, the one or more polymer matrices comprise a polymerized form of a monomer including a structure (XII):

(XII)

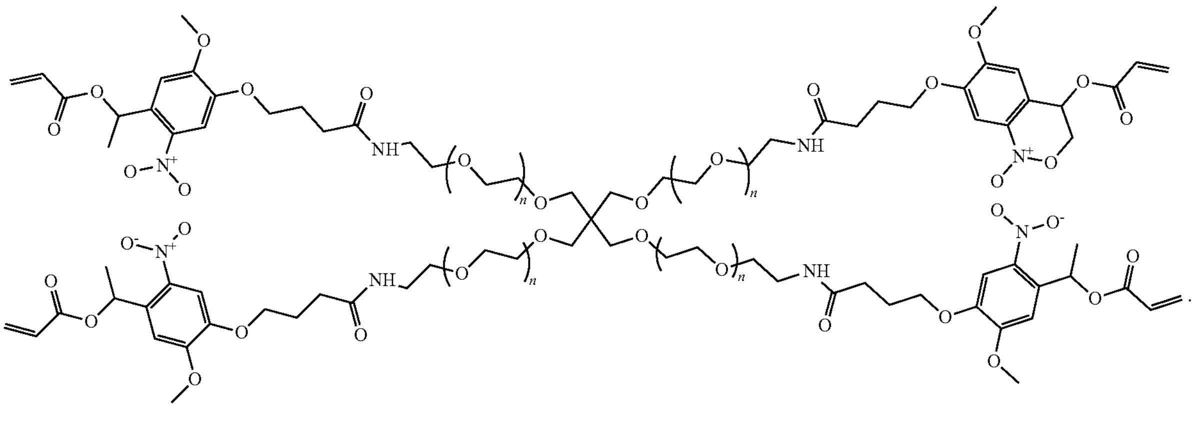

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (XIII):

(XIII)

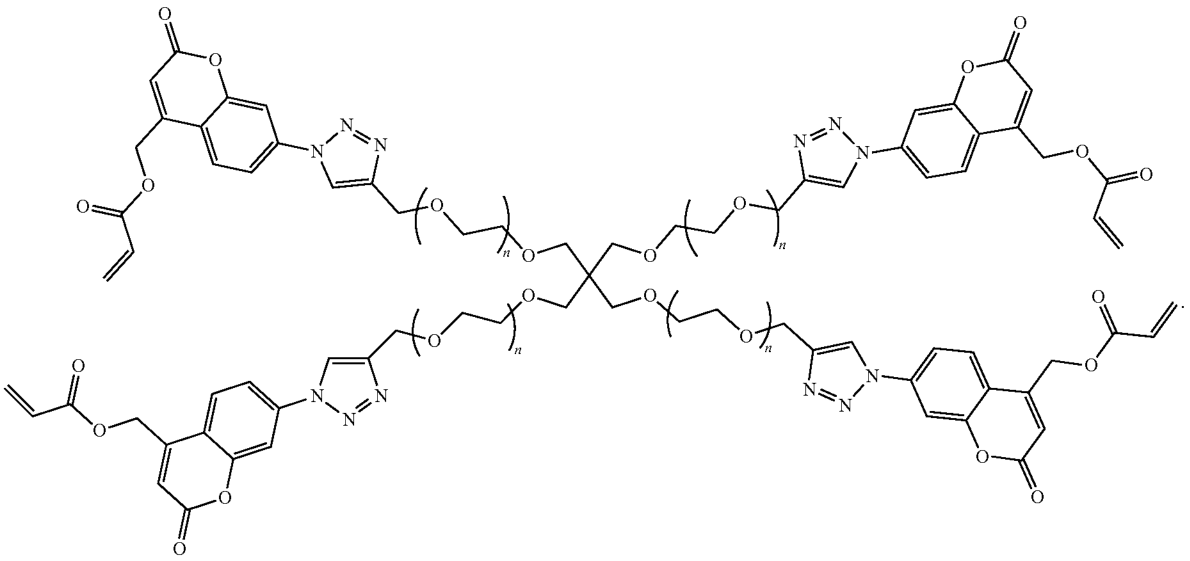

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (XIV):

(XIV)

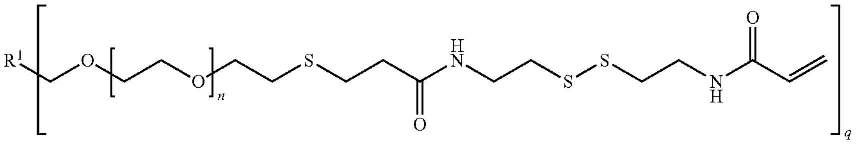

wherein $R^1$ is: i) a $C_1$ alkyl group, ii) a $C_2$-$C_{18}$ linear or branched saturated alkyl group, or iii) a $C_3$-$C_8$ cyclic saturated alkyl group substituted with 0-4 independently selected $C_1$-$C_3$ alkyl groups; wherein $R^1$ is substituted with q instances of

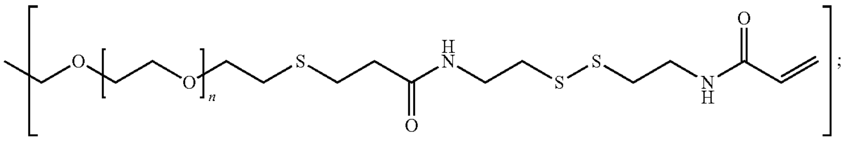

the remaining substituents on $R^1$ are hydrogen, q is an integer from 2 to 32, and each instance of n is an integer selected from 0-500. In some cases, q is an integer from 2 to 10. In some cases, q is an integer from 2 to 6. In some cases, q is an integer from 3 to 5. In some cases, $R^1$ is a $C_1$ alkyl group or a $C_2$-$C_6$ saturated linear or branched alkyl group, and q is an integer from 2-14. In some cases, $R^1$ is a $C_1$-$C_2$ alkyl group and q is an integer from 2 to 6. In some cases, each instance of n is an integer independently selected from 0-100. In some cases, each instance of n is an integer independently selected from 1-100. In some cases, each instance of n is an integer independently selected from 5-50. In some cases, each instance of n is an integer independently selected from 20-50.

In some embodiments, the one or more polymer matrices comprise a polymerized form of a monomer including a structure (XV):

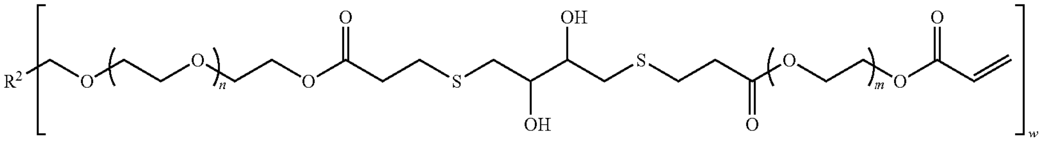

(XV)

wherein $R^2$ is: i) a $C_1$ alkyl group, ii) a $C_2$-$C_{18}$ linear or branched saturated alkyl group, or iii) a $C_3$-$C_8$ cyclic saturated alkyl group substituted with 0-4 independently selected $C_1$-$C_3$ alkyl groups;

wherein $R^2$ is substituted with w instances of

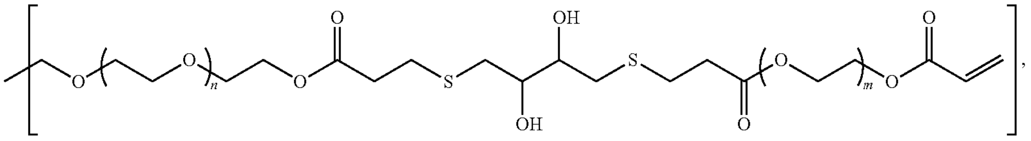

the remaining substituents on $R^2$ are hydrogen, w is an integer from 2 to 32, each instance of n is an integer independently selected from 0-500, and each instance of m is an integer independently selected from 0-500. In some cases, w is an integer from 2 to 10. In some cases, w is an integer from 2 to 6. In some cases, w is an integer from 3 to 5. In some cases, $R^2$ is a $C_1$ alkyl group or a $C_2$-$C_6$ saturated linear or branched alkyl group, and w is an integer from 2 to 14. In some cases, $R^2$ is a $C_1$-$C_2$ alkyl group and w is an integer from 2 to 6. In some cases, n is an integer selected from 0-500. In some cases, each instance of n is an integer independently selected from 0-100. In some cases, each instance of n is an integer selected from 5-50. In some cases, each instance of n is an integer selected from 20-50. In some cases, each instance of m is an integer independently selected from 0-500. In some cases, each instance of m is an integer independently selected from 0-100. In some cases, each instance of m is an integer independently selected from 20-50.

In some embodiments, the one or more polymer matrices comprise a polymerized form of a monomer including a structure (XVI):

(XVI)

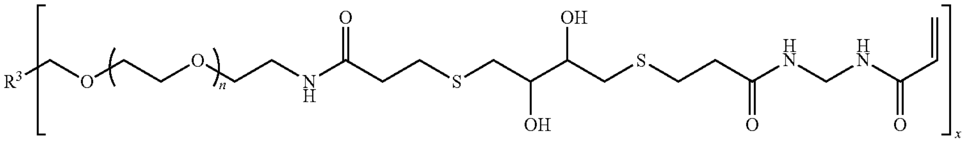

wherein $R^3$ is: i) a $C_1$ alkyl group, ii) a $C_2$-$C_{18}$ linear or branched saturated alkyl group, or iii) a $C_3$-$C_8$ cyclic saturated alkyl group substituted with 0-4 independently selected $C_1$-$C_3$ alkyl groups;

wherein $R^3$ is substituted with x instances of

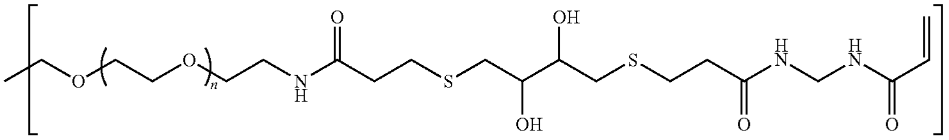

, the remaining substituents on $R^3$ are hydrogen, x is an integer from 2 to 32, and each instance of n is an integer independently selected from 0-500. In some cases, x is an integer from 2 to 10. In some cases, x is an integer from 2 to 6. In some cases, x is an integer from 3 to 5. In some cases, $R^3$ is a $C_1$ alkyl group or a $C_2$-$C_6$ saturated linear or branched alkyl group, and x is an integer from 2 to 14. In some cases, $R^3$ is a $C_1$-$C_2$ alkyl group and x is an integer from 2 to 6. In some cases, each instance of n is an integer independently selected from 0-500. In some cases, each instance of n is an integer independently selected from 0-100. In some cases, each instance of n is an integer independently selected from 5-50. In some cases, each instance of n is an integer independently selected from 20-50.

In some embodiments, the one or more polymer matrices comprise a polymerized form of a monomer including a structure (XVII):

(XVII)

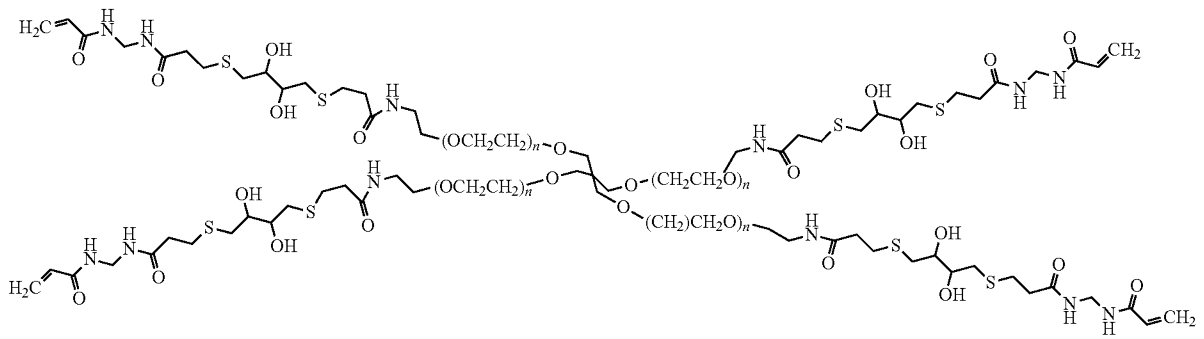

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10.

In some embodiments, the one or more polymer matrices comprise a polymerized form of a monomer including a structure (XVIII).

(XVIII)

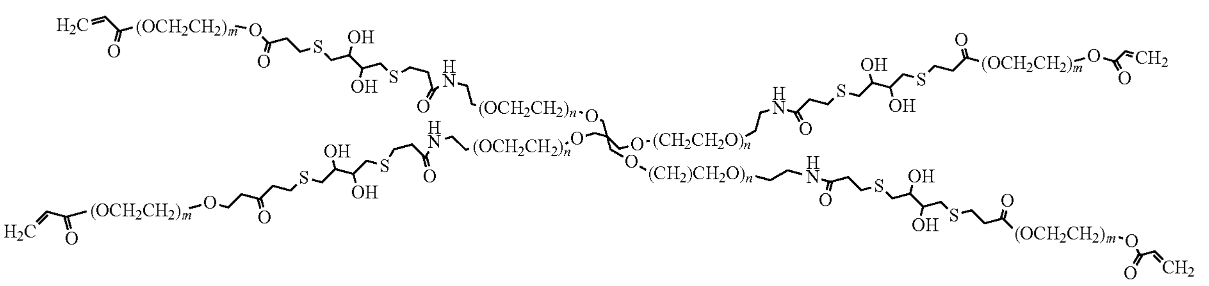

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10. In some cases, each instance of m is independently an integer selected from 0 to 500. In some cases, each instance of m is independently an integer selected from 0 to 100. In some cases, each instance of m is independently an integer selected from 1 to 100. In some cases, each instance of m is independently an integer selected from 5 to 100. In some cases, each instance of m is independently an integer selected from 5 to 50. In some cases, each instance of m is independently an integer selected from 20 to 50. In some cases, each instance of m is independently an integer selected from 0 to 10.

In some embodiments, the one or more polymer matrices comprise a polymerized form of a monomer including a structure (XIX):

(XIX)

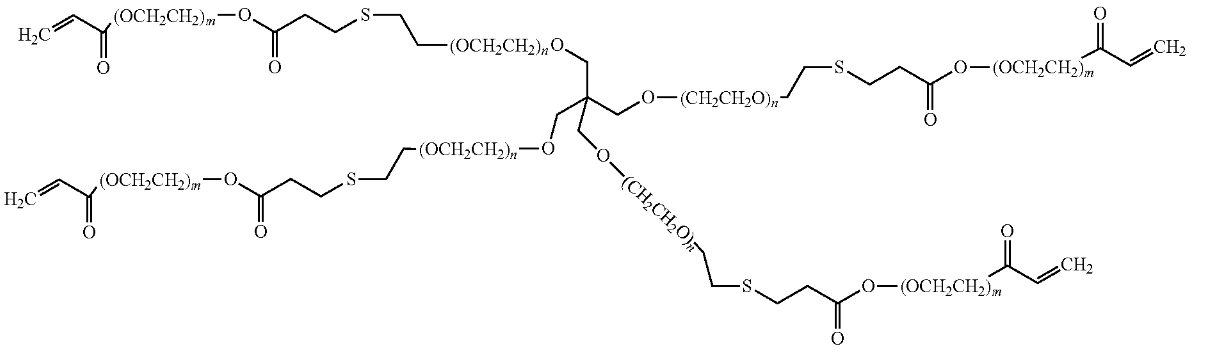

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10. In some cases, each instance of m is independently an integer selected from 0 to 500. In some cases, each instance of m is independently an integer selected from 0 to 100. In some cases, each instance of m is independently an integer selected from 1 to 100. In some cases, each instance of m is independently an integer selected from 5 to 100. In some cases, each instance of m is independently an integer selected from 5 to 50. In some cases, each instance of m is independently an integer selected from 20 to 50. In some cases, each instance of m is independently an integer selected from 0 to 10.

In some embodiments, the one or more polymer matrices comprise a polymerized form of a monomer including a structure (XX):

(XX)

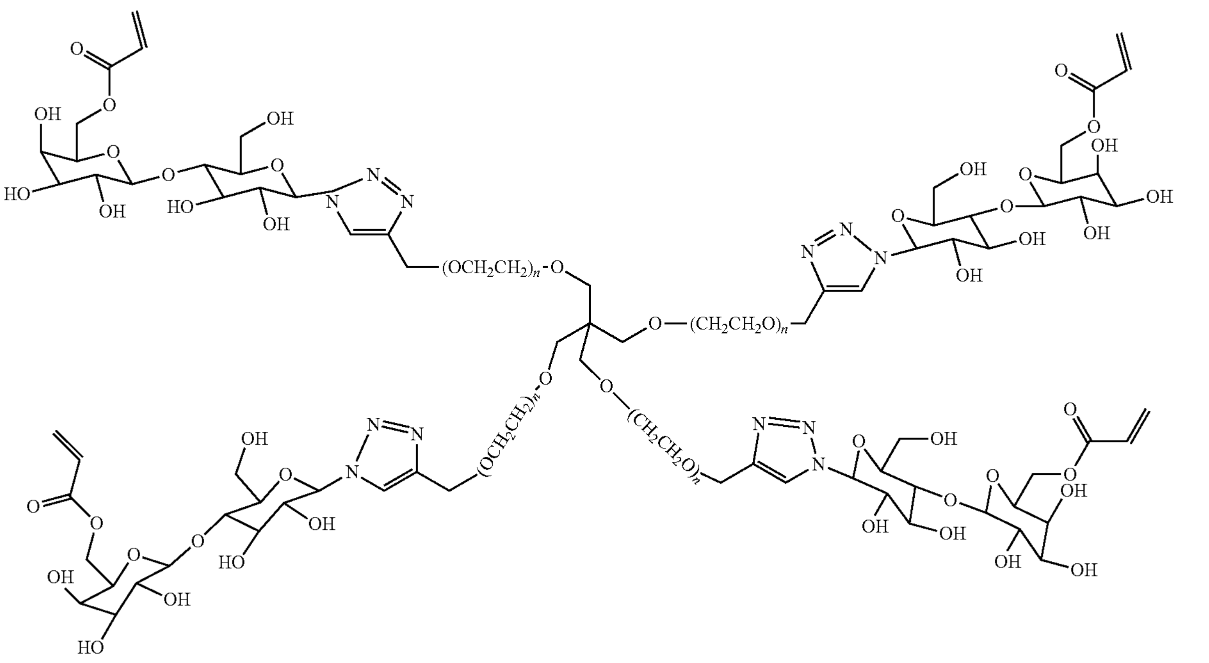

In some cases, each instance of n is independently an integer selected from 0 to 500. In some cases, each instance of n is independently an integer selected from 0 to 100. In some cases, each instance of n is independently an integer selected from 1 to 100. In some cases, each instance of n is independently an integer selected from 5 to 100. In some cases, each instance of n is independently an integer selected from 5 to 50. In some cases, each instance of n is independently an integer selected from 20 to 50. In some cases, each instance of n is independently an integer selected from 0 to 10. In some cases, each instance of m is independently an integer selected from 0 to 500. In some cases, each instance of m is independently an integer selected from 0 to 100. In some cases, each instance of m is independently an integer selected from 1 to 100. In some cases, each instance of m is independently an integer selected from 5 to 100. In some cases, each instance of m is independently an integer selected from 5 to 50. In some cases, each instance of m is independently an integer selected from 20 to 50. In some cases, each instance of m is independently an integer selected from 0 to 10.

In some embodiments, one or more polymer matrices comprise a polymerized form of a monomer, the monomer comprising: an oligomeric domain comprising three or more arms, wherein each arm of said oligomeric domain comprises a degradable functional group and a crosslinkable functional group, wherein the crosslinkable functional group of an arm of the three or more arms is configured to crosslink with another crosslinkable functional group of another polymer precursor in response to a first stimulus, thereby obtaining the polymerized form of the monomer, and wherein the degradable functional group is configured to be cleaved in response to a second stimulus, thereby solubilizing the polymerized form of the monomer.

In some embodiments, the oligomeric domain comprises four or more arms.

In some embodiments, the one or more polymer matrices comprise a degradable functional group. In some embodiments, the degradable function group comprises disulfide, Beta-thioether ester, Amidomethylol and vicinal diol, vicinal diol, alginate backbone, dextran backbone, chitosan backbone, hyaluronic acid backbone, chondroitin sulfate backbone, or carboxy methyl cellulose backbone, or a combination thereof. In some embodiments, the one or more polymer matrices comprise a hydrogel. In some embodiments, the hydrogel comprises cPEG, cSEL-BTEEC, cSEL-DHEBA, cSEL-diol, cSEL-alginate, cSEL-dextran, cSEL-chitosan, cSEL-hyaluronic acid, cSEL-chondroitin sulfate, or cSEL-cellulose, or a combination thereof. In some embodiments, the one or more polymer matrices comprise a degradation reagent. In some embodiments, the degradation reagent comprises DTT, TCEP, BME, GSH, DMEM, RPMI, PBS buffer, DMEM, RPMI, PBS buffer, sodium (meta)periodate, Alginate lyase (enzyme), Dextranase, Lysozyme and chitinase, Hyaluronidase, Chondroitinase, or Cellulases, or a combination thereof.

In some embodiments, the one or more polymer matrices comprise at least one beta-thioether ester. In some embodiments, the one or more polymer matrices comprise a PEG-moiety containing beta-thioether esters. In some embodiments, the beta-thioether ester is formed by reacting an acrylate with a thiol. In some embodiments, the or more polymer matrices degrade overnight in the presence of commonly used cell culture media, thereby providing a biocompatible degradation pathway for selective retention experiments. In some embodiments, the one or more polymer matrices comprise a Michael donor. In some embodiments, the Michael donor is PEG-thiol. In some embodiments, the one or more polymer matrices comprise a cSEL beta-thioether ester with one beta-thioether ester per arm. In some embodiments, the one or more polymer matrices comprises are formed from any material that comprises a PEG with a Michael acceptor chain. In some embodiments, the Michael acceptor chain comprises PEG-acrylamide, PEG-vinyl sulfone, PEG-maleimide, or PEG-carbonyl acrylic, or any combination thereof.

In some embodiments, the one or more polymer matrices are degradable by cleavage of disulfide bonds. In some embodiments, the disulfide bonds are cleavable by one or more reducing agents. In some embodiments, the one or more reducing agents comprise DTT, TCEP, BME, or GSH, or any combination thereof. In some embodiments, the one or more polymer matrices comprise one or more arms each comprising one or more amides. In some embodiments, the one or more polymer matrices are degradable by oxidative cleavage of vicinal diol by sodium (meta)periodate. In some embodiments, the method further comprises: (a) using a caging workflow, (b) performing selective retention of cells when used with cPEG or other hydrogel with orthogonal degradation mechanism, or (c) performing long-term cell incubation, using reducing agents in cell-culture media without affecting cage stability. As an illustrative example, a "caging workflow" can include loading a polymer precursor and one or more cells into a fluidic device, projecting light into the fluidic device with a spatial energy modulating element (for example a digital micromirror device) such that the projected light causes crosslinking of the polymer precursor to at least partially form one or more cages or chambers enclosing at least a subset of the one or more cells. The one or more cages or chambers may be formed at positions identified by a detector, for example at positions surrounding at least the subset of the one or more cells.

In some embodiments, the one or more polymer matrices comprise a vicinal diol functionality that can be cleaved via oxidation of one or more hydroxyls. In some embodiments, the one or more polymer matrices are used to formulate a stable hydrogel. In some embodiments, the one or more polymer matrices comprise a polymerized form of a photo-cleavable 4-arm PEG-monomer. In some embodiments, the one or more polymer matrices are photodegradable via ortho-nitrobenzyl moiety. In some embodiments, the one or more polymer matrices comprises a polymerized form of a Coumarin-based photodegradable monomer. In some embodiments, the one or more polymer matrices comprise a 4-arm PEG-acrylamide comprising one or more disulfides. In some embodiments, the one or more polymer matrices comprise one or more cage disulfide bonds in a hydrogel cage formation, wherein the hydrogel cages degrade using light and a photoinitiator. In some embodiments, the one or more polymer matrices enables hydrogel formation, and wherein the hydrogel enables spatiotemporal control of hydrogel cage degradation, therefore enabling selective retention of cells with a single hydrogel formulation. In some embodiments, the one or more polymer matrices enable hydrogel formation, and wherein the hydrogel enables the ability to selectively degrade cages and release their contents using light and photoinitiator as a reagents.

In some embodiments, the one or more polymer precursors enable formation of a hydrogel up to 2 mm thick, and wherein the hydrogel can be degraded in 120 s at low light intensity (e.g., 10 $mW/cm^2$ at 265 nm from the light source or about 50 to 1000 $mW/cm^2$ or about 100 to 70 $mW/cm^2$ at the fluidic device).

In some embodiments, upon exposure to light, photogenerated radicals that initial multiple fragmentation and disulfide exchange reactions, thereby permitting and promoting photodeformation, photowelding and photodegradation of the one or more polymer matrices.

In some embodiments, the one or more polymer precursors enable hydrogel formation, wherein the hydrogel exhibits a chemical or physical change in response to an external stimulus.

In some embodiments, the one or more polymer matrices comprise a photolabile nitrobenzyl ester which lyses upon photon absorption, thereby allowing a user to exogenously control degradation of the one or more polymer matrices.

In some embodiments, the one or more polymer Precursors enable hydrogel formation, and wherein the method further comprises controlling a network degradation of the hydrogel by concentration of a photoinitatior infused in the hydrogel.

In some embodiments, the one or more polymer precursors comprise thiol groups that are quenched after formation of the one or more polymer matrices.

In some embodiments, a higher concentration of bis-acrylamide in the one or more polymer matrices leads to a greater pore size.

In some embodiments, the degradation of the one or more polymer matrices is dependent upon a type of encapsulated cells, a cell number, or a fraction of disulfide moieties present in the one or more polymer matrices. In some embodiments, a grafting efficiency of one or more polymer matrices is at least 90%, 91%, 92%, 93%, 94%, 95%, 96%, 97%, 98%, or 99%.

FIG. 2A illustrates the effect of concentration of a buffer in the polymer matrix precursor solution on the speed of degradation of the polymer matrix. FIG. 2A illustrates the effect of concentration of a buffer in the cPEG precursor solution on the speed of degradation of the hydrogel. In the example of FIG. 2A, a degradation reagent that is also cell compatible is used. In some embodiments, the degradation reagent comprises glutathione ("GSH"). Further, the example of FIG. 2A illustrates the lysis of 10% cPEG gels by GSH at 1 mM and 10 mM in Tris pH 8.6. In some embodiments, increasing the concentration of the degradation reagent (e.g., GSH) decreases the Gel lysis time. As shown in the example of FIG. 2A, increasing the concentration of GSH from 1 mM to 10 mM in the working solution (e.g., precursor solution) decreases the Gel lysis time (min) for 2 s cages from 18 minutes to 2 minutes respectively. Further shown in the example of FIG. 2A, increasing the concentration of GSH from 1 mM to 10 mM in the working solution (e.g., precursor solution) decreases the Gel lysis time (min) for 4 s cages from 24 minutes to 2.5 minutes, respectively.

FIG. 2B illustrates the lysis of a polymer matrix by a degradation reagent in buffer of varying pH. The example of FIG. 2B illustrates the lysis of 10% cPEG gels by 10 mM GSH and 10 mM in Tris pH 8.0 and 8.6. In some embodiments, decreasing the pH of the working solution (e.g., precursor solution) increases the time of Gel lysis. As shown in the example of FIG. 2B, decreasing the working solution pH from 8.6 to 8.0 in the working solution (e.g., precursor solution) increases the Gel lysis time (min) for 2 s cages from 2 minutes to 4 minutes, respectively. Further shown in the example of FIG. 2B, decreasing the working solution pH from 8.6 to 8.0 in the working solution (e.g., precursor solution) increases the Gel lysis time (min) for 4 s cages from 2.5 minutes to 5 minutes, respectively.

In some embodiments, one or more polymer precursors are in a solution having a pH of at least 8.0.

FIG. 3 illustrates the lysis of a polymer matrix by a degradation reagent in buffer of varying pH. The example of FIG. 3 illustrates the lysis of 10% cPEG gels by 10 mM GSH in RPMI1640 Cellular medium/PBS with adjustment of pH. In some embodiments, increasing the pH of the working solution (e.g., precursor solution) decreases the time of Gel lysis. As shown in the example of FIG. 3, increasing the working solution pH from 6.8 to 8.1 in the working solution (e.g., precursor solution) decreases the Gel lysis time (min) for 2 s cages from 80 minutes to 4 minutes, respectively. Further shown in the example of FIG. 3, increasing the working solution pH from 7.5 to 8.1 in the working solution (e.g., precursor solution) decreases the Gel lysis time (min) for 4 s cages from 17 minutes to 5 minutes, respectively.

Figure 4A:
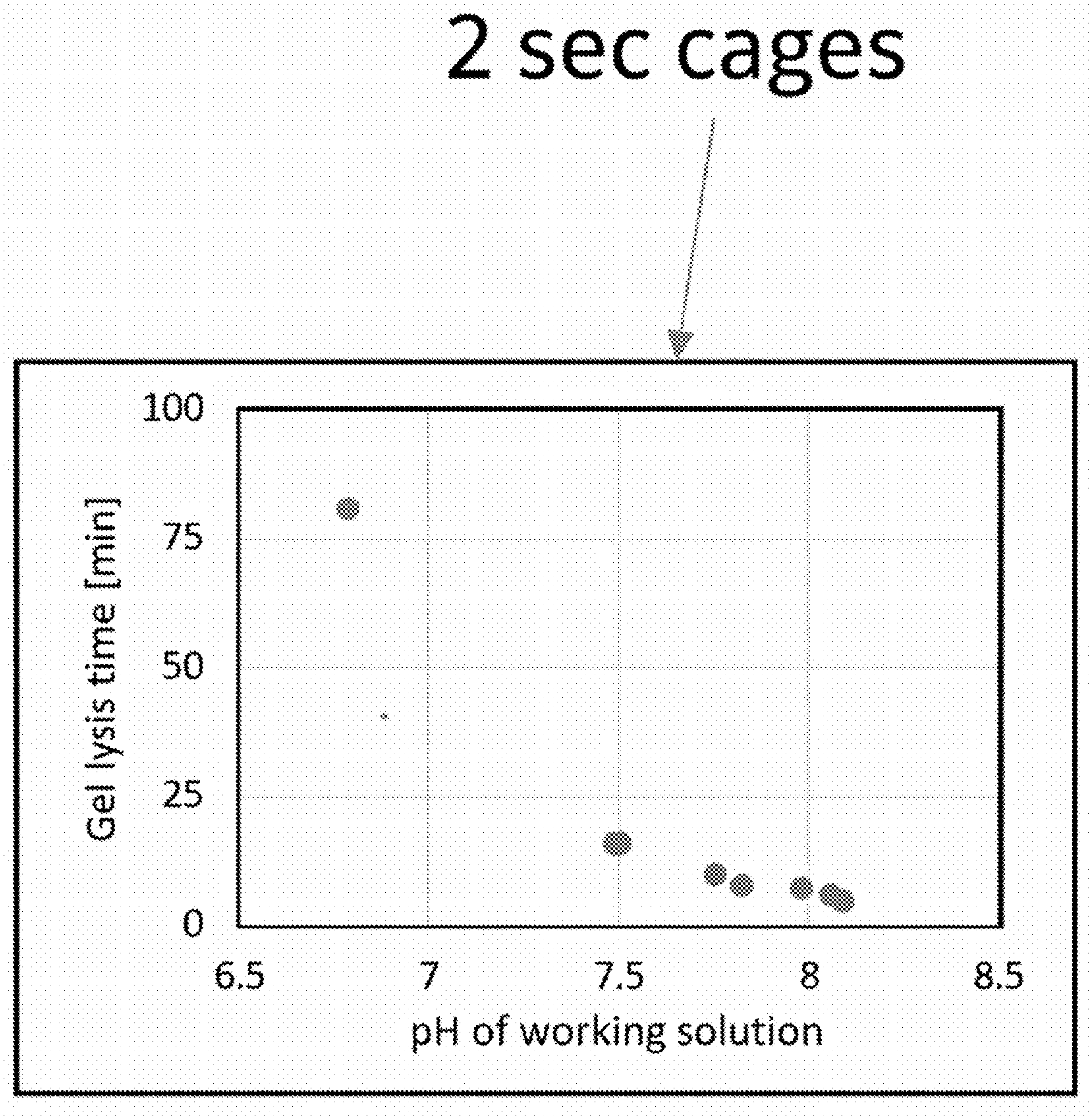
FIG. 4A is an illustrative graph comparing the gel lysis time in min on the Y-axis to the pH of the working solution on the X-axis for a representative polymer matrix, according to some embodiments.

FIG. 4A is an illustrative graph comparing the gel lysis time in min on the Y-axis to the pH of the working solution on the X-axis for a representative polymer matrix. FIG. 4A is an illustrative graph comparing the gel lysis time in min on the Y-axis to the pH of the working solution on the X-axis for 2 S cages. In the example of FIG. 4A, the lysis of 10% cPEG gels by 10 mM GSH in RPMI1640 Cellular medium/PBS with adjustment of pH is shown. In some embodiments, increasing the pH of the working solution (e.g., precursor solution) decreases the time of Gel lysis. Furthermore, as shown in the example of FIG. 4A, an optimal pH range of the working solution for 2 s cages may comprise between about pH 7.5 to about pH 8.1. In certain embodiments, the gel lysis time between about pH 7.5 to about pH 8.1 may comprise at most about 15 minutes for 2 s cages.

Figure 4B:
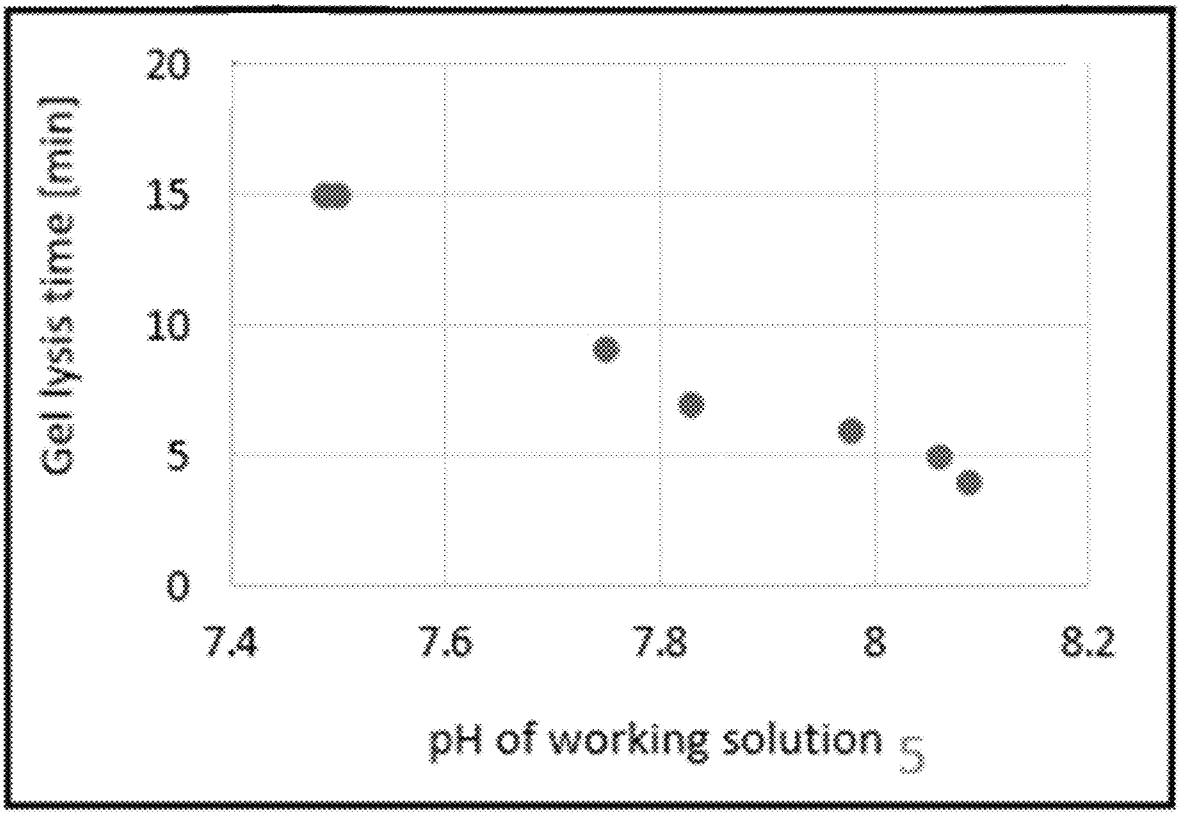
FIG. 4B is an illustrative graph comparing the gel lysis time in min on the Y-axis to the pH of the working solution on the X-axis for a representative polymer matrix, according to some embodiments.

FIG. 4B is an illustrative graph comparing the gel lysis time in min on the Y-axis to the pH of the working solution on the X-axis for a representative polymer matrix. FIG. 4B is an illustrative graph comparing the gel lysis time in min on the Y-axis to the pH of the working solution on the X-axis for 4 S cages. In the example of FIG. 4B, the lysis of 10% cPEG gels by 10 mM GSH in RPMI1640 Cellular medium/PBS with adjustment of pH is shown. In some embodiments, increasing the pH of the working solution (e.g., precursor solution) decreases the time of Gel lysis. Furthermore, as shown in the example of FIG. 4B, an optimal pH range of the working solution for 4 s cages may comprise between about pH 7.8 to about pH 8.1. In certain embodiments, the gel lysis time between about pH 7.8 to about pH 8.1 may comprise at most about 10 minutes for 4 s cages.

A polymer precursor can comprise a porogen. As used herein, the term "porogen" can denote a species that modulates the porosity of a polymer matrix. A porogen can be dispersed with the reactants before the polymerization process of forming the polymer matrix. Porogens typically diffuse out of polymer matrices following polymerization, leaving pores in the regions that they occupied. Porogen size, concentration, hydrophobicity, and hydrophilicity can thus influence pore density and pore size in polymer matrices. Examples of porogens consistent with the present disclosure include particles (e.g., polymeric, ceramic, metal, metal oxide, or hydrogel particles), polymers such as polyethylene glycol and alginate, and vesicles such as liposomes or micelles.

Figure 7:
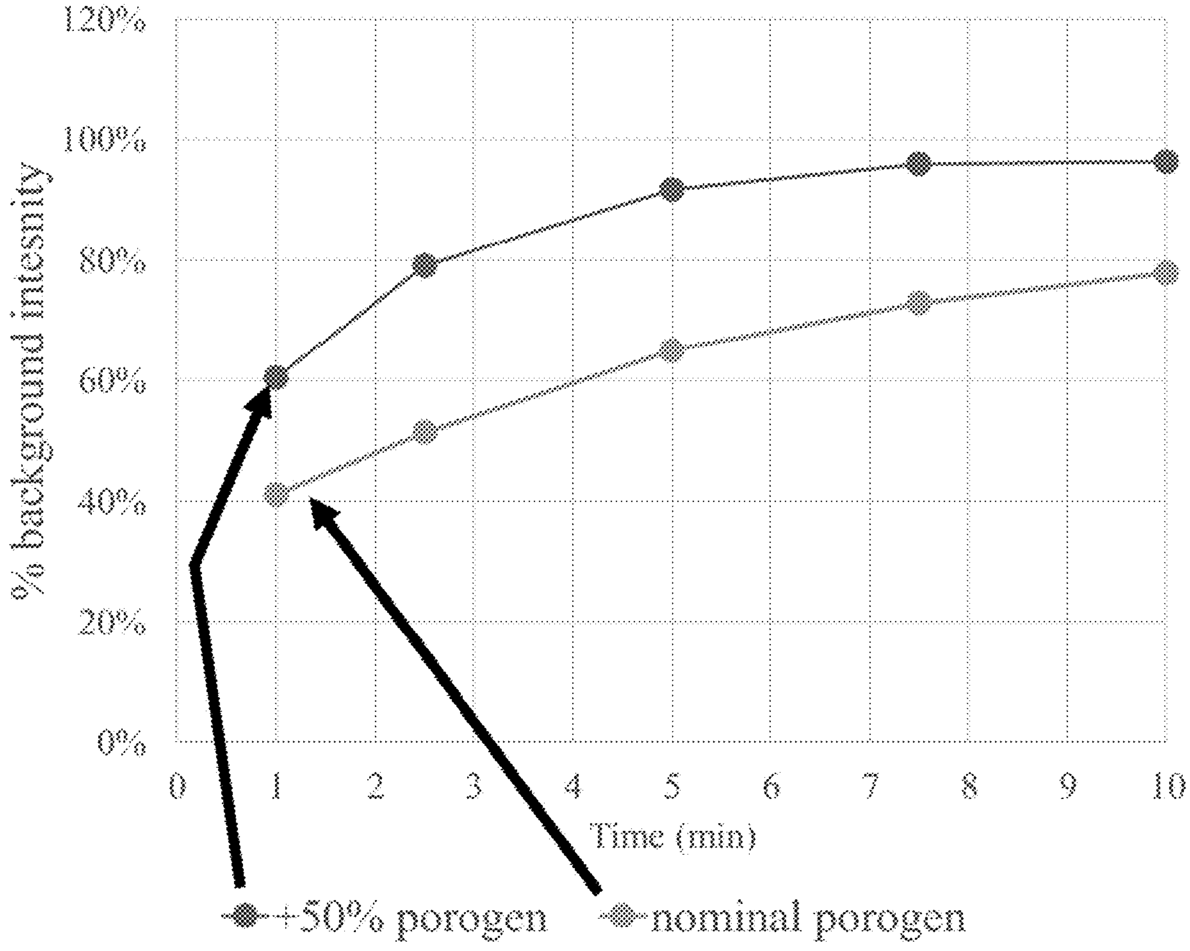
FIG. 7 is an illustrative graph comparing the % background intensity on the Y-axis to the time (min) for diffusion of CD56 PE (dye labeled antibody) through a polymer matrix on the X-axis, according to some embodiments.

FIG. 7 is an illustrative graph comparing the percentage background intensity on the Y-axis to the time (min) of diffusion for one or more biological components into a polymer matrix on the X-axis. FIG. 7 is an illustrative graph comparing the percentage background intensity on the Y-axis to the time (min) of diffusion for one or more biological components into a hydrogel cage on the X-axis. In the example of FIG. 7, the biological component may comprise CD56 PE (a dye labeled antibody). As shown in FIG. 7, a first porogen loaded working solution 701 was compared to a second porogen loaded working solution 702. In the example of FIG. 7, porogen loaded working solution 702 comprises 50% more porogen by volume than porogen loaded working solution 702. As shown in FIG. 7, increasing the porogen loading in the working solution increases the rate of diffusion of CD56 PE into the cages. Furthermore, in certain embodiments, increases the porogen loading may increase the pore size of the cages.

Figure 8A:
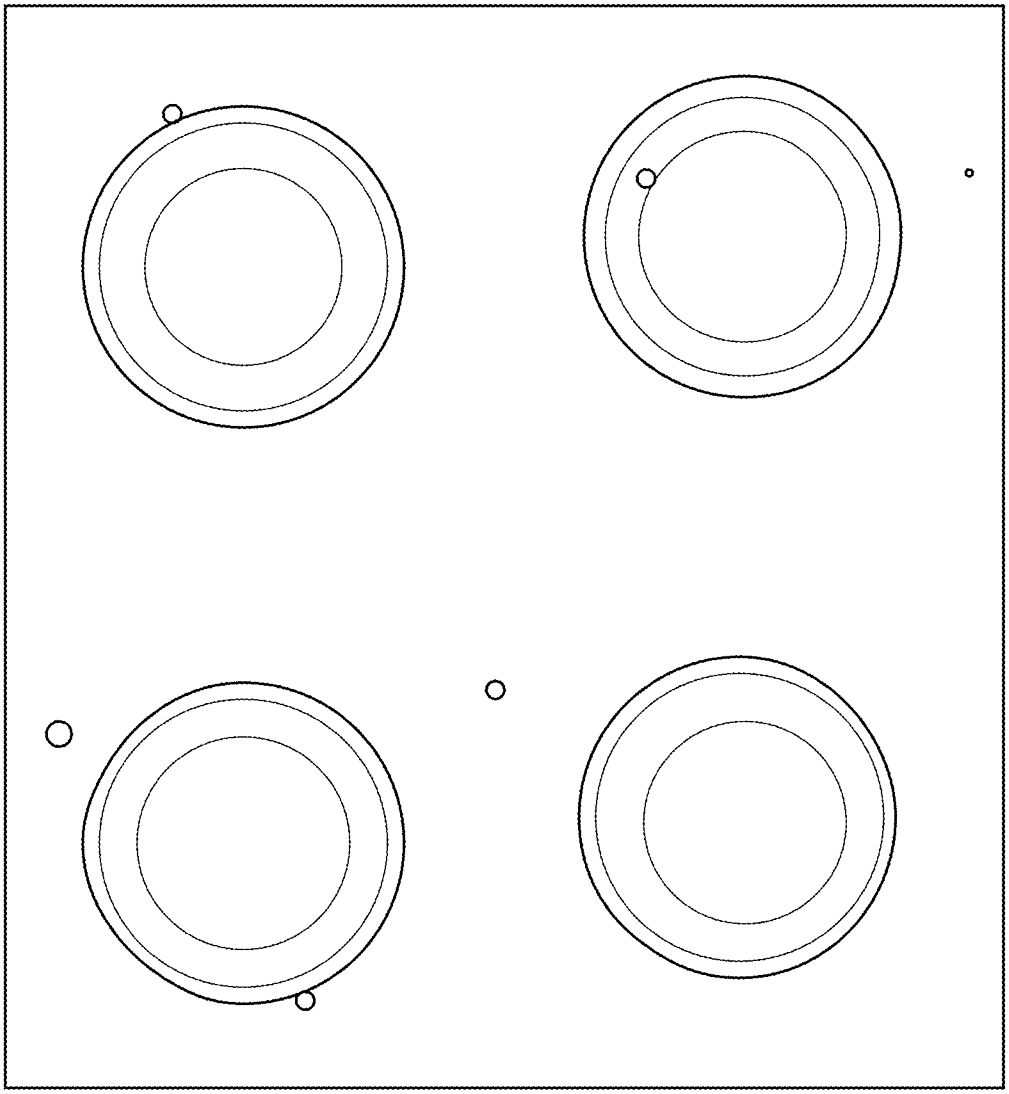
FIG. 8A-8D show illustrative examples of a micrograph of polymer matrix compartments encapsulation of one or more biological components in a flow cell, according to some embodiments.
Figure 8B:
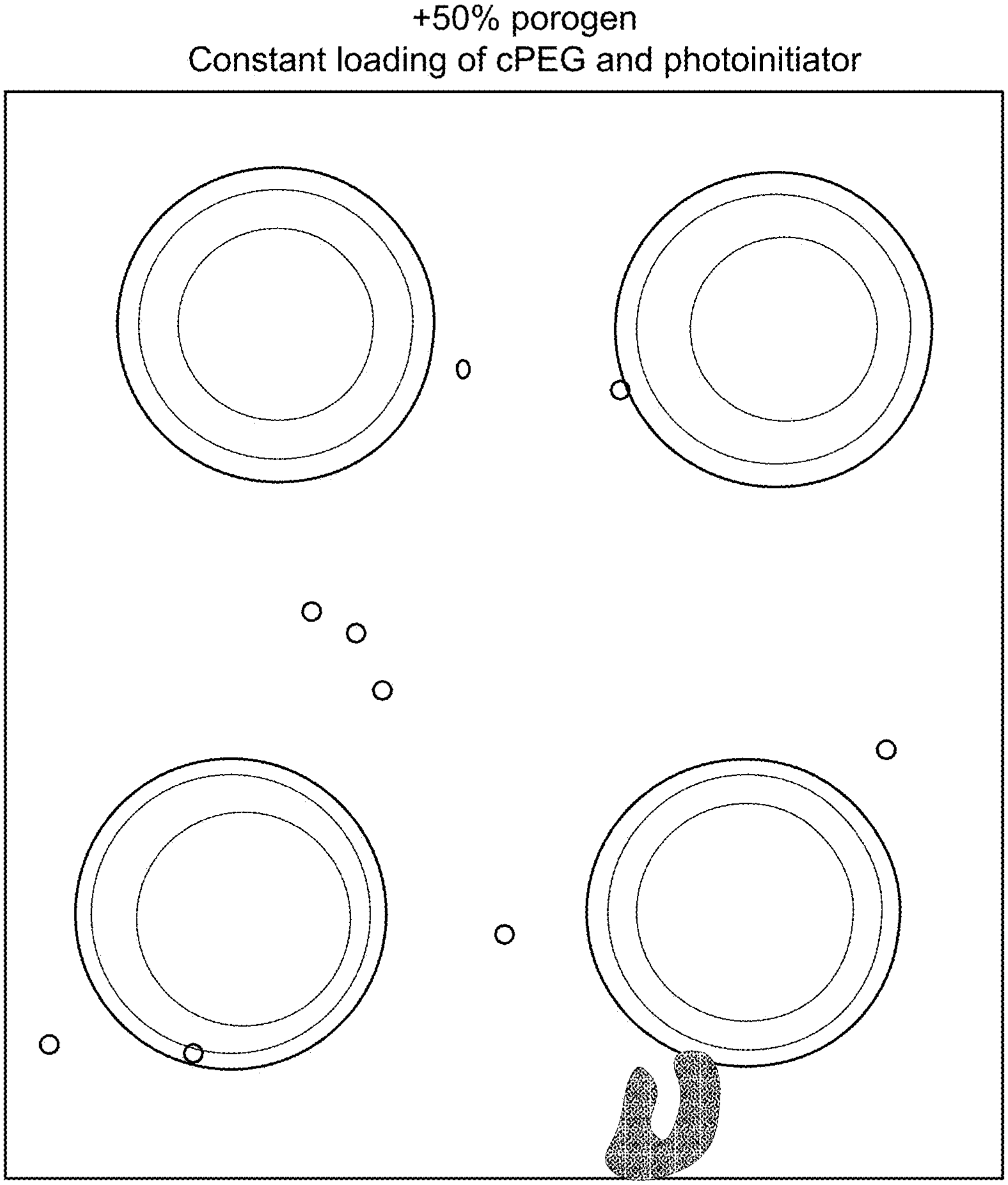
Figure 8C:
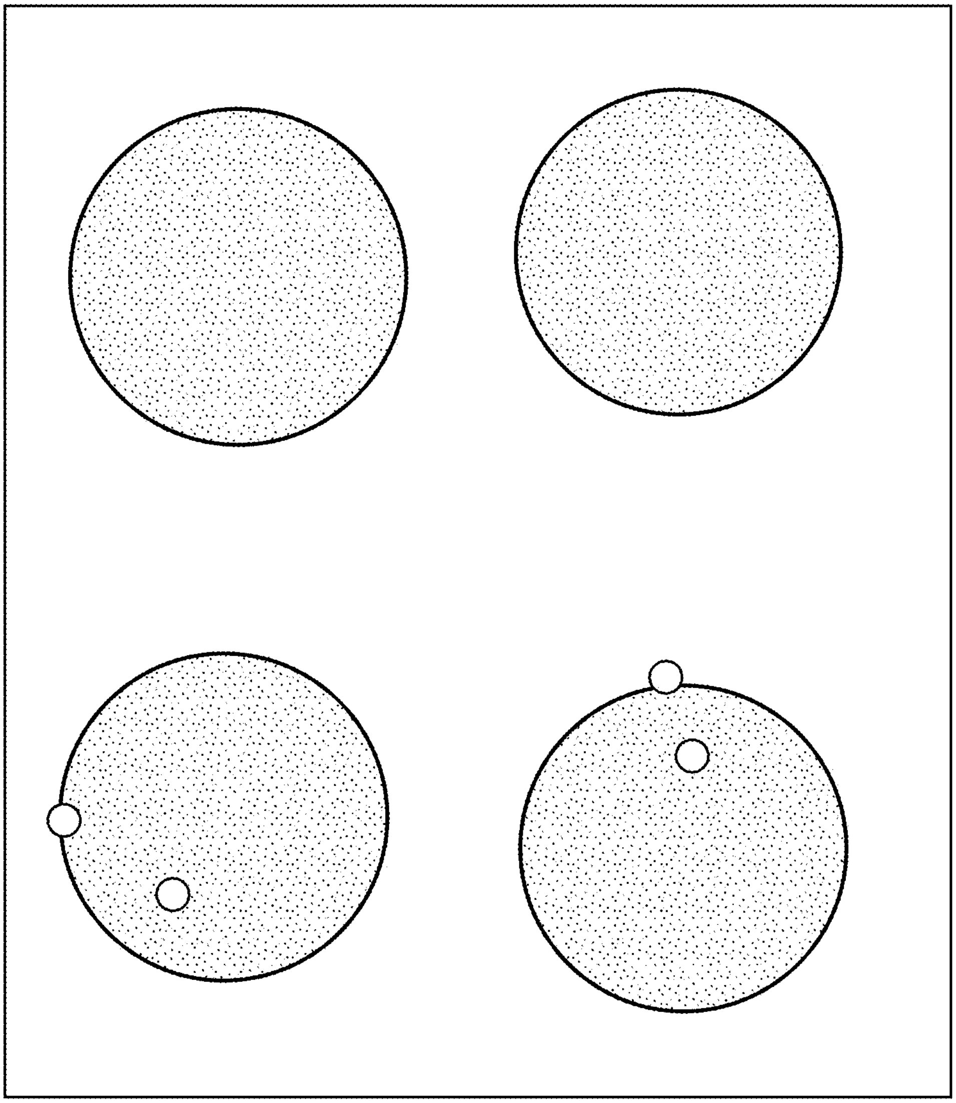
Figure 8D:
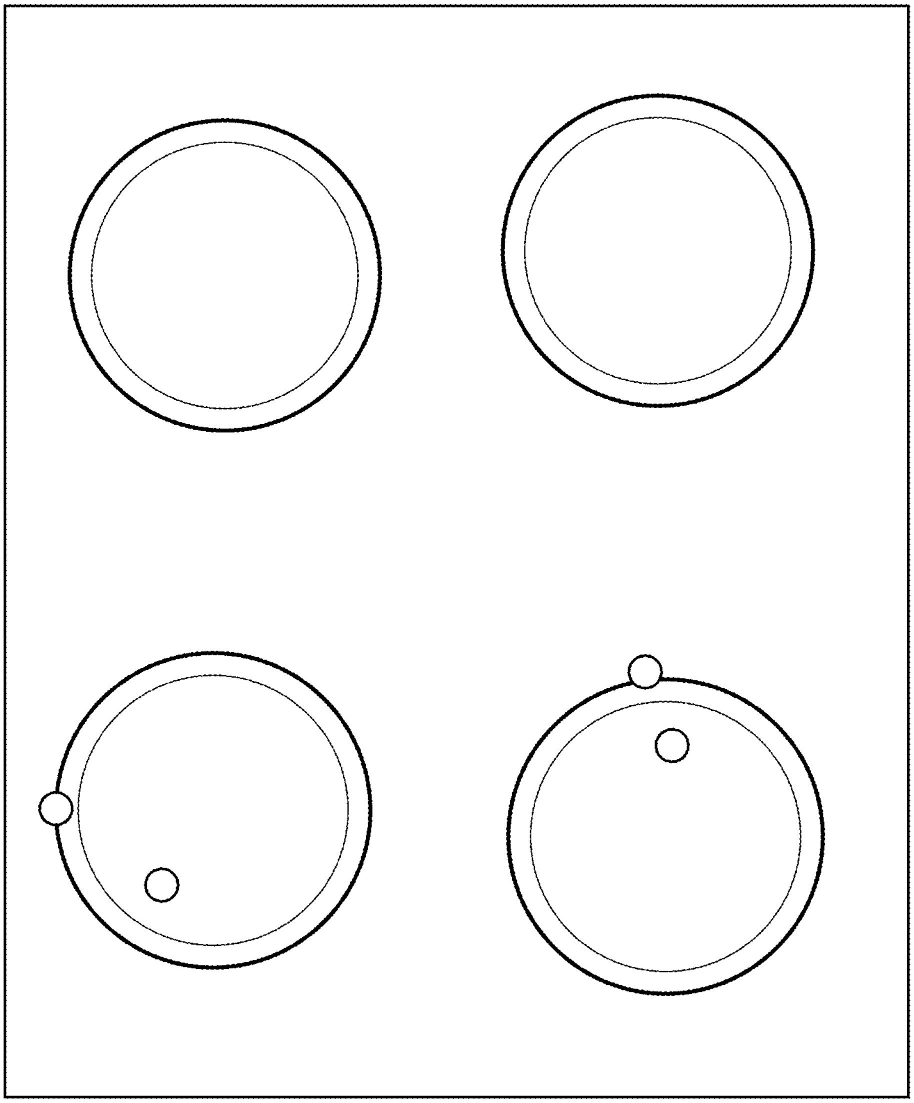

FIG. 8A-8D show illustrative examples of a micrograph of polymer matrix compartments encapsulation of one or more biological components in a flow cell. FIG. 8A-8D show illustrative examples of a micrograph of polymer matrix compartments encapsulation of one or more biological components in a flow cell. In the example of FIG. 8A, the precursor solution comprised nominal porogen (e.g., first porogen loaded working solution 701), and was used to create hydrogel cages. In the example of FIG. 8B, the precursor solution comprised 50% more porogen (e.g., second porogen loaded working solution 702), and was used to create hydrogel cages that were comparable to those used to form the hydrogel cages in FIG. 8A. The example of FIG. 8C is an illustrative example of a plurality of hydrogel cages 1 minute after addition of CD56PE (a dye labeled antibody) external to the hydrogel cages at a concentration of about 30 μL/mL, wherein the hydrogel cages were made with a precursor solution that comprised nominal porogen (e.g., first porogen loaded working solution 701). The example of FIG. 8D, is an illustrative example of a plurality of hydrogel cages 10 minutes after addition of CD56PE external to the hydrogel cages at a concentration of about 30 μL/mL, wherein the precursor solution comprises nominal porogen (e.g., first porogen loaded working solution 701). As shown in FIG. 8C, the interior portion of the cages were dark, indicating that there was little to no fluorescence from the CD56 PE in the interior portion of the cages, and the interstitial space outside of the cages are bright indicating the presence of CD56 PE. As shown in FIG. 8D, the interior portion of the cages are bright indicating the fluorescence from the CD56 PE in the interior portion of cages. After 10 minutes, a measurable amount of CD56 PE diffused through the pores of the hydrogel cages. Thus, CD56 PE fluorescence was observed in the interstitial space outside of the cages and inside of the cages as illustrated by the bright background portions in FIG. 8D. It is worthwhile to note that the walls of the hydrogel chambers form dark rings indicating a low level of CD56 PE.

FIG. 9A-9B show illustrative examples of precursor solution composition by volume for formation of polymer matrix compartments configured to encapsulate of one or more biological components in a flow cell. FIG. 9A-9B show illustrative examples of precursor solution composition by volume for formation of polymer matrix compartments configured to encapsulate of one or more biological components in a flow cell.

In the example of FIG. 9A, a first porogen loaded working solution 701 composition is shown. In certain embodiments, the first porogen loaded working solution 701 comprises about 21 μL of 20% w/v cPEG stock solution, about 6 μL of Porogen stock solution (25% w/v), and about 9 μL of phosphate-buffered saline (PBS). In certain embodiments, the first porogen loaded working solution 701 comprises a total volume of about 36 μL. In certain embodiments, the first porogen loaded working solution 701 comprises about 58.3% by volume cPEG stock solution, about 16.7% by volume of Porogen stock solution (25% w/v), and about 25% by volume of PBS.

In the example of FIG. 9A, a second porogen loaded working solution 702 composition is shown. In certain embodiments, the second porogen loaded working solution 702 comprises about 21 μL of 20% w/v cPEG stock solution, about 9 μL of Porogen stock solution (25% w/v), and about 6 μL of PBS. In certain embodiments, the first porogen loaded working solution 701 comprises a total volume of about 36 μL. In certain embodiments, the second porogen loaded working solution 702 comprises about 58.3% by volume cPEG stock solution, about 25% by volume of Porogen stock solution (25% w/v), and about 16.7% by volume of PBS.

FIG. 9B show an illustrative example of precursor solution composition by volume for formation of polymer matrix compartments configured to encapsulate of one or more biological components in a flow cell. In the example of FIG. 9B, the precursor solution 901 comprises about 30% by volume of the first porogen loaded working solution 701, and about 20% by volume of the second porogen loaded working solution 702 and about 50% by volume of PBS. In the example of FIG. 9B, the precursor solution 1001 comprises about 36 μL of the first porogen loaded working solution 701, and about 24 μL of the second porogen loaded working solution 702 and about 60 μL of PBS. In the example of FIG. 9B, the precursor solution 1001 comprises about 120 μL of total volume.

cPEG Concentration

Figure 10A:
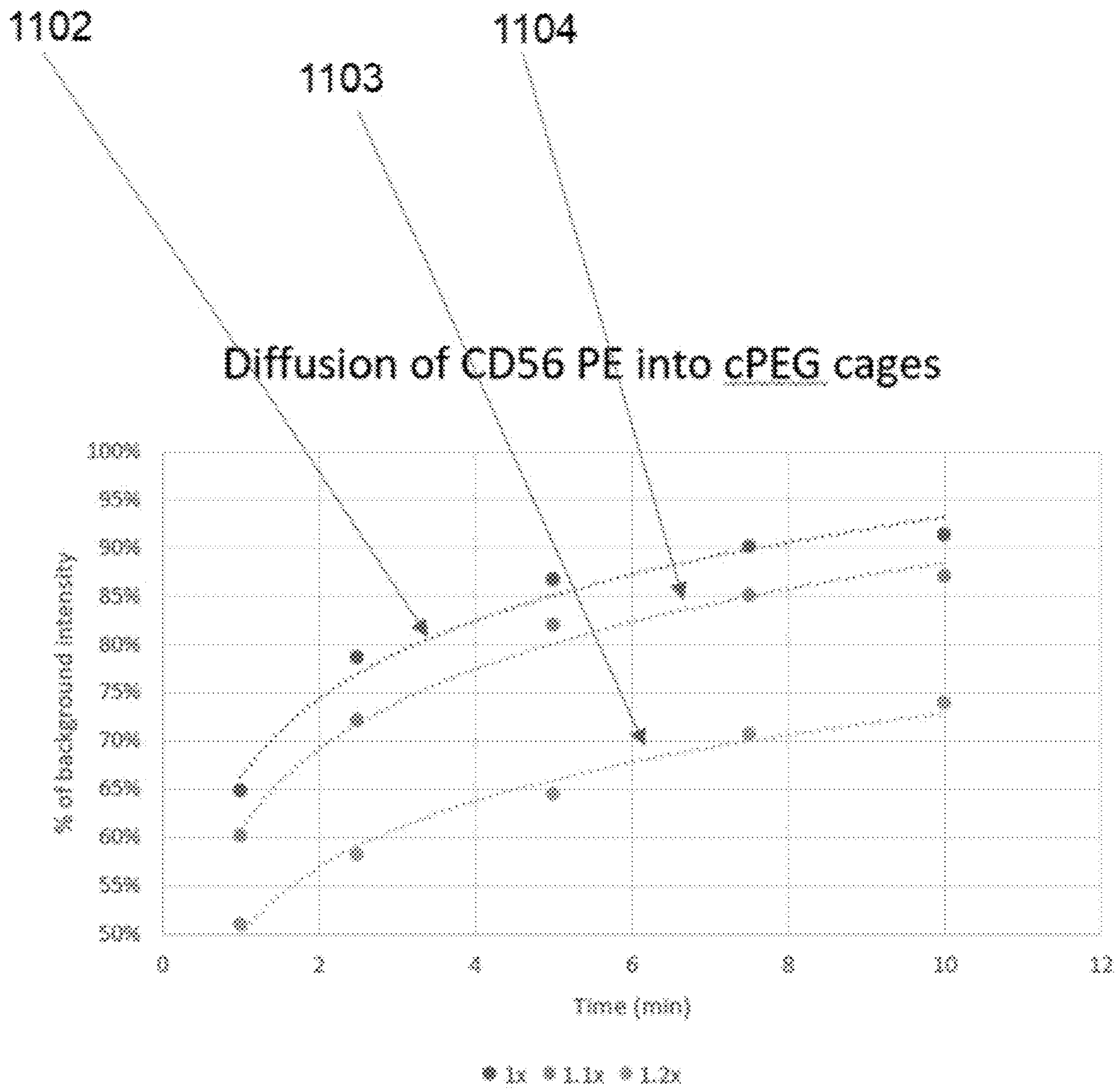
FIG. 10A is an illustrative graph comparing the % background intensity on the Y-axis to the time (min) for diffusion of CD56 PE into a polymer matrix on the X-axis, according to some embodiments.

FIG. 10A is an illustrative graph comparing the % background intensity on the Y-axis to the time (min) of diffusion of one or more biological components into a polymer matrix on the X-axis. FIG. 10A is an illustrative graph comparing the % background intensity on the Y-axis to the time (min) of diffusion of one or more biological components into a hydrogel cage on the X-axis. In the example of FIG. 10A, a plurality of cPEG loaded solutions are charted comparing the % background intensity on the Y-axis to the time (min) of diffusion of one or more biological components into a hydrogel cage on the X-axis. In certain embodiments, the plurality of cPEG loaded solutions comprises a second cPEG loaded solution 1102, a third cPEG loaded solution 1103 and a fourth cPEG loaded solution 1104.

Figure 10B:
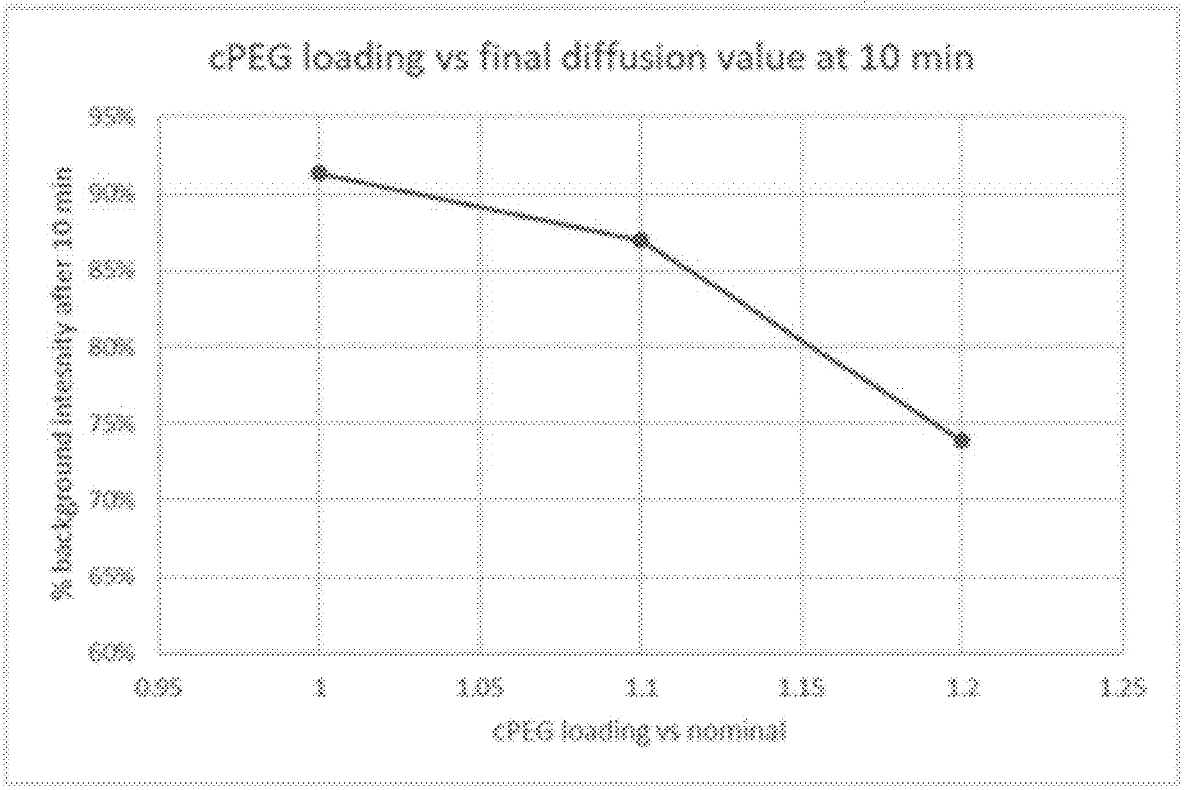
FIG. 10B is an illustrative graph comparing the % background intensity at a set time interval on the Y-axis to the concentration of a polymer precursor stock solution on the X-axis, according to some embodiments.

FIG. 10B is an illustrative graph comparing the % background intensity at a set time interval on the Y-axis to the concentration of a polymer precursor stock solution on the X-axis, according to some embodiments;

FIG. 10B is an illustrative graph comparing the % background intensity at 10 min on the Y-axis to the concentration of cPEG stock solution on the X-axis. As shown by the graph 1050 in FIG. 10B, increasing the cPEG loading concentration decreases the diffusion of the biological component into the hydrogel cage at 10 min.

FIG. 11 shows illustrative examples of precursor solution compositions by volume for formation of polymer matrix compartments configured to encapsulate of one or more biological components in a flow cell, according to some embodiments.

More specifically, FIG. 11 shows illustrative examples of four polymer precursor solution compositions by volume. These polymer precursor solution compositions can be used to form polymer matrix compartments to encapsulate one or more biological components (e.g., prokaryotic or eukaryotic cells) in a flow cell. In the example of FIG. 11, a four cPEG loaded solutions are shown, namely a first cPEG loaded solution 1101, a second cPEG loaded solution 1102, a third cPEG loaded solution 1103 and a fourth cPEG loaded solution 1104. Each solution contained a small amount of beads that were used as reference structures during imaging.

In certain embodiments, the second cPEG loaded solution 1102 comprises a nominal concentration of cPEG stock solution (20% w/v). In further embodiments, the first cPEG loaded solution 1102 comprises about 0.75× the concentration of cPEG stock solution (20% w/v) as the second cPEG loaded solution 1102. In further embodiments, the third cPEG loaded solution 1103 comprises about 1.1× the concentration of cPEG stock solution (20% w/v) as the second cPEG loaded solution 1102. In further embodiments, the fourth cPEG loaded solution 1104 comprises about 1.2× the concentration of cPEG stock solution (20% w/v) as the second cPEG loaded solution 1102.

In the example of FIG. 11, the first cPEG loaded working solution 1101 comprises a total volume of about 120.6 μL. In certain embodiments, the first cPEG loaded working solution 1101 comprises a volume of about 14.6 μL of cPEG stock solution (20% w/v), a volume of about 6.00 μL of Porogen stock solution (e.g., 25% w/v), a volume of about 12.0 μL of LAP solution (3 mg/mL), a volume of about 87.4 μL of PBS buffer, and a volume of about 0.6 μL of beads.

In the example of FIG. 11, the second cPEG loaded working solution 1103 comprises a total volume of about 120.6 μL. In certain embodiments, the second cPEG loaded working solution 1102 comprises a volume of about 19.5 μL of cPEG stock solution (20% w/v), a volume of about 6.00 μL of Porogen stock solution (e.g., 25% w/v), a volume of about 12.0 μL of LAP solution (3 mg/mL), a volume of about 82.65 μL of PBS buffer, and a volume of about 0.6 μL of beads.

In the example of FIG. 11, the third cPEG loaded working solution 1104 comprises a total volume of about 120.7 μL. In certain embodiments, the third cPEG loaded working solution 1103 comprises a volume of about 21.5 μL of cPEG stock solution (20% w/v), a volume of about 6.00 μL of Porogen stock solution (e.g., 25% w/v), a volume of about 12.0 μL of LAP solution (3 mg/mL), a volume of about 80.6 μL of PBS buffer, and a volume of about 0.6 μL of beads.

In the example of FIG. 11, the fourth cPEG loaded working solution 1104 comprises a total volume of about 120.6 μL. In certain embodiments, the fourth cPEG loaded working solution 1104 comprises a volume of about 23.4 μL of cPEG stock solution (20% w/v), a volume of about 6.00 μL of Porogen stock solution (e.g., 25% w/v), a volume of about 12.0 μL of LAP solution (3 mg/mL), a volume of about 78.6 μL of PBS buffer, and a volume of about 0.6 μL of beads.

Another aspect of the present disclosure provides a flow cell for sequencing a gene, comprising: a plurality of cells, a plurality of nanowells, and one or more polymer precursors; wherein a polymer matrix is formed from said one or more polymer precursors in less than 10 seconds following contact of said one or more polymer precursors with energy. In some embodiments, the fluidic device is a microfluidic device or a nanofluidic device. In some embodiments, the fluidic device comprises a sequencing flow cell. In some embodiments, the fluidic device is used for nucleic acid sequencing. In some embodiments, the biological component comprises a cell, a nucleic acid, a microbiome, a protein, a combination of cells, a spatially-linked biological component, or a metabolite. In some embodiments, the cell is an animal cell (e.g., a human cell), a plant cell, a fungal cell, a bacterial cell, a tumor spheroid, or a combination thereof. In some embodiments, the nucleic acid is DNA of 100 base pairs or greater or RNA of 50 bases or greater.

In some embodiments, the fluidic device may be a flow cell. For example, the fluidic device may be used for sequencing (e.g., DNA or RNA sequencing). In some embodiments, the fluidic device may be a microfluidic device. In certain embodiments, the fluidic device may be a nanofluidic device.

Figure 13:
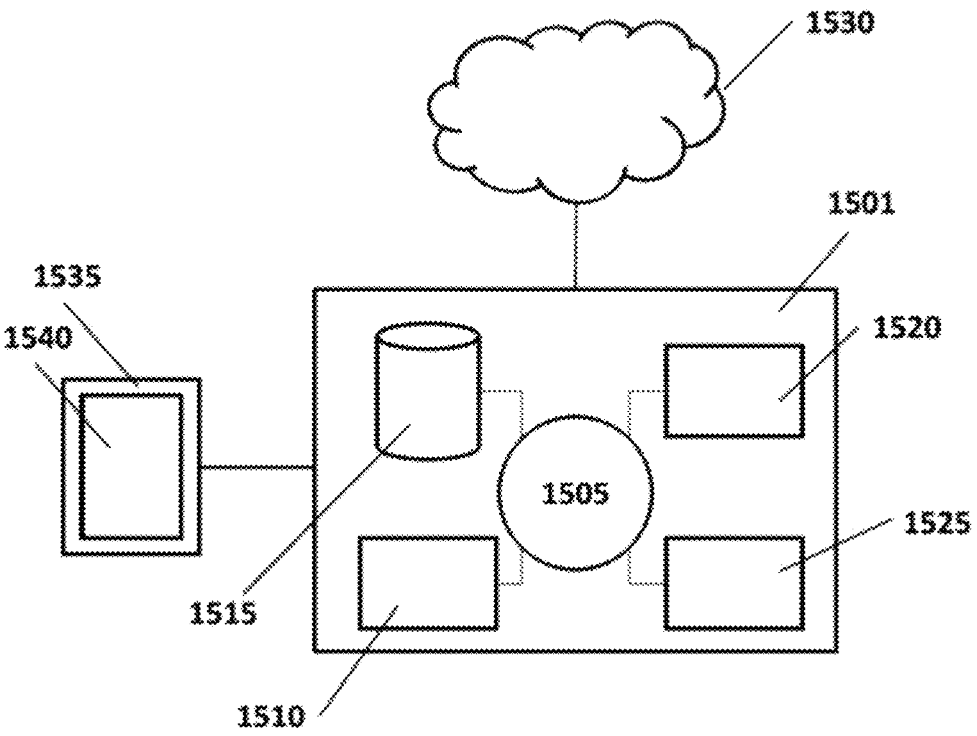
FIG. 13 shows a computer system that is programmed or otherwise configured to implement methods provided herein, according to some embodiments.

The present disclosure provides computer systems that are programmed to implement methods of the disclosure. FIG. 13 shows a computer system 1501 that may be programmed or otherwise configured to perform methods described herein. The computer system 1501 can regulate various aspects of the present disclosure, such as, for example, identifying a biological component, detecting a barcode, generating a spatial modulating element (e.g., a mask), providing energy from an energy source, or detecting or measuring a local parameter using a sensor. The detector may be a camera (e.g., a fluorescent camera). The computer system 1501 can be an electronic device of a user or a computer system that may be remotely located with respect to the electronic device. The electronic device can be a mobile electronic device.

The computer system 1501 includes a central processing unit (CPU, also "processor" and "computer processor" herein) 1505, which can be a single core or multi core processor, or a plurality of processors for parallel processing. The computer system 1501 also includes memory or memory location 1510 (e.g., random-access memory, read-only memory, flash memory), electronic storage unit 1515 (e.g., hard disk), communication interface 1520 (e.g., network adapter) for communicating with one or more other systems, and peripheral devices 1525, such as cache, other memory, data storage and/or electronic display adapters. The memory 1510, storage unit 1515, interface 1520 and peripheral devices 1525 are in communication with the CPU 1505 through a communication bus (solid lines), such as a motherboard. The storage unit 1515 can be a data storage unit (or data repository) for storing data. The computer system 1501 can be operatively coupled to a computer network ("network") 1530 with the aid of the communication interface 1520. The network 1530 can be the Internet, an internet and/or extranet, or an intranet and/or extranet that may be in communication with the Internet. The network 1530 in some cases may be a telecommunication and/or data network. The network 1530 can include one or more computer servers, which can enable distributed computing, such as cloud computing. The network 1530, in some cases with the aid of the computer system 1501, can implement a peer-to-peer network, which may enable devices coupled to the computer system 1501 to behave as a client or a server.

The CPU 1505 can execute a sequence of machine-readable instructions, which can be embodied in a program or software. The instructions may be stored in a memory location, such as the memory 1510. The instructions can be directed to the CPU 1505, which can subsequently program or otherwise configure the CPU 1505 to implement methods of the present disclosure. Examples of operations performed by the CPU 1505 can include fetch, decode, execute, and writeback.

The CPU 1505 can be part of a circuit, such as an integrated circuit. One or more other components of the system 1501 can be included in the circuit. In some cases, the circuit may be an application specific integrated circuit (ASIC).

The storage unit 1515 can store files, such as drivers, libraries, and saved programs. The storage unit 1515 can store user data, e.g., user preferences and user programs. The computer system 1501 in some cases can include one or more additional data storage units that are external to the computer system 1501, such as located on a remote server that may be in communication with the computer system 1501 through an intranet or the Internet.

The computer system 1501 can communicate with one or more remote computer systems through the network 1530. For instance, the computer system 1501 can communicate with a remote computer system of a user (e.g., a laptop, a personal computer, a tablet, or a mobile phone). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1501 via the network 1530.

Methods as described herein can be implemented by way of machine (e.g., computer processor) executable code stored on an electronic storage location of the computer system 1501, such as, for example, on the memory 1510 or electronic storage unit 1515. The machine executable or machine readable code can be provided in the form of software. During use, the code can be executed by the processor 1505. In some cases, the code can be retrieved from the storage unit 1515 and stored on the memory 1510 for ready access by the processor 1505. In some situations, the electronic storage unit 1515 can be precluded, and machine-executable instructions are stored on memory 1510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1501, can be embodied in programming. Various aspects of the technology may be thought of as "products" or "articles of manufacture" typically in the form of machine (or processor) executable code and/or associated data that may be carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1501 can include or be in communication with an electronic display 1535 that comprises a user interface (UI) 1540 for providing, for example, an image of a biological component, a barcode, a signal or measurement of a local parameter. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1505. The algorithm can, for example, identify a biological component, detect a barcode, generate a spatial modulating element (e.g., a mask), provide energy from an energy source, detect or measure a local parameter using a sensor, etc.

The following embodiments recite illustrative, non-limiting permutations and combinations of features disclosed herein. Other permutations and combinations of features are also contemplated.

Embodiment 1: a method for processing a chemical or biological material, comprising: a) inputting (i) said chemical or biological material and (ii) one or more polymer precursors into a fluidic device; b) supplying a stimulus to said fluidic device to generate one or more polymer matrices, wherein said one or more polymer matrices comprise: i) a first gel structure from said one or more polymer precursors within said fluidic device, wherein said first gel structure at least partially encapsulates said chemical or biological material, and wherein said first gel structure comprises a first interior region; and ii) a second gel structure adjacent to said first gel structure, wherein said second gel structure comprises a second interior region; and c) degrading a portion of said first gel structure, said second gel structure, or both, thereby yielding a third interior region, wherein said third interior region comprises said first interior region of said first gel structure and said second interior region of said second gel structure. Embodiment 2: the method of embodiment 1, wherein said first gel structure and said second gel structure each comprise one or more polymer matrix walls. Embodiment 3: the method of embodiment 1, wherein said first gel structure and said second gel structure share a polymer matrix wall of the one or more polymer matrix walls. Embodiment 4: the method of embodiment 1, wherein said portion of said first gel structure, said second gel structure, or both degraded in (c) comprises said shared polymer matrix wall.

Embodiment 5: a method for processing a chemical or biological material, comprising: a) inputting (i) said chemical or biological material and (ii) one or more polymer precursors into a fluidic device; and b) supplying a stimulus to said fluidic device to generate one or more polymer matrices from said one or more polymer precursors within said fluidic device, wherein a polymer matrix of said one or more polymer matrices at least partially encapsulates said chemical or biological material, and wherein said polymer matrix is formed in less than 10 seconds following contact of said one or more polymer precursors with said stimulus.

Embodiment 6: the method of embodiment 5, wherein said polymer matrix is formed in less than 2 seconds following contact of said one or more polymer precursors with said energy.

Embodiment 7: the method of embodiment 5, wherein said polymer matrix is formed in less than 1 second following contact of said one or more polymer precursors with said energy.

Embodiment 8: the method of embodiment 5, wherein said polymer matrix is formed in less than 0.5 seconds, or optionally a range of about 2 seconds to about 4 seconds, following contact of said one or more polymer precursors with said energy.

Embodiment 9: a method for processing a chemical or biological material, comprising: a) inputting (i) said chemical or biological material and (ii) one or more polymer precursors into a fluidic device; b) supplying a stimulus to said fluidic device to generate one or more polymer matrices from said one or more polymer precursors within said fluidic device, wherein a polymer matrix of said one or more polymer matrices at least partially encapsulates said chemical or biological material; and c) performing one or more operations on said chemical or biological material within said polymer matrix, wherein said one or more operations comprise a temporal duration of at least one day, wherein no more than 20% of said polymer matrix degrades during said temporal duration. Embodiment 10: the method of embodiment 9, wherein no more than 15% of said polymer matrix degrades during said temporal duration. Embodiment 11: the method of embodiment 9, wherein no more than 10% of said polymer matrix degrades during said temporal duration. Embodiment 12: the method of embodiment 9, wherein no more than 5% of said polymer matrix degrades during said temporal duration. Embodiment 13: the method of embodiment 9, wherein no more than 1% of said polymer matrix degrades during said temporal duration. Embodiment 14: the method of any one of embodiments 9-13, wherein said temporal duration comprises at least three days. Embodiment 15: the method of any one of embodiments 9-13, wherein said temporal duration comprises at least five days. Embodiment 16: the method of any one of embodiments 9-13, wherein said temporal duration comprises at least seven days. Embodiment 17: the method of any one of embodiments 9-13, wherein said temporal duration comprises at least fourteen days.

Embodiment 18: a method for processing a chemical or biological material, comprising: a) inputting (i) one or more chemical or biological materials and (ii) one or more polymer precursors into a fluidic device; b) supplying a stimulus to said fluidic device to generate one or more polymer matrices from said one or more polymer precursors within said fluidic device, wherein said one or more polymer matrices at least partially encapsulate said one or more chemical or biological materials; and c) performing one or more operations on said one or more chemical or biological materials within said one or more polymer matrices, wherein said one or more operations comprise a temporal duration of at least one day, wherein at least 80% of said one or more chemical or biological materials are viable during said temporal duration.

Embodiment 19: the method of embodiment 18, wherein at least 85% of said one or more chemical or biological materials are viable during said temporal duration. Embodiment 20: the method of embodiment 18, wherein at least 90% of said one or more chemical or biological materials are viable during said temporal duration. Embodiment 21: the method of embodiment 18, wherein at least 95% of said one or more chemical or biological materials are viable during said temporal duration. Embodiment 22: the method of embodiment 18, wherein at least 99% of said one or more chemical or biological materials are viable during said temporal duration.

Embodiment 23: the method of any one of embodiments 18-22, wherein said temporal duration comprises at least three days. Embodiment 24: the method of any one of embodiments 18-22, wherein said temporal duration comprises at least five days. Embodiment 25: the method of any one of embodiments 18-22, wherein said temporal duration comprises at least seven days.

Embodiment 26: the method of any one of embodiments 18-22, wherein said temporal duration comprises at least fourteen days.

Embodiment 27: a method for processing one or more chemical or biological materials, comprising: a) inputting (i) said one or more chemical or biological materials and (ii) one or more polymer precursors into a fluidic device; and b) maintaining a fluidic communication between said one or more chemical or biological materials and said polymer precursors for a temporal duration of at least ten minutes, wherein at least 80% of said one or more chemical or biological materials are viable during said temporal duration. Embodiment 28: the method of embodiment 27, wherein at least 85% of said one or more chemical or biological materials are viable during said temporal duration. Embodiment 29: the method of embodiment 27, wherein at least 90% of said one or more chemical or biological materials are viable during said temporal duration. Embodiment 30: the method of embodiment 27, wherein at least 95% of said one or more chemical or biological materials are viable during said temporal duration. Embodiment 31: the method of embodiment 27, wherein at least 99% of said one or more chemical or biological materials are viable during said temporal duration. Embodiment 32: the method of any one of embodiments 27-31, wherein said temporal duration comprises at least 30 minutes. Embodiment 33: the method of any one of embodiments 27-31, wherein said temporal duration comprises at least one hour. Embodiment 34: the method of any one of embodiments 27-31, wherein said temporal duration comprises at least two hours. Embodiment 35: the method of any one of embodiments 27-31, wherein said temporal duration comprises at least three hours. Embodiment 36: the method of any one of embodiments 27-31, wherein said temporal duration comprises at least one day. Embodiment 37: the method of any one of embodiments 27-36, further comprising supplying a stimulus to said fluidic device to generate one or more polymer matrices from said one or more polymer precursors within said fluidic device, wherein said one or more polymer matrices at least partially encapsulate said one or more chemical or biological materials. Embodiment 38: the method of any one of embodiments 1-26 and 37, wherein said stimulus comprises light. Embodiment 39: the method of any one of embodiments 1-26, 37, and 38, wherein said one or more polymer matrices comprises a polymerized form of a cPEG monomer.

Embodiment 40: the method of any one of embodiments 1-26 and 37-39, wherein said one or more polymer matrices comprise a polymerized form of a monomer including a structure (I):

(I)

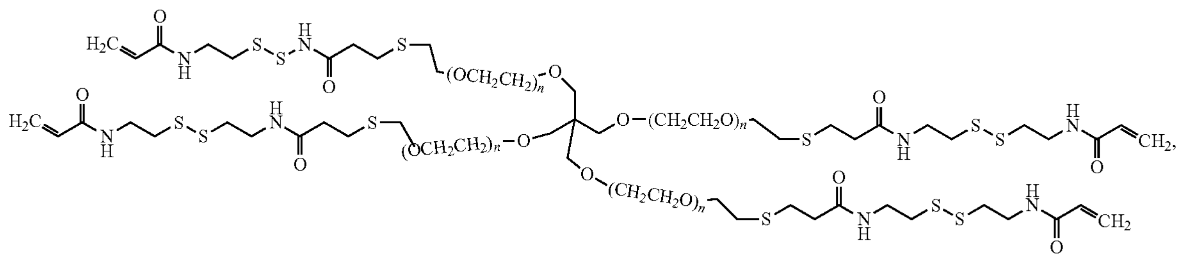

wherein each instance of n is independently an integer from 0 to 500.

Embodiment 41: the method of any one of embodiments 1-26 and 37-40, wherein said one or more polymer matrices comprise a polymerized form of a monomer including a structure (II):

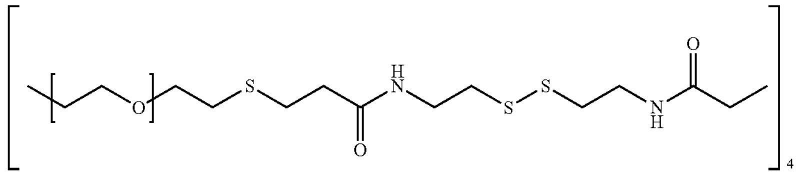

wherein each instance of n is independently an integer from 0 to 500. Embodiment 42: the method of embodiment 41, wherein n is between about 0 to about 100, or optionally n is between about 5 to about 50. Embodiment 43: the method of any one of embodiment 1-42, wherein the one or more polymer precursors comprise at least 40 μL of solution.

Embodiment 44: the method of any one of embodiments 1-26 and 37-43, wherein said one or more polymer matrices comprise a polymerized form of a monomer including a structure (III):

(III)
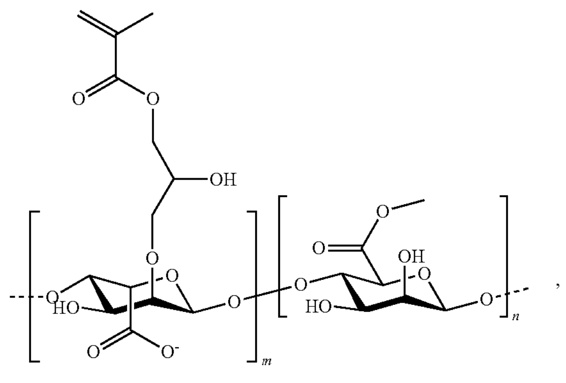
wherein n and m are independently integers from 0 to 500.
Embodiment 45: the method of any one of embodiments 1-26 and 37-44, wherein said one or more polymer matrices comprise a polymerized form of a monomer including a structure (IV):
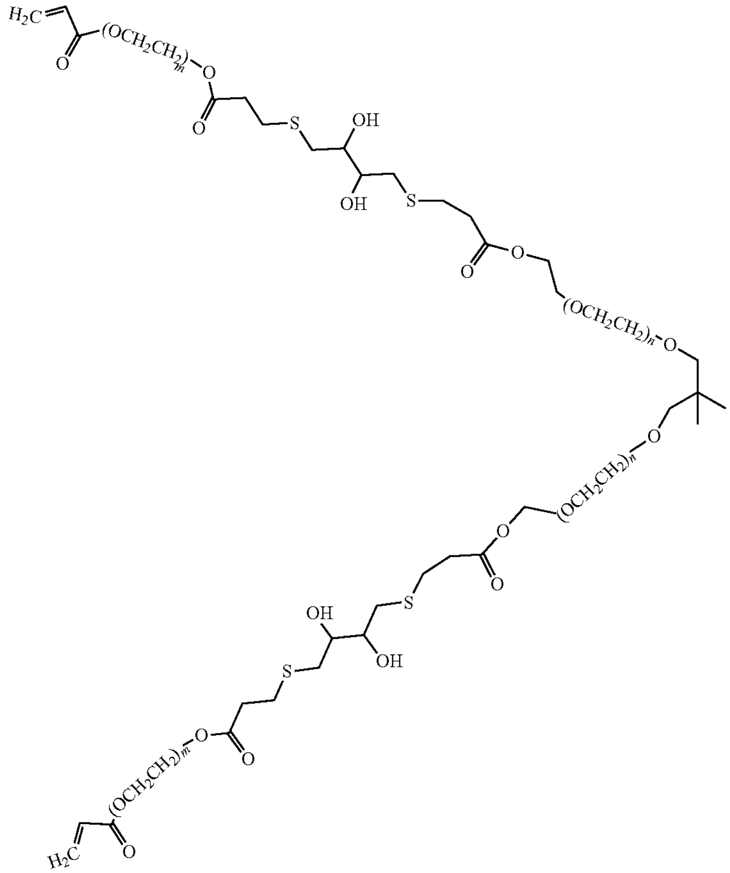

-continued (IV)

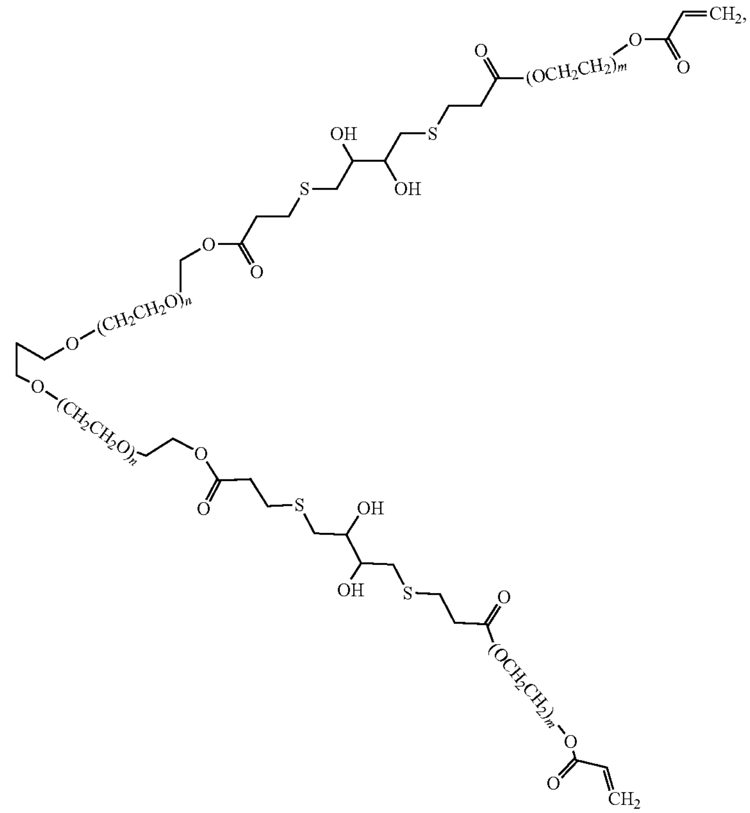

wherein each instance of n is independently an integer from 0 to 500.

Embodiment 47: the method of any one of embodiments 1-26 and 37-46, wherein said one or more polymer matrices comprise a polymerized form of a monomer including a structure (VI):

(V)

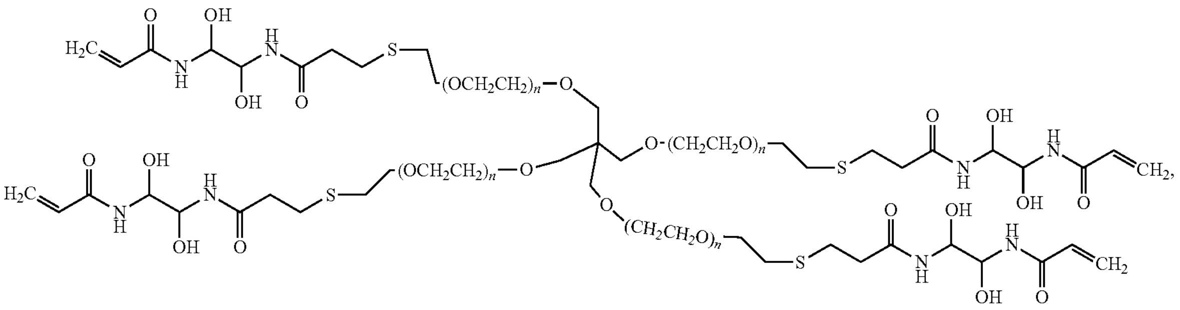

wherein each instance of n is independently an integer from 0 to 500.

Embodiment 46: the method of any one of embodiments 1-26 and 37-45, wherein said one or more polymer matrices comprise a polymerized form of a monomer including a structure (VI):

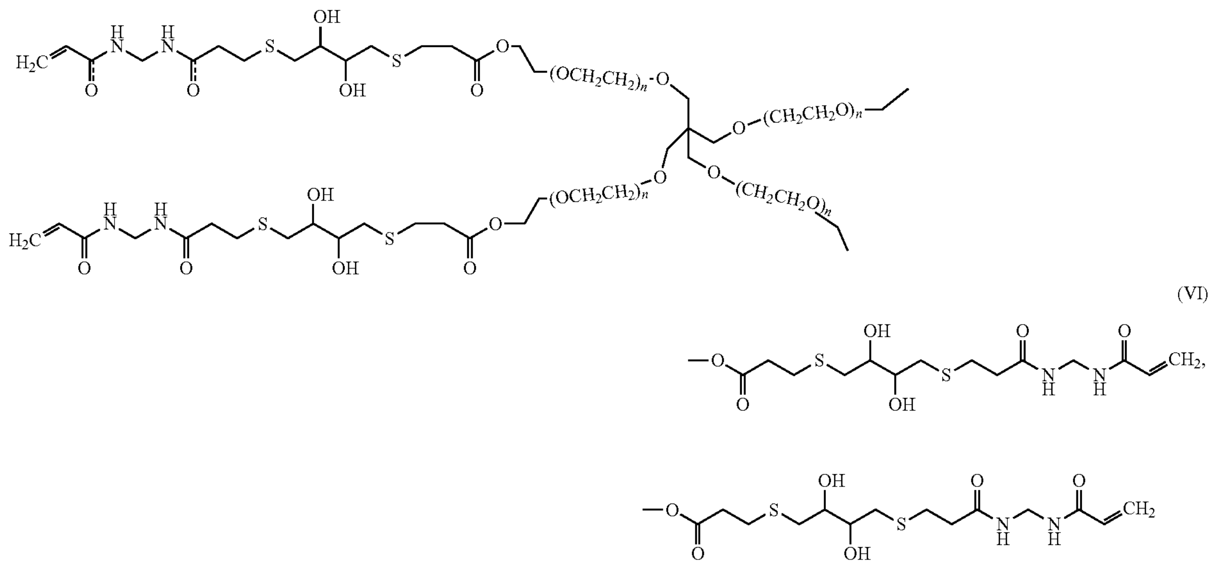

(VI)

wherein each instance of n is independently an integer from 0 to 500.

Embodiment 48: the method of any one of embodiments 1-26 and 37-47, wherein said one or more polymer matrices comprise a polymerized form of a monomer including a structure (VII):

(VII)

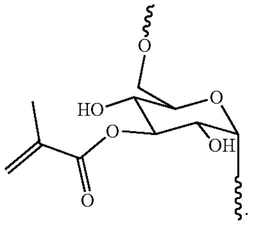

Embodiment 49: the method of any one of embodiments 1-26 and 37-48, wherein said one or more polymer matrices comprise a polymerized form of a monomer including a structure (VIII):

(VIII)

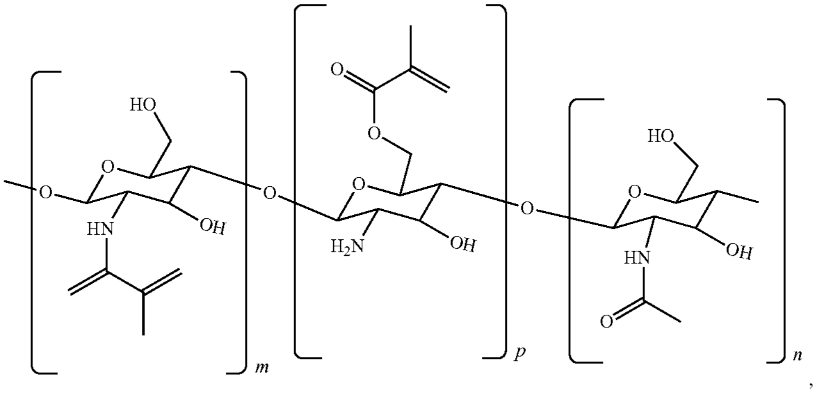

wherein n, m, and p are independently integers from 0 to 500.

Embodiment 50: the method of any one of embodiments 1-26 and 37-49, wherein said one or more polymer matrices comprise a polymerized form of a monomer including a structure (IX):

(IX)

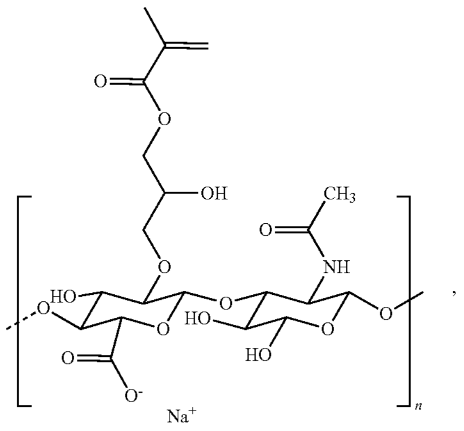

wherein n is an integer from 0 to 500.

Embodiment 51: the method of any one of embodiments 1-26 and 37-50, wherein said one or more polymer matrices comprise a polymerized form of a monomer including a structure (X):

(X)

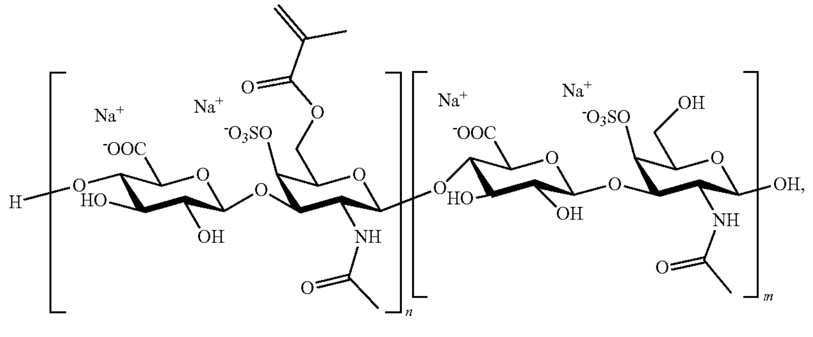

wherein n and m are independently integers from 0 to 500.

Embodiment 52: the method of any one of embodiments 1-26 and 37-51, wherein said one or more polymer matrices comprise a polymerized form of a monomer including a structure (XI):

(XI)

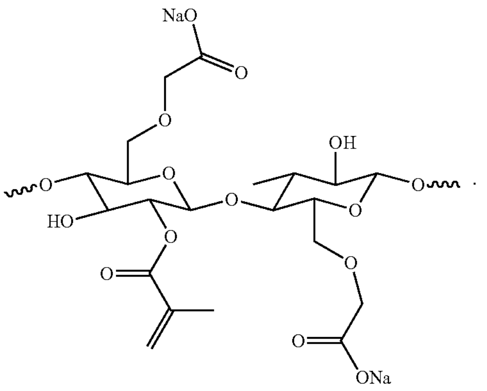

Embodiment 53: the method of any one of embodiments 1-26 and 37-52, wherein said one or more polymer matrices comprise a polymerized form of a monomer including a structure (XII):

(XII)

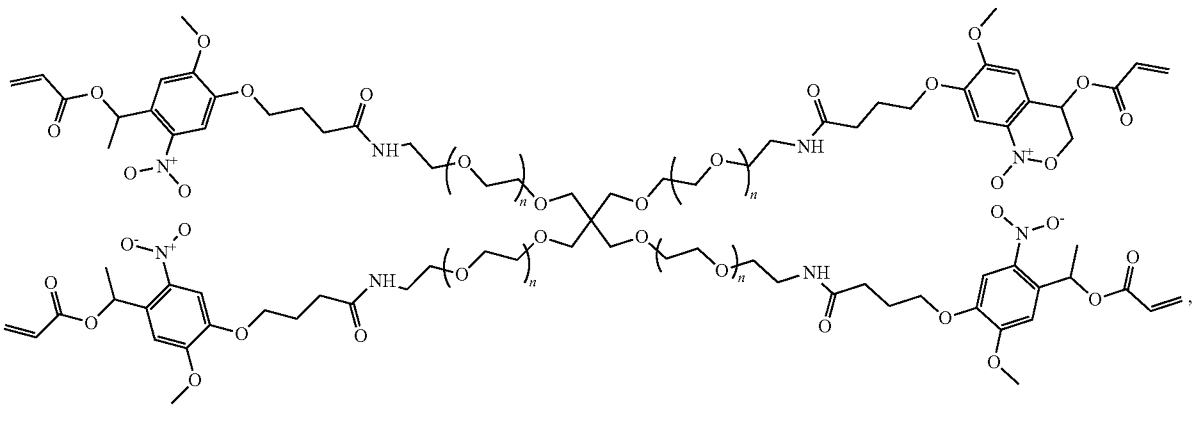

wherein each instance of n is independently an integer from 0 to 500.

Embodiment 54: the method of any one of embodiments 1-26 and 37-53, wherein said one or more polymer matrices comprise a polymerized form of a monomer including a structure (XIII):

(XIII)

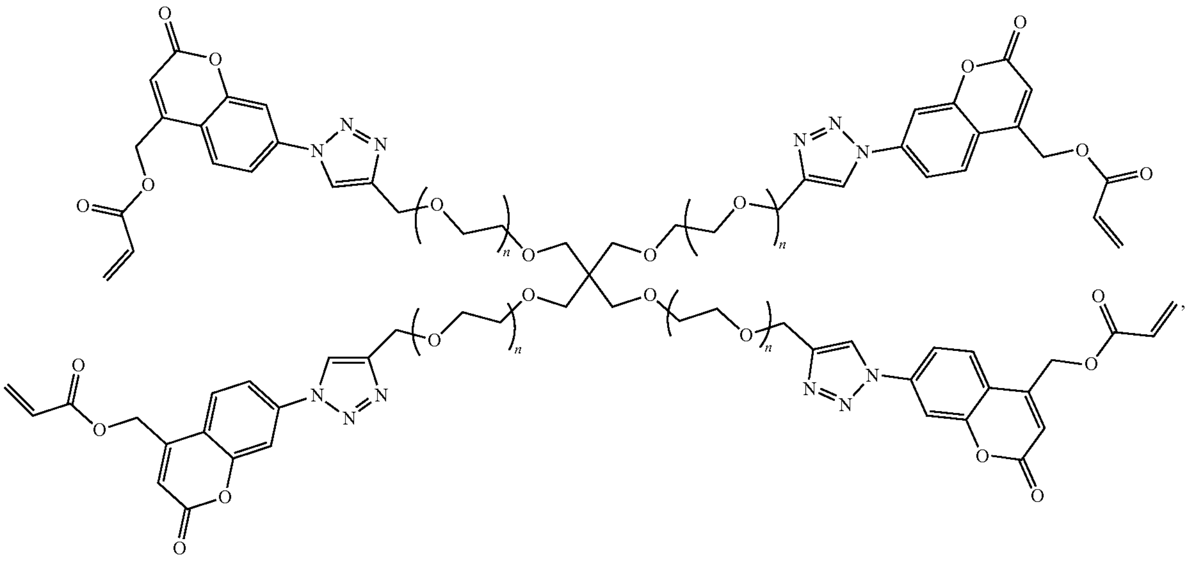

wherein each instance of n is independently an integer from 0 to 500.

Embodiment 55: the method of any one of embodiments 1-26 and 37-54, wherein said one or more polymer matrices comprise a polymerized form of a monomer, the monomer comprising: an oligomeric domain comprising three or more arms, wherein each arm of said oligomeric domain comprises a degradable functional group and a crosslinkable functional group, wherein the crosslinkable functional group of an arm of the three or more arms is configured to crosslink with another crosslinkable functional group of another polymer precursor in response to a first stimulus, thereby obtaining the polymerized form of the monomer, and wherein the degradable functional group is configured to be cleaved in response to a second stimulus, thereby solubilizing the polymerized form of the monomer. Embodiment 56: the method of embodiment 55, wherein the oligomeric domain comprises four or more arms.

Embodiment 57: the method of any one of embodiments 1-26 and 37-56, wherein the one or more polymer matrices comprise a degradable functional group. Embodiment 58: the method of embodiment 58, where said degradable functional group comprises disulfide, Beta-thioether ester, Amidomethylol and vicinal diol, vicinal diol, alginate backbone, dextran backbone, chitosan backbone, hyaluronic acid backbone, chondroitin sulfate backbone, or carboxy methyl cellulose backbone, or a combination thereof. Embodiment 59: the: method of any one of embodiments 1-26 and 37-58, wherein the one or more polymer matrices comprise a hydrogel.

Embodiment 60: the method of embodiment 60, wherein the hydrogel comprises a polymerized form of cPEG, cSEL-BTEEC, cSEL-DHEBA, cSEL-diol, cSEL-alginate, cSEL-dextran, cSEL-chitosan, cSEL-hyaluronic acid, cSEL-chondroitin sulfate, or cSEL-cellulose, or a combination thereof. Embodiment 61: the method of any one of embodiments 1-26 and 37-60, further comprising contacting the one or more polymer matrices with a degradation reagent configured to cleave the degradable functional group. Embodiment 62: the method of embodiment 62, wherein the degradation reagent comprises DTT, TCEP, BME, GSH, DMEM, RPMI, PBS buffer, DMEM, RPMI, PBS buffer, sodium (meta) periodate, Alginate lyase (enzyme), Dextranase, Lysozyme and chitinase, Hyaluronidase, Chondroitinase, or Cellulases, or a combination thereof. Embodiment 63: the method of any one of embodiments 1-26 and 37-62, wherein the one or more polymer matrices comprise at least one beta-thioether ester.

Embodiment 64: the method of any one of embodiments 1-26 and 37-63, wherein the one or more polymer matrices comprise PEG-m and one or more beta-thioether esters. Embodiment 65: the method of embodiment 63 or 64, wherein the beta-thioether ester is formed by reacting an acrylate with a thiol. Embodiment 66: the method of any one of embodiments 1-26 and 37-65, wherein the one or more polymer matrices degrade overnight in the presence of commonly used cell culture media, thereby providing a biocompatible degradation pathway for selective retention experiments. Embodiment 67: the method of any one of embodiments 1-26 and 37-66, wherein the one or more polymer matrices comprise a Michael donor. Embodiment 68: the method of embodiment 67, wherein the Michael donor is PEG-thiol. Embodiment 69: the method of any one of embodiments 1-26 and 37-68, wherein the one or more polymer matrices comprise a cSEL beta-thioether ester with one beta-thioether ester per arm. Embodiment 70: the method of any one of embodiments 1-26 and 37-69, wherein the one or more polymer matrices comprises are formed from any material that comprises a PEG with a Michael acceptor chain.

Embodiment 71: the method of embodiment 70, wherein the Michael acceptor chain comprises PEG-acrylamide, PEG-vinyl sulfone, PEG-maleimide, or PEG-carbonyl acrylic, or any combination thereof. Embodiment 72: the method of any one of embodiments 1-26 and 37-71, wherein the one or more polymer matrices are degradable by cleavage of disulfide bonds.

Embodiment 73: the method of embodiment 72, wherein the disulfide bonds are cleavable by one or more reducing agents. Embodiment 74: the method of embodiment 73, wherein the one or more reducing agents comprise DTT, TCEP, BME, or GSH, or any combination thereof.

Embodiment 75: the method of any one of embodiments 1-26 and 37-74, wherein the one or more polymer matrices comprise one or more arms each comprising one or more amides.

Embodiment 76: the method of any one of embodiments 1-26 and 37-75, wherein the one or more polymer matrices are degradable by oxidative cleavage of vicinal diol by sodium (meta)periodate. Embodiment 77: the method of any one of embodiments 1-26 and 37-76, further comprising: (a) using a caging workflow, (b) performing selective retention of cells when used with cPEG or other hydrogel with orthogonal degradation mechanism, or (c) performing long-term cell incubation, using reducing agents in cell-culture media without affecting cage stability. Embodiment 78: the method of any one of embodiments 1-26 and 37-77, wherein the one or more polymer matrices comprise a vicinal diol functionality that can be cleaved via oxidation of one or more hydroxyls. Embodiment 79: the method of any one of embodiments 1-26 and 37-78, wherein the one or more polymer matrices are used to formulate a stable hydrogel.

Embodiment 80: the method of any one of embodiments 1-26 and 37-79, wherein the one or more polymer matrices comprise a polymerized form of a photocleavable 4-arm PEG-monomer.

Embodiment 81: the method of any one of embodiments 1-26 and 37-80, wherein the one or more polymer matrices are photodegradable via an ortho-nitrobenzyl moiety. Embodiment 82: the method of any one of embodiments 1-26 and 37-81, wherein the one or more polymer matrices comprises a polymerized form of a Coumarin-based photodegradable monomer.

Embodiment 83: the method of any one of embodiments 1-26 and 37-82, wherein the one or more polymer matrices comprise a 4-arm PEG-acrylamide comprising one or more disulfides.

Embodiment 84: the method of any one of embodiments 1-26 and 37-83, wherein the one or more polymer matrices comprise one or more cage disulfide bonds in a hydrogel cage formation, wherein the hydrogel cages degrade using light and a photoinitiator. Embodiment 85: the method of any one of embodiments 1-26 and 37-84, wherein the one or more polymer matrices enables hydrogel formation, and wherein the hydrogel enables spatiotemporal control of hydrogel cage degradation, therefore enabling selective retention of cells with a single hydrogel formulation. Embodiment 86: the method of any one of embodiments 1-26 and 37-85, wherein the one or more polymer matrices enable hydrogel formation, and wherein the hydrogel enables the ability to selectively degrade cages and release their contents using light and photoinitiator as a reagents. Embodiment 87: the method of any of the proceeding embodiments, wherein the one or more polymer precursors enable formation of a hydrogel up to 2 mm thick, and wherein the hydrogel can be degraded in 120 s at low light intensity. Embodiment 88: the method of any one of embodiments 1-26 and 37-87, wherein upon exposure to light, photogenerated radicals initial multiple fragmentation and disulfide exchange reactions, thereby permitting and promoting photodeformation, photowelding and photodegradation of the one or more polymer matrices. Embodiment 89: the method of any one of embodiments 1-26 and 37-88, wherein the one or more polymer precursors enable hydrogel formation, wherein the hydrogel exhibits a chemical or physical change in response to an external stimulus. Embodiment 90: the method of any one of embodiments 1-26 and 37-89, wherein the one or more polymer matrices comprise a photolabile nitrobenzyl ester which lyses upon photon absorption, thereby allowing a user to exogenously control degradation of the one or more polymer matrices. Embodiment 91: the method of any one of embodiments 1-26 and 37-90, wherein the one or more polymer precursors enable hydrogel formation, and wherein the method further comprises controlling a network degradation of the hydrogel by concentration of a photoinitiator infused into the hydrogel.

Embodiment 92: the method of any one of embodiments 1-26 and 37-91, wherein the one or more polymer precursors comprise thiol groups that are quenched after formation of the one or more polymer matrices. Embodiment 93: the method of any one of embodiments 1-26 and 37-92, wherein the polymer matrix comprises a polymerized form of bis-acrylamide. Embodiment 94: the method of any one of embodiments 1-26 and 37-93, wherein degradation of the one or more polymer matrices is dependent upon a type of encapsulated cells, a cell number, or a fraction of disulfide moieties present in the one or more polymer matrices. Embodiment 95: the method of any one of embodiments 1-26 and 37-94, wherein a grafting efficiency of one or more polymer matrices is at least 90%. Embodiment 96: the method of any one of the preceding embodiments, wherein the one or more polymer precursors are in a solution having a pH of at least 6.0, 7.0, or 8.0. Embodiment 97: the method of any one of embodiments 1-26 and 37-96, wherein the one or more polymer precursors comprises a porogen, and wherein increasing porogen loading results in an increased pore size of the one or more polymer matrices.

Embodiment 98: the method of embodiment 97, wherein increasing the porogen concentration by 10% or 20% increases a rate of diffusion by about 20%. Embodiment 99: the method of embodiment 98, wherein said increased pore size increases the speed of diffusion of a fluorescently labeled antibody into the one or more polymer matrices. Embodiment 100: the method of embodiment 99, wherein the fluorescently labeled antibody is CD56 PE. Embodiment 101: the method of any one of the proceeding embodiments, wherein the one or more polymer precursors are photopolymerized via photocrosslinking by UV light.

Embodiment 102: a flow cell for sequencing a gene, comprising: a plurality of cells, a plurality of nanowells, and one or more polymer precursors; wherein a polymer matrix is formed from said one or more polymer precursors in less than 10 seconds following contact of said one or more polymer precursors with energy.

Embodiment 103: a polymer precursor, comprising: an oligomeric domain comprising three or more arms, wherein each arm of said oligomeric domain comprises a degradable functional group and a crosslinkable functional group, wherein the crosslinkable functional group of an arm of the three or more arms is configured to crosslink with another crosslinkable functional group of another polymer precursor in response to a first stimulus, thereby obtaining a polymerized form of the polymer precursor, and wherein said degradable functional group is configured to be cleaved in response to a second stimulus, thereby solubilizing the polymerized form of the polymer precursor. Embodiment 104: the polymer precursor of embodiment 103, wherein the oligomeric domain comprises four or more arms.

Embodiment 105: the polymer precursor of embodiment 103 or 104, wherein the oligomeric domain is hydrophilic. Embodiment 106: the polymer precursor of any one of embodiments 103-105, wherein the oligomeric domain comprises poly(ethylene glycol), poly(N-vinylpyrrolidone), poly (acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly (vinylamine), poly(ethylene oxide-co-propylene oxide), poly(N-isopropylacrylamide), poly(vinyl phosphonic acid), Poly(2-vinyl-1-methylpyridinium bromide), poly(N,N-diethylacrylamide), poly(N,N-dimethylacrylamide), poly(2-hydroxyethyl acrylate), poly(2-hydroxy methacrylate-co-methacrylic acid), poly(propylene oxide), poly(2-(dimethylamino)ethyl methacrylate), or poly(N-(2-hydroxypropyl)methacrylamide), or a combination thereof.

Embodiment 107: the polymer precursor of embodiment 106, wherein the oligomeric domain comprises poly(ethylene glycol). Embodiment 108: the polymer precursor of embodiment 106, wherein the oligomeric domain comprises poly(N-vinylpyrrolidone). Embodiment 109: the polymer precursor of embodiment 106, wherein the oligomeric domain comprises poly(acrylic acid). Embodiment 110: the polymer precursor of embodiment 106, wherein the oligomeric domain comprises poly(methacrylic acid). Embodiment 111: the polymer precursor of embodiment 106, wherein the oligomeric domain comprises poly(vinyl alcohol). Embodiment 112: the polymer precursor of embodiment 106, wherein the oligomeric domain comprises poly (L-lysine). Embodiment 113: the polymer precursor of embodiment 106, wherein the oligomeric domain comprises poly(2-ethyl-2-oxazoline). Embodiment 114: the polymer precursor of embodiment 106, wherein the oligomeric domain comprises poly(maleic acid).

Embodiment 115: the polymer precursor of embodiment 106, wherein the oligomeric domain comprises poly(vinyl phosphoric acid). Embodiment 116: the polymer precursor of embodiment 106, wherein the oligomeric domain comprises poly(acrylamide). Embodiment 117: the polymer precursor of embodiment 106, wherein the oligomeric domain comprises poly(vinylamine). Embodiment 118: the polymer precursor of embodiment 106, wherein the oligomeric domain comprises poly(ethylene oxide-co-propylene oxide). Embodiment 119: the polymer precursor of embodiment 106, wherein the oligomeric domain comprises poly(N-isopropylacrylamide). Embodiment 120: the polymer precursor of embodiment 106, wherein the oligomeric domain comprises poly(vinyl phosphonic acid). Embodiment 121: the polymer precursor of embodiment 106, wherein the oligomeric domain comprises Poly(2-vinyl-1-methylpyridinium bromide). Embodiment 122: the polymer precursor of embodiment 106, wherein the oligomeric domain comprises poly(N,N-diethylacrylamide). Embodiment 123: the polymer precursor of embodiment 106, wherein oligomeric domain comprises poly(N,N-dimethylacrylamide). Embodiment 124: the polymer precursor of embodiment 106, wherein the oligomeric domain comprises poly(2-hydroxyethyl acrylate). Embodiment 125: the polymer precursor of embodiment 106, wherein the oligomeric domain comprises poly(2-hydroxy methacrylate-co-methacrylic acid). Embodiment 126: the polymer precursor of embodiment 106, wherein the oligomeric domain comprises poly(propylene oxide). Embodiment 127: the polymer precursor of embodiment 106, wherein the oligomeric domain comprises poly(2-(dimethylamino)ethyl methacrylate). Embodiment 128: the polymer precursor of embodiment 106, wherein the oligomeric domain comprises poly(N-(2-hydroxypropyl) methacrylamide).

Embodiment 129: the polymer precursor of any one of embodiments 103-128, wherein the degradable functional group comprises disulfide, beta-thioether ester, amidomethylol, vicinal diol, peptide, polysaccharides (e.g. alginate, dextran, chitosan, chondroitin), ortho-nitrobenzyl, coumarin, acetal, ketal, ester, ortho ester, anhydride, imine, hydrazone, carbonate, phosphate, cinnamoyl, or benzoin ether, or a combination thereof. Embodiment 130: the polymer precursor of embodiment 129, wherein the degradable functional group comprises disulfide.

Embodiment 131: the polymer precursor of embodiment 129, wherein the degradable functional group comprises beta-thioether ester. Embodiment 132: the polymer precursor of embodiment 129, wherein the degradable functional group comprises amidomethylol. Embodiment 133: the polymer precursor of embodiment 129, wherein the degradable functional group comprises vicinal diol. Embodiment 134: the polymer precursor of embodiment 129, wherein the degradable functional group comprises a peptide. Embodiment 135: the polymer precursor of embodiment 129, wherein the degradable functional group comprises one or more polysaccharides. Embodiment 136: the polymer precursor of embodiment 135, wherein the one or more polysaccharides comprise alginate. Embodiment 137: the polymer precursor of embodiment 135, wherein the one or more polysaccharides comprise dextran. Embodiment 138: the polymer precursor of embodiment 135, wherein the one or more polysaccharides comprise chitosan. Embodiment 139: the polymer precursor of embodiment 135, wherein the one or more polysaccharides comprise chondroitin. Embodiment 140: the polymer precursor of embodiment 129, wherein the degradable functional group comprises ortho-nitrobenzyl. Embodiment 141: the polymer precursor of embodiment 129, wherein the degradable functional group comprises coumarin. Embodiment 142: the polymer precursor of embodiment 129, wherein the degradable functional group comprises acetal. Embodiment 143: the polymer precursor of embodiment 129, wherein the degradable functional group comprises ketal. Embodiment 144: the polymer precursor of embodiment 129, wherein the degradable functional group comprises ester.

Embodiment 145: the polymer precursor of embodiment 129, wherein the degradable functional group comprises ortho ester. Embodiment 146: the polymer precursor of embodiment 129, wherein the degradable functional group comprises anhydride. Embodiment 147: the polymer precursor of embodiment 129, wherein the degradable functional group comprises imine.

Embodiment 148: the polymer precursor of embodiment 129, wherein the degradable functional group comprises hydrazone. Embodiment 149: the polymer precursor of embodiment 129, wherein the degradable functional group comprises carbonate. Embodiment 150: the polymer precursor of embodiment 129, wherein the degradable functional group comprises phosphate.

Embodiment 151: the polymer precursor of embodiment 129, wherein the degradable functional group comprises cinnamoyl. Embodiment 152: the polymer precursor of embodiment 129, wherein the degradable functional group comprises benzoin ether. Embodiment 153: the polymer precursor of any one of embodiments 107-156, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof. Embodiment 154: the polymer precursor of embodiment 157, wherein the crosslinkable functional group comprises acrylate. Embodiment 155: the polymer precursor of embodiment 157, wherein the crosslinkable functional group comprises methacrylate.

Embodiment 156: the polymer precursor of embodiment 157, wherein the crosslinkable functional group comprises acrylamide. Embodiment 157: the polymer precursor of embodiment 157, wherein the crosslinkable functional group comprises methacrylamide. Embodiment 158: the polymer precursor of embodiment 157, wherein the crosslinkable functional group comprises norbornyl. Embodiment 159: the polymer precursor of embodiment 157, wherein the crosslinkable functional group comprises styrene. Embodiment 160: the polymer precursor of embodiment 157, wherein the crosslinkable functional group comprises vinyl ether. Embodiment 161: the polymer precursor of embodiment 157, wherein the crosslinkable functional group comprises vinyl pyrrolidone. Embodiment 162: the polymer precursor of embodiment 157, wherein the crosslinkable functional group comprises vinyl ester.

Embodiment 163: the polymer precursor of embodiment 157, wherein the crosslinkable functional group comprises maleimide. Embodiment 164: the polymer precursor of embodiment 157, wherein the crosslinkable functional group comprises allyl. Embodiment 165: the polymer precursor of embodiment 157, wherein the crosslinkable functional group comprises alkyne.

Embodiment 166: the polymer precursor of embodiment 157, wherein the crosslinkable functional group comprises azide. Embodiment 167: the polymer precursor of embodiment 157, wherein the crosslinkable functional group comprises thiol. Embodiment 168: the polymer precursor of embodiment 157, wherein the crosslinkable functional group comprises alkene.

Embodiment 169: the polymer precursor of embodiment 157, wherein the crosslinkable functional group comprises epoxide. Embodiment 170: the polymer precursor of any one of embodiments 103-169, wherein the first stimulus comprises an energy source. Embodiment 171: the polymer precursor of embodiment 170, wherein the energy source comprises a light source. Embodiment 172: the polymer precursor of embodiment 171, wherein the light source is at a wavelength between 300-500 nm. Embodiment 173: the polymer precursor of any one of embodiments 103-172, wherein the second stimulus comprises an energy source in a presence of a photoinitiator and an absence of polymer precursor. Embodiment 174: the polymer precursor of embodiment 173, wherein the energy source comprises a light source. Embodiment 175: the polymer precursor of embodiment 174, wherein the light source is at a wavelength between 300-500 nanometers (nm). Embodiment 176: the polymer precursor of embodiment 175, wherein the light source is at a wavelength between 380 nm-420 nm. Embodiment 177: the polymer precursor of any one of embodiments 103-172, wherein the second stimulus comprises introduction of a degradation reagent. Embodiment 178: the polymer precursor of embodiment 177, wherein the degradation reagent comprises dithiothreitol (DTT). Embodiment 179: the polymer precursor of embodiment 177, wherein the degradation reagent comprises Iris (2-carboxyethyl) phosphine (TCEP). Embodiment 180: the polymer precursor of embodiment 177, wherein the degradation reagent comprises 2-mercaptoethanol (BME). Embodiment 181: the polymer precursor of embodiment 177, wherein the degradation reagent comprises glutathione reductase (GSH). Embodiment 182: the polymer precursor of embodiment 177, wherein the degradation reagent comprises DMEM. Embodiment 183: the polymer precursor of embodiment 177, wherein the degradation reagent comprises RPMI. Embodiment 184: the polymer precursor of embodiment 177, wherein the degradation reagent comprises PBS buffer.

Embodiment 185: the polymer precursor of embodiment 177, wherein the degradation reagent comprises sodium (meta)periodate. Embodiment 186: the polymer precursor of embodiment 177, wherein the degradation reagent comprises alginate lyase. Embodiment 187: the polymer precursor of embodiment 177, wherein the degradation reagent comprises dextranase.

Embodiment 188: the polymer precursor of embodiment 177, wherein the degradation reagent comprises lysozyme. Embodiment 189: the polymer precursor of embodiment 177, wherein the degradation reagent comprises chitinase. Embodiment 190: the polymer precursor of embodiment 177, wherein the degradation reagent comprises hyaluronidase. Embodiment 191: the polymer precursor of embodiment 177, wherein the degradation reagent comprises chondroitinase. Embodiment 192: the polymer precursor of embodiment 177, wherein the degradation reagent comprises cellulases. Embodiment 193: a kit, comprising: (a) a porogen; and (b) a polymer precursor described in any one of embodiments 103-193. Embodiment 194: the kit of embodiment 193, wherein the porogen comprises poly(ethylene glycol). Embodiment 195: the kit of embodiment 193 or 194, wherein the ratio of the porogen to the polymer precursor by weight is between about 1:1 and 1:6. Embodiment 196: the kit of embodiment 193 or 194, wherein the ratio of the porogen to the polymer precursor by weight is between about 1:2 and 1:5. Embodiment 197: the kit of embodiment 193 or 194, wherein the ratio of the porogen to the polymer precursor by weight is between about 1:3 and 1:4. Embodiment 198: the kit of embodiment 193 or 194, wherein the ratio of the porogen to the polymer precursor by weight is about 1:3.5. Embodiment 199: the kit of any one of embodiments 193-198, wherein (a) the porogen; and (b) the polymer precursor are contained in a single container. Embodiment 200: the kit of embodiment 199, further comprising (c) a photoinitiator contained in another container.

Embodiment 201: the kit of embodiment 200, wherein the photoinitiator includes one of lithium phenyl-2,4,6-trimethylbenzoylphosphinate (LAP), Irgacure 2959, diphenyl(2,4,6-trimethylbenzoyl)phosphine oxide (TPO) nanoparticles, 2,2'-azobis[2-methyl-N-(2-hydroxyethyl) promionamide] (VA-086), BAPO-Oli, BAPO-Ona, Eosin-Y, Riboflavin, and combination thereof.

Embodiment 202: the method of any one of embodiments 1-4, wherein the chemical or biological material comprises a first cell in the first interior region and a second cell in the second interior region. Embodiment 203: the method of embodiment 202, wherein the first cell comprises one of a killer cell, an activation cell, and a suppression cell, and wherein the first cell interacts with the second cell after the degrading in (c). Embodiment 204: the method of any one of embodiments 1-4, 202, and 203, wherein the chemical or biological material comprises a polymer bead comprising one or more oligonucleotides disposed thereon. Embodiment 205: the method of any preceding embodiment wherein the chemical or biological material includes one or more cells or components thereof. Embodiment 206: the polymer precursor of any one of embodiments 103-192, wherein the oligomeric domain further comprises an amide moiety.

Embodiment 207: the polymer precursor of any one of embodiments 103-192 and 206, wherein the oligomeric domain further comprises a beta thioether moiety. Embodiment 208: the method of any one of the preceding embodiments, wherein the one or more polymer precursors comprise: (a) a macromonomer, (b) a photoinitiator, and (c) a porogen. Embodiment 209: the method of any one of embodiments 1-4, wherein the degrading in (c) is caused by cleavage of one or more disulfide bonds of the first gel structure, the second gel structure, or both.

Embodiment 210: a method for processing a chemical or biological material, comprising: a) inputting (i) said chemical or biological material and (ii) one or more polymer precursors into a fluidic device, wherein the one or more polymer precursors comprise a porogen, a macromonomer, and a photoinitiator; b) supplying an optical stimulus to said fluidic device to generate two or more polymer matrices, wherein said two or more polymer matrices comprise: i) a first hydrogel structure formed within said fluidic device, wherein said first hydrogel structure encapsulates said chemical or biological material, and wherein said first hydrogel structure comprises a first interior region; and ii) a second hydrogel structure formed within said fluidic device, wherein said second hydrogel structure encapsulates said chemical or biological material, and wherein said first hydrogel structure comprises a second interior region; c) inputting a solution containing the photoinitiator into the fluidic device; and d) supplying the optical stimulus to said fluidic device to selectively degrade at least one of the first hydrogel structure or said second hydrogel structure.

Embodiment 211: the method of embodiment 210, wherein the inputting the solution containing the photoinitiator into the fluidic device includes removing the porogen and the macromonomer from the fluidic device. Embodiment 212: the method of embodiment 210, wherein the macromonomer comprises a disulfide moiety, wherein two or more polymer matrices comprises the disulfide moiety, the disulfide moiety configured to be cleaved when exposed to the supplied optical stimulus. Embodiment 213: the method of any of the preceding embodiments wherein the first hydrogel structure fully encapsulates said chemical or biological material. Embodiment 214: the method of any of the preceding embodiments wherein a gel structure is a hydrogel structure. Embodiment 215: the method of any of the preceding embodiments wherein one or more biological materials that are viable comprises live cells.

Embodiment 216: the kit of any one of embodiments 193-198, wherein the polymer precursor essentially does not contain free thiol moieties, wherein the free thiol moieties are configured to degrade disulfide bonds. Embodiment 217: the kit of embodiment 199, wherein the single container essentially does not contain free thiol moieties, wherein the free thiol moieties are configured to degrade disulfide bonds. Embodiment 218: the kit of embodiments 216 or 217, wherein the free thiol concentration is less than 5%, 1%, 0.1%, 0.01%, or 0.001%.

EXAMPLES

The following illustrative examples are representative of embodiments of the devices and methods described herein and are not meant to be limiting in any way.

Example 1: Synthesizing cPEG Macromonomer

This example covers the synthesis of structure (I). The mixer was preheated to 35° C. with 50 mL tube Smartblock. 957.4 mg of N,N'-Bisacryloylcystamine (BAC) was added to a 15 mL tube. 4000 µL of DMSO was added to the tube containing BAC. The tube was heated gently at 30° C., vortexed, and sonicated to facilitate dissolution. 2400 mg of 4-arm PEG-thiol (PEG-SH, CreativePEGworks, cat no PSB-442, MW 5 k) was added to a 50 mL Falcon tube. 22.60 mL of 1×PBS buffer (freshly prepared with nuclease free water) was added to the PEG-SH in the Falcon tube and then the vortex mixed to dissolve. After PEG-SH was dissolved, 17.8 µL of triethylamine was added to the PEG-SH solution. All of the BAC/DMSO solution was quickly added using a syringe to the 50 mL tube containing PEG-SH and then vortex mixed immediately to prevent phase separation. A 2 µL aliquot for the t=0 time point was removed from the reaction mixture and then tested with Ellman's reagent to monitor the reaction. The 50 mL tube was placed in a mixer at 35° C. and shaken at 850 rpm for 30 minutes. At the t=15 minute and 30 minute time point, a 2 μL aliquot was removed from the reaction mixture and then tested with Ellman's reagent to monitor the reaction. After 30 minutes, the temperature on the mixer was reduced to 25° C. and 2 μL aliquots were periodically removed and tested with Ellman's reagent to determine if the reaction was complete (e.g., when Ellman's reading is within 5% of PBS control). The reaction was allowed to continue for an additional 1 to 2 hours after the reaction was complete. A solution was prepared containing 266 mg of N-(2-hydroxyethy)maleimide and 1 mL of 1×PBS buffer. The N-(2-hydroxyethy)maleimide solution was added to the reaction mixture and stirred for at least 30 minutes. The reaction mixture was transferred into a 500-1000 Da Float-a-lyzer dialysis tubes and soaked in a 2-4 L beaker filled with MilliQ water. 4 water changes were performed according to the following schedule: 1) Morning after reaction (e.g. 9 am), 2) 3-4 hours after the 1st water change (e.g. 12-1 pm), 3) 2-4 hours after the 2nd water change (e.g. 3-4 pm), and 4) 2-4 hours after 3rd water change (e.g. 5-7 pm). The dialyzed solution was transferred to 50 mL centrifuge tubes (about 15-20 mL each) and frozen at −80° C. for at least 2 hours before beginning the freeze drying process.

In some cases, a photocleavable 4-arm-PEG-macromonomer can be synthesized per Scheme 1. In this case, the 4-arm-PEG-macromonomer may be referred to as cPEG.

SCHEME 1

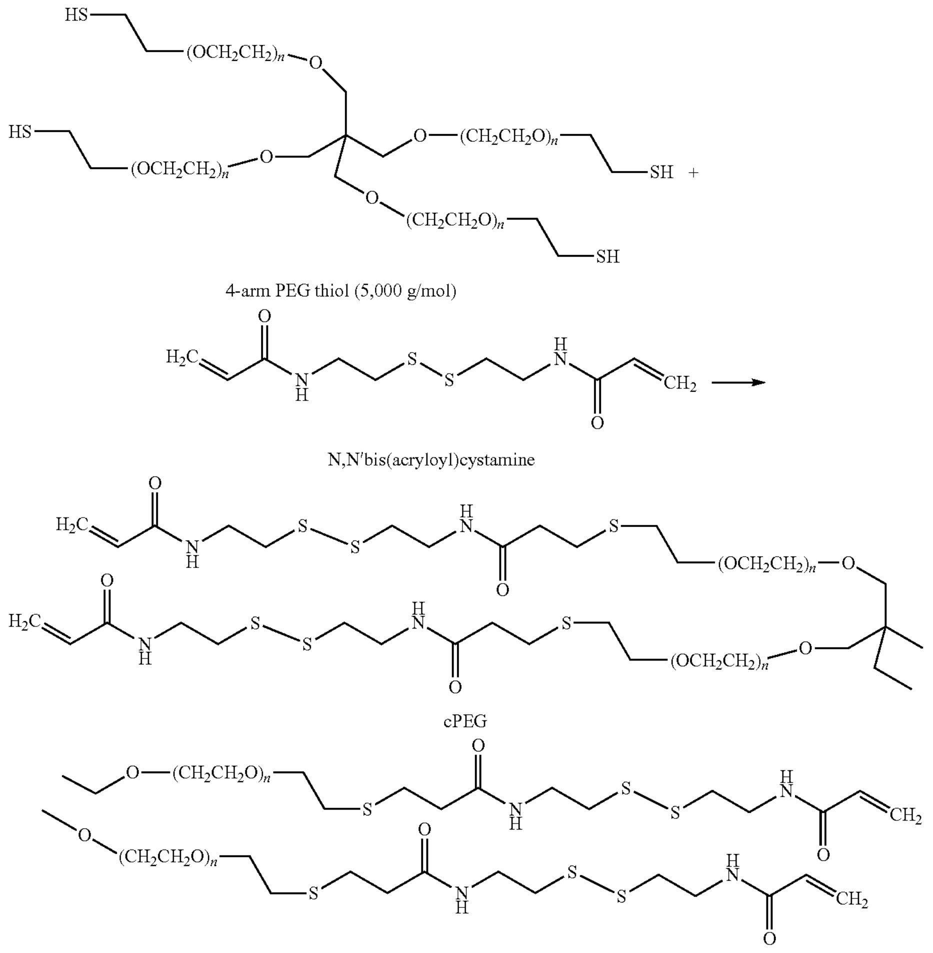

4-arm PEG thiol (5,000 g/mol)

N,N'bis(acryloyl)cystamine cPEG

In the above cPEG reaction scheme, (A) may comprise 4-arm PEG thiol (5,000 g/mol), (B) may comprise N,N'bis (acryloyl)cystamine and (C) may comprise cPEG. The degradation mechanism may comprise cleavage of disulfide bonds by reducing agents such as DTT, TCEP, BME, GSH, etc. The product (e.g. cPEG) may be used in caging workflow. In further embodiments, the product (e.g., cPEG) may comprise selective retention of cells when used with a second hydrogel that can degrade by an orthogonal mechanism.

Example 2: Procedure for Monitoring Free Thiols cPEG (Ellman's Assay)

A 4 mg/ml solution of Ellman's reagent (5,5'-dithiobis-(2-nitrobenzoic acid)) was prepared in a reaction buffer (e.g., 0.1M sodium phosphate, pH 8.0, containing 1 mM EDTA). 125 μL of reaction buffer was added to various wells in a 96-well plate. Next, 2.5 μL of 4 mg/ml Ellman's reagent solution was added to each well containing reaction buffer. A 2 μL aliquot of the reaction mixture (e.g., at various time points) was removed and diluted with 142.4 μL of PBS to form a diluted aliquot of the reaction mixture. 25 μL of the diluted aliquot of the reaction mixture was added to the well containing Ellman's reagent. After a 15 minute incubation time, the well was monitored at 412 nm absorbance to assess the level of thiol reactant remaining in the reaction mixture.

Example 3: Synthesis of cSEL-Diol Macromonomer 616.1 μL of a 1 M DTT solution, 11.4 μL of TEA, 1.258 mL of 1×PBS, and 208.2 μL of DMSO were combined in a 50 mL centrifuge tube and heated to 35° C. A solution of 400.15 mg of 4-arm PEG-acrylamide (CreativePEGworks, cat no PSB-411, MW 5 k) dissolved in 1874 μL of PBS was added dropwise over about 3 minutes to the DTT/TEA/PBS/DMSO mixture to form the reaction mixture. After 30 minutes, the reaction temperature was lowered to 25° C. The addition of DTT to 4-arm PEG-acrylamide was tracked via Ellman's reaction (see Example 2). After 2 hours and 45 minutes, the reaction mixture was drawn into a syringe and added dropwise to a solution of 175.48 mg of bis-acrylamide in 727.5 μL of DMSO at 35° C. over about 3 minutes. The attachment of the thiol derivatized PEG-acrylamide to bis-acrylamide was tracked by Ellman's test until the thiols were found to be fully consumed. The Ellman's test was tested again after 20 minutes to confirm that the reaction was complete. The temperature was reduced to 25° C. after 30 minutes. 64.35 mg of N-(2-hydroxyethy)maleimide dissolved in 241.3 μL of PBS was added to the reaction mixture to quench any residual thiols. The reaction mixture was then transferred to 3.5 kDA molecular weight cutoff dialysis tubes. After dialysis, the solution was freeze-dried to obtain cSEL-diol.

In some cases, a photocleavable 4-arm-PEG-macromonomer can be synthesized as shown in SCHEME 2. In this case, the 4-arm-PEG-macromonomer may be referred to as cSEL (beta-thioether ester).

SCHEME 2

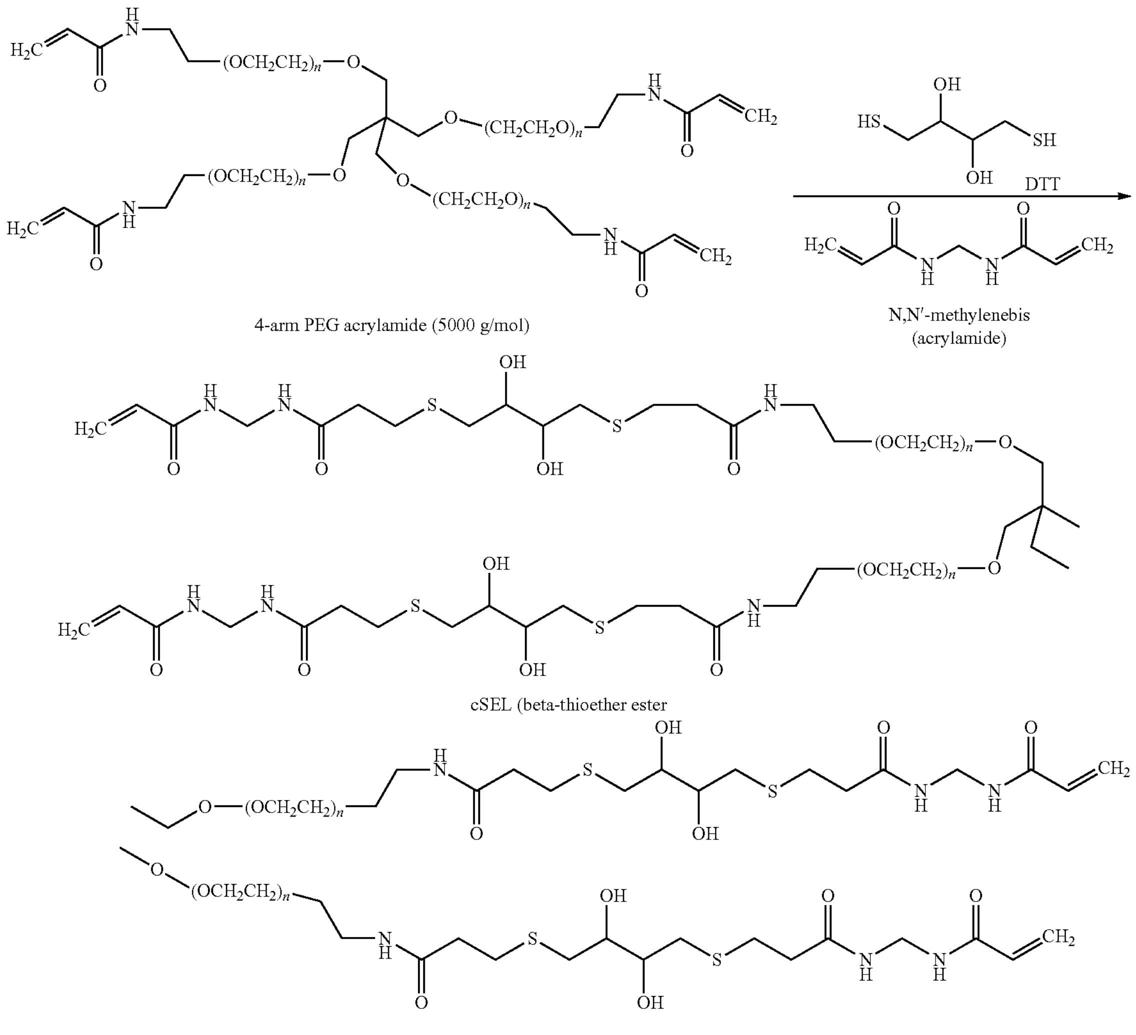

4-arm PEG acrylamide (5000 g/mol)

N,N'-methylenebis (acrylamide)

cSEL (beta-thioether ester

Example 4: Synthesis of 4-arm PEG-DTT-SH Macromonomer

A solution was made containing 150 mg of 4-arm PEG-acrylate (CreativePEGworks, cat no PSB-423, MW 5 k) and 3.533 mL PBS buffer. The 4-arm PEG-acrylate solution was added dropwise to a reaction vessel containing 0.23 mL of 1 M dithioerythritol in PBS buffer at 35° C. After 30 minutes, the reaction temperature was lowered to 25° C. The attachment of thiols from DTT to PEG-acrylate was monitored with Ellman's assay (see Example 2). After 4.5 hours, the reaction mixture was transferred to dialysis tubes with a 500-1000 Da MW cut-off for purification. Following dialysis, the 4-arm PEG-DTT-SH was obtained by freeze-drying.

Example 5—Synthesis of cSEL-BTEE Macromonomer

A solution was made containing 135.9 mg of 4-arm PEG-DTT-SH in 1.3 mL of PBS buffer, which was added dropwise to a PEG-diacrylate (Mn=250) solution over a 3 minute interval at 35° C. where 52 mg of PEG-diacrylate was dissolved in 0.23 mL DMSO. The thiol conversion was tracked via Ellman's assay (see Example 2). After 30 minutes the reaction temperature was reduced to 25° C., and the reaction was allowed to proceed for an additional 2 hours. The reaction was then quenched by the addition of 15.1 mg of N-(2-hydroxyethyl)maleimide dissolved in 56.8 μL PBS after 1 hour and transferred to 500-1000 Da molecular weight cutoff dialysis tubes. After dialysis, the solution was freeze-dried to obtain cSEL-BTEE.

In some cases, a photocleavable 4-arm-PEG-macromonomer can be synthesized per SCHEME 3. In this case, the 4-arm-PEG-macromonomer may be referred to as cSEL-BTEE.

SCHEME 3
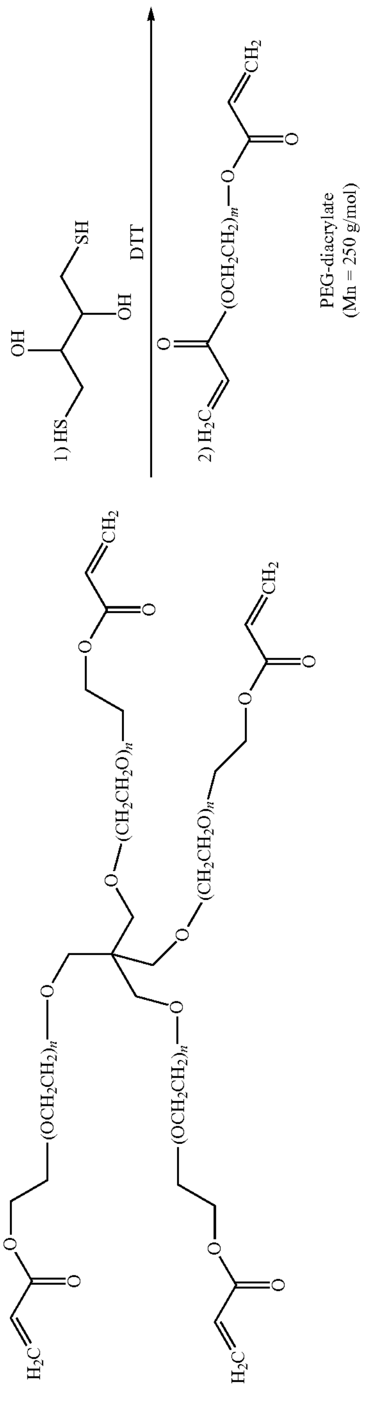

-continued
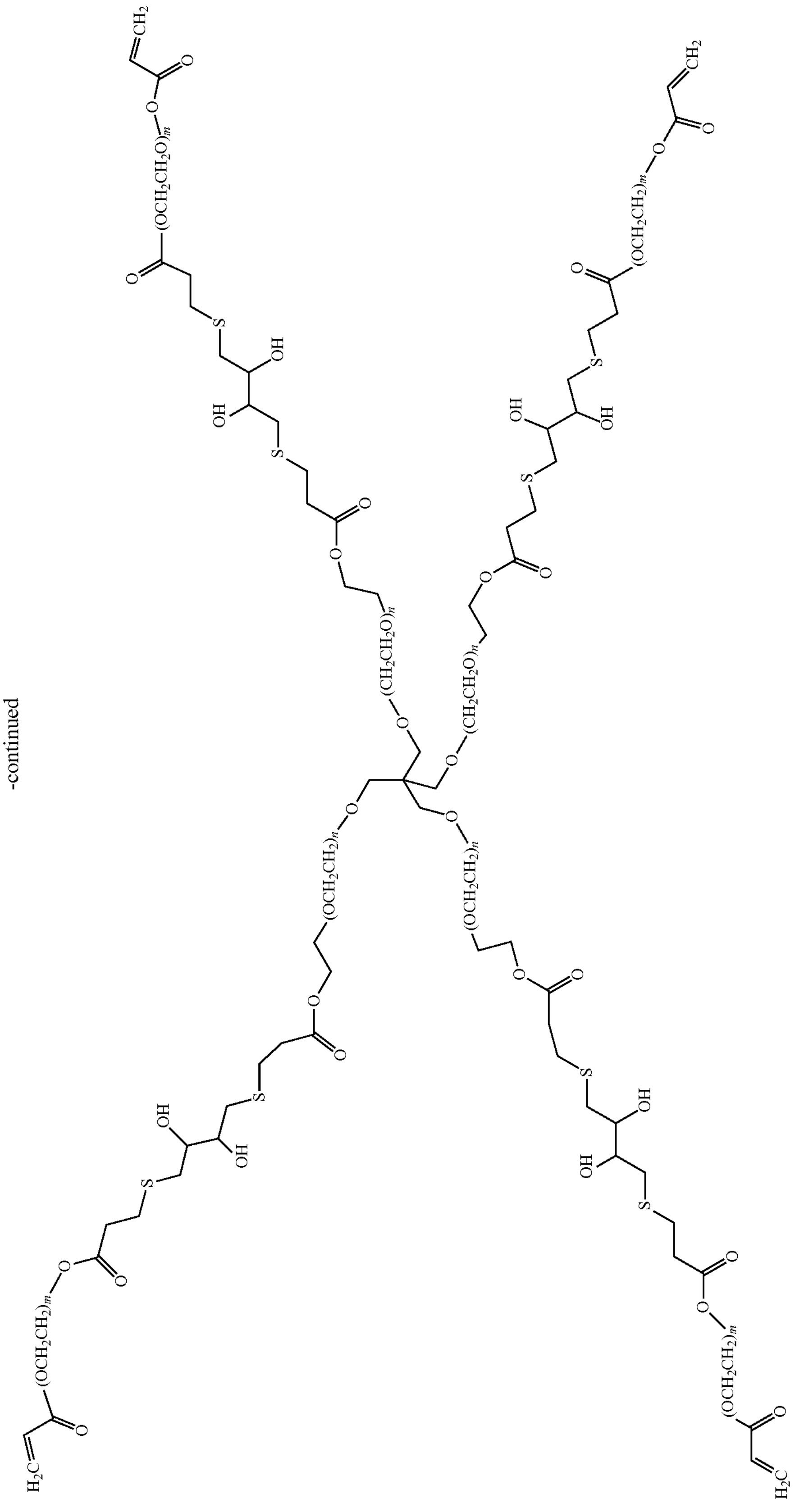
cSEL (beta-thioether ester)

In some cases, a photocleavable 4-arm-PEG-macromonomer can be synthesized as shown in SCHEME 4. In this case, the 4-arm-PEG-macromonomer may be referred to as cSEL-BTEE.

SCHEME 4

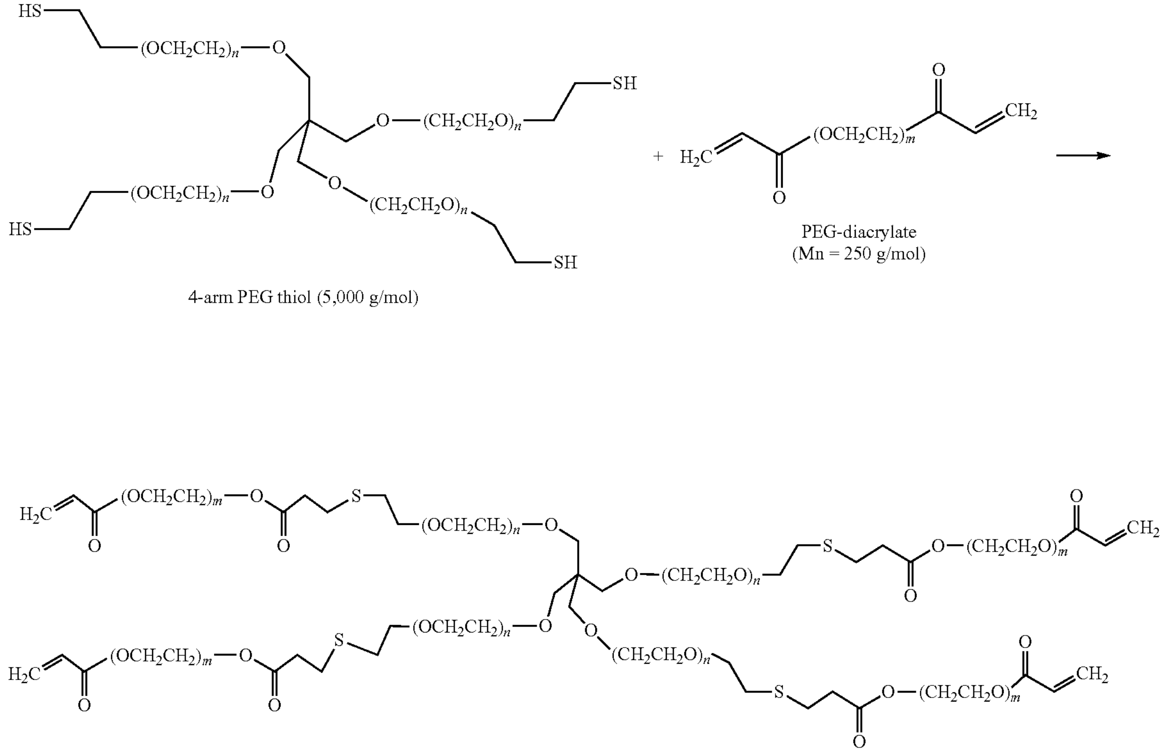

4-arm PEG thiol (5,000 g/mol)

PEG-diacrylate (Mn = 250 g/mol)

Beta-thioether ester containing PEG-acrylate macromonomer

Example 6—cSEL-DHEBA Macromonomer

An excess of N,N'-(1,2-Dihydroxyethylene)bisacrylamide (DHEBA) solution (166.1577 mg DHEBA in 0.9 mL of DMSO) was quickly added to a solution of 4-arm PEG-thiol (CreativePEGworks, cat no PSB-442, MW 5 k, 541.5 mg in 5.1 mL PBS buffer). The reaction mixture was allowed to stir at 35° C. for 30 minutes. The temperature was then reduced to 25° C. and allowed to proceed for 4 hours. Thiol conversion was tracked via Ellman's assay (see Example 2). After 4 hours, the reaction was quenched by the addition N-(2-hydroxyethy)maleimide (60 mg in 0.225 mL PBS). The quenching reaction was allowed to proceed for 30 minutes before transferring the solution to 500-1000 Da dialysis tubes for purification. Following dialysis, the resulting solution of cSEL-DHEBA macromonomer was freeze-dried to obtain a solid material.

In some cases, a photocleavable 4-arm-PEG-macromonomer can be synthesized per SCHEME 5. In this case, the 4-arm-PEG-macromonomer may be referred to as cSEL-DHEBA.

SCHEME 5

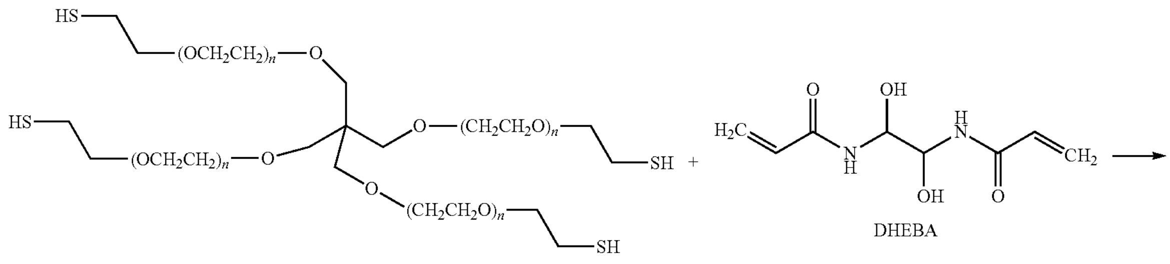

DHEBA 4-arm PEG thiol (5,000 g/mol)

-continued

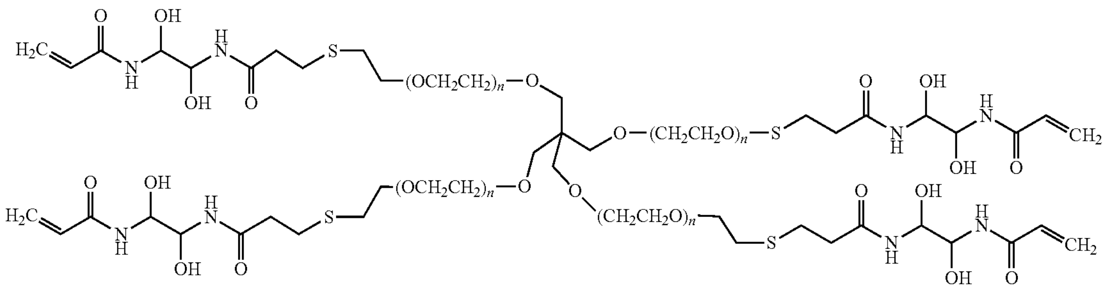

DHEBA-based cSEL

Example 7—Coumarin-Based Photodegradable Macromonomer

In some embodiments, photo-synthesized gels are formed using a photo-initiator for radical polymerization. In some embodiments, photo-initiators comprise Irgacure 2959, Lithium phenyl-2,4,6-trimethylbenzoylphosphinate (LAP), or Eosin-Y (e.g. see Choi et al, Biotechniques, 66(1): 40-53 (2019)).

In some embodiments, hydrogel precursors comprise a 4-arm PEG, poly(ethylene glycol)-alkyne such as cPEG (Example 1), cSEL-BTEE (Example 5), and cSEL-DHEBA (Example 6).

In some embodiments, polymer precursors comprise PEG or multi-arm PEG. In some embodiments, polymer precursors comprise an enzymatically degradable cross-linker. In some embodiments, such enzymatically degradable cross-linker is degradable by an esterase or a peptidase. In some embodiments, polymer precursors comprise a photo-degradable cross-linker. In some embodiments, such photo-degradable cross-linker comprises a coumarin moiety.

In some embodiments, photo-degradable hydrogels are used with methods described herein, for example, because photo-degradation of hydrogel chambers may be carried out selectively and on-demand, so that specified hydrogel chambers may be degraded without affecting non-selected hydrogel chambers are unaffected. In some embodiments, hydrogel chambers are degraded non-selectively, so that all hydrogel chambers in a given channel (or other vessel) are degraded simultaneously. In some embodiments, such non-selective degradation is carried out with a cleavage reagent that specifically cleaves a labile bond in a hydrogel. For example, such cleavage agent comprises a reducing agent. In some embodiments, such non-specific degradation is carried out with an enzyme that cleaves a bond or chemical element in a hydrogel. For example, chemical elements include, but are not limited to, peptides, polysaccharides, and oligonucleotides.

In some cases, a photocleavable 4-arm-PEG-macromonomer can be synthesized per SCHEME 6. In this case, the 4-arm-PEG-macromonomer may be photodegradable via a coumarin moiety.

SCHEME 6

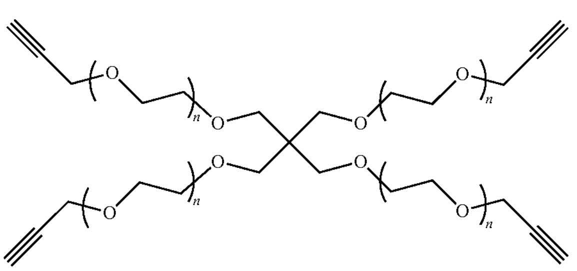

4-arm PEG-alkyne

+

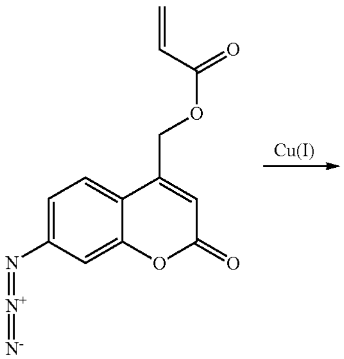

(2)

-continued

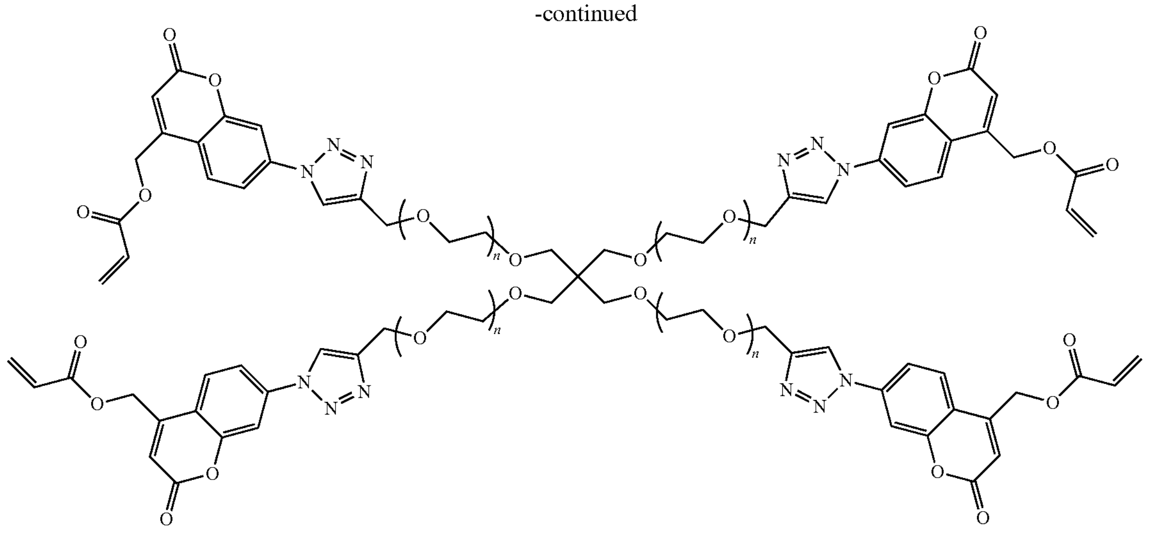

Photodegrdable PEG-macromonomer

Example 8—Photodegradable Monomer with an Ortho-Nitrobenzyl Moiety

In some embodiments, photo-synthesized gels are formed using a photo-initiator for radical polymerization. In some embodiments, photo-initiators comprise Irgacure 2959, Lithium phenyl-2,4,6-trimethylbenzoylphosphinate (LAP), or Eosin-Y (e.g. see Choi et al, Biotechniques, 66(1): 40-53 (2019)).

In some embodiments, hydrogel precursors comprise a 4-arm PEG, poly(ethylene glycol)-alkyne such as cPEG (Example 1), cSEL-BTEE (Example 5), and cSEL-DHEBA (Example 6), and the photodegradable PEG-macromonomer of Example 7.

In some embodiments, polymer precursors comprise PEG or multi-arm PEG. In some embodiments, polymer precursors comprise an enzymatically degradable cross-linker. In some embodiments, such enzymatically degradable cross-linker is degradable by an esterase or a peptidase. In some embodiments, polymer precursors comprise a photo-degradable cross-linker. In some embodiments, such photo-degradable cross-linker comprises a nitrobenzyl group.

In some embodiments, photo-degradable hydrogels are used with methods described herein, for example, because photo-degradation of hydrogel chambers may be carried out selectively and on-demand, so that specified hydrogel chambers may be degraded without affecting non-selected hydrogel chambers. In some embodiments, hydrogel chambers are degraded non-selectively, so that all hydrogel chambers in a given channel (or other vessel) are degraded simultaneously. In some embodiments, such non-selective degradation is carried out with a cleavage reagent that specifically cleaves a labile bond in a hydrogel. For example, such cleavage agent comprises a reducing agent. In some embodiments, such non-specific degradation is carried out with an enzyme that cleaves a bond or chemical element in a hydrogel. For example, chemical elements include, but are not limited to, peptides, polysaccharides, and oligonucleotides.

In some cases, a photocleavable 4-arm-PEG-macromonomer can be synthesized per SCHEME 7. In this case, the 4-arm-PEG-macromonomer may be photodegradable via ortho-nitrobenzyl moiety.

SCHEME 7

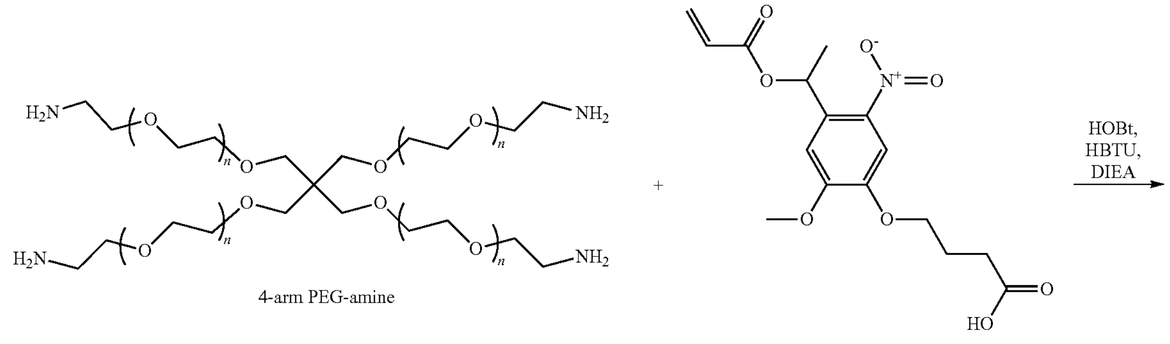

4-arm PEG-amine

Compound 1 (synthesized according to literature procedures)

-continued

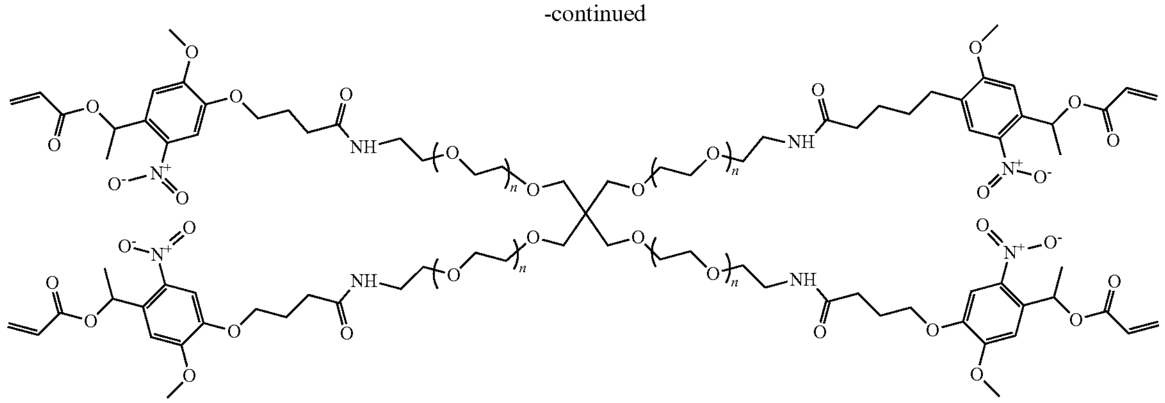

Photocleavable 4-arm PEG-macromonomer

Example 9—Hydrogel Chamber Lysis with Sodium Periodate

This example covers hydrogel chamber degradation using sodium periodate. Sodium periodate is capable of cleaving the carbon-carbon bond within vicinal diols, converting vicinal diols into aldehydes through oxidative cleavage. A general schematic for periodate-mediated vicinal diol cleavage is provided in SCHEME 8 below.

SCHEME 8

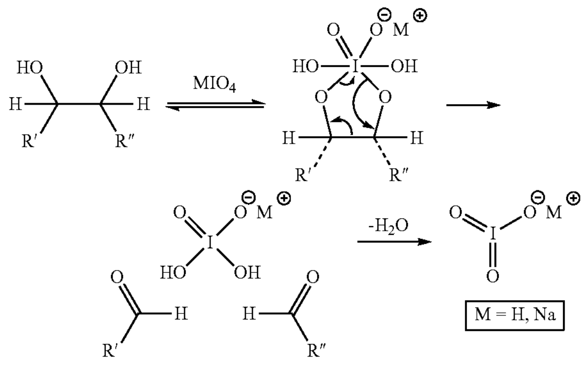

Hydrogel chambers were synthesized in three channels of a fluidic device utilizing a monomer of structure (XVII), which contains four $NaIO_4$-degradable vicinal diols. The chambers were formed following about 3-6 seconds of radiation in the presence of a photoinitiator. The chambers were washed and then stored within phosphate buffered saline for about 15 minutes. The hydrogel chambers were then degraded at 25° C. using the oxidant $NaIO_4$. The hydrogel chambers degraded in less than two minutes.

Figure 17A:
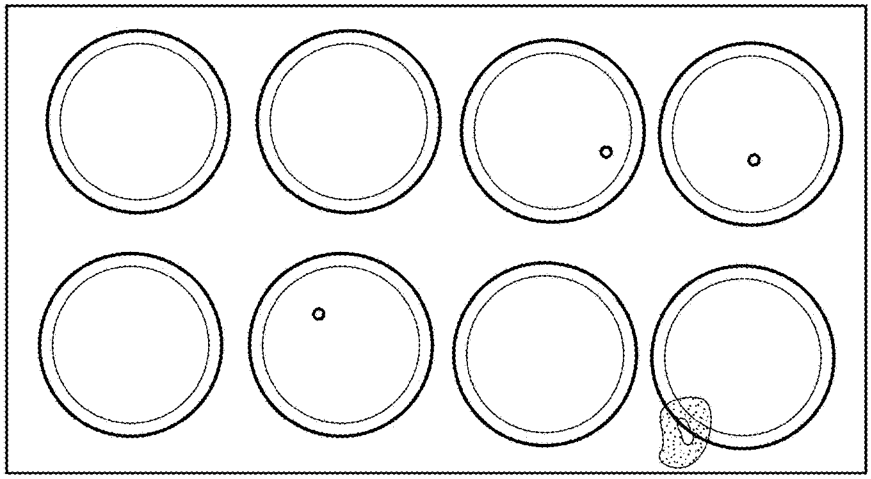
FIG. 17A-C are brightfield images of hydrogel chambers at various stages of degradation.
Figure 17B:
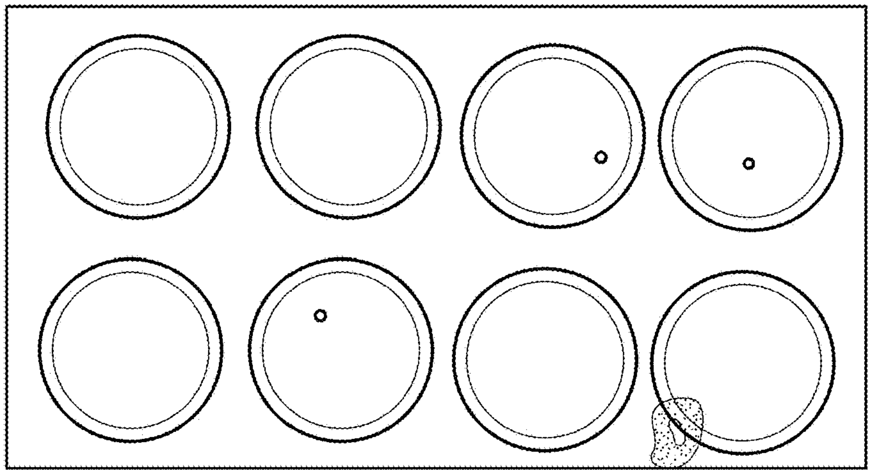
Figure 17C:
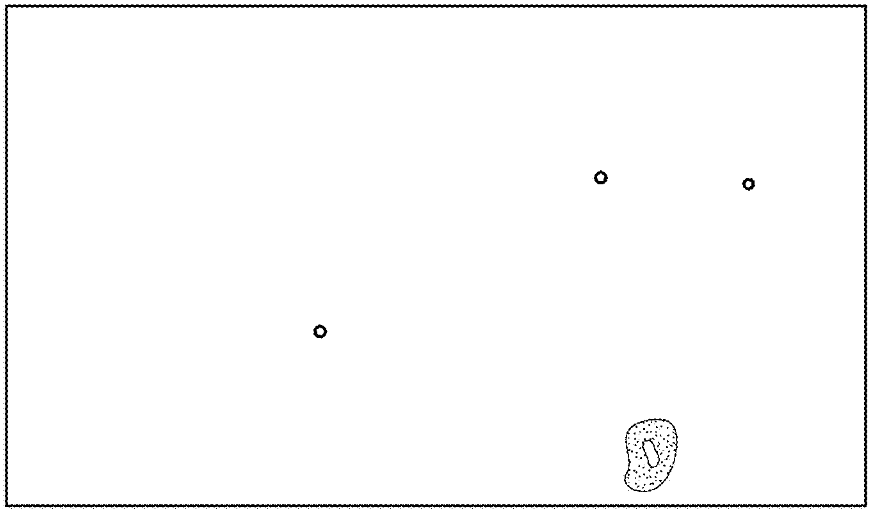

Hydrogel chamber synthesis and $NaIO_4$ degradation were then repeated at 4° C. in an additional fluidic device. 50 mM $NaIO_4$ stock solution in water was quickly diluted to 2.5 mM concentration in cold PBS 1× and added to a fluidic device channel with cages. Chamber degradation was then measured using brightfield imaging as the fluidic device was allowed to slowly warm from 4° C. Images of a subset of the measured chambers taken 5, 10, and 20 minutes following $NaIO_4$ exposure are shown in FIG. 17A-C, respectively. Unlike room temperature $NaIO_4$ degradation, which occurred in less than two minutes, hydrogel chambers were still slightly visible after 20 minutes.

Example 10—Sodium Periodate Concentration Study for Cage Lysis

This example is directed to polymer matrix degradation using low sodium periodate concentrations. Contrasting Example 9, which presents methods that degrade polymer matrices in less than 2 minutes, this example covers lower sodium periodate concentrations that degrade polymer matrices more slowly.

Hydrogel chambers were synthesized in three channels of a fluidic device utilizing a monomer of structure (XVII), which contains four $NaIO_4$-degradable vicinal diols. The chambers were washed with 200 μL phosphate buffered saline. Then, after 15 minutes, 200 μL $NaIO_4$ in phosphate buffered saline was added to each channel of the fluidic device. The first channel received 1.25 mM $NaIO_4$. The second channel received 0.613 mM $NaIO_4$. The third channel received 0.306 mM $NaIO_4$. Chamber degradation was then monitored with brightfield imaging.

Figure 18:
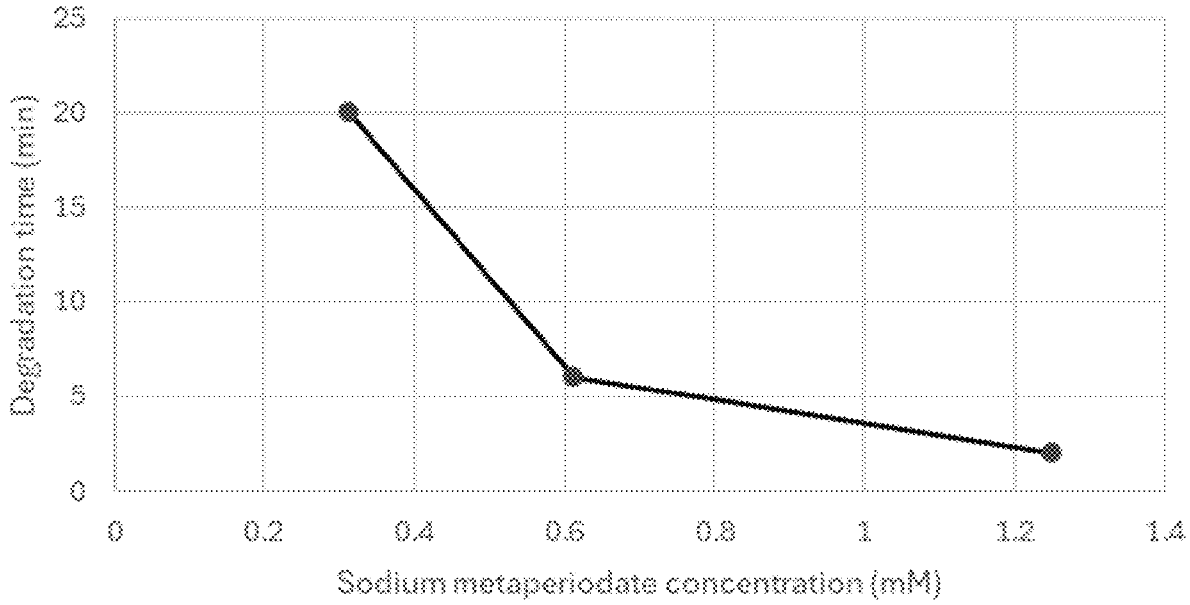
FIG. 18 is a plot of hydrogel chamber degradation time at various degradant concentrations.

FIG. 18 is a graph that shows hydrogel chamber degradation time (in minutes) as a function of $NaIO_4$ concentration. The chambers exposed to 1.25 mM $NaIO_4$ (channel 1) dissolved within about 2 minutes. The chambers exposed to 0.613 mM $NaIO_4$ (channel 2) dissolved within about 6 minutes. The chambers exposed to 0.306 mM $NaIO_4$ (channel 3) dissolved within about 20 minutes. The chambers fully degraded in each channel.

Example 11—Hydrogel Chamber Formation Rate

This example covers hydrogel chamber photopolymerization rate. Hydrogel chambers were formed with a polymer precursor that included a monomer of structure (XVII) and the type I photoinitiator lithium phenyl-2,4,6-trimethylbenzoylphosphinate (LAP). The polymer precursor was irradiated for one to three seconds with blue light from a digital micromirror device (DMD) to form the hydrogel chambers.

Figure 19A:
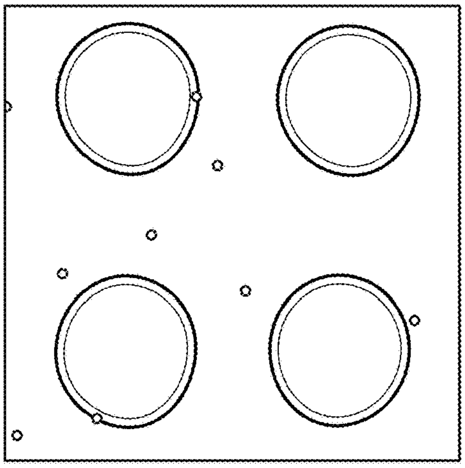
FIG. 19A-C are brightfield images of hydrogel chambers that were photopolymerized using different irradiation times.
Figure 19B:
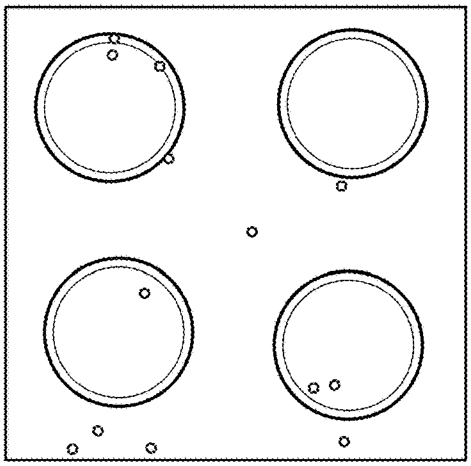
Figure 19C:
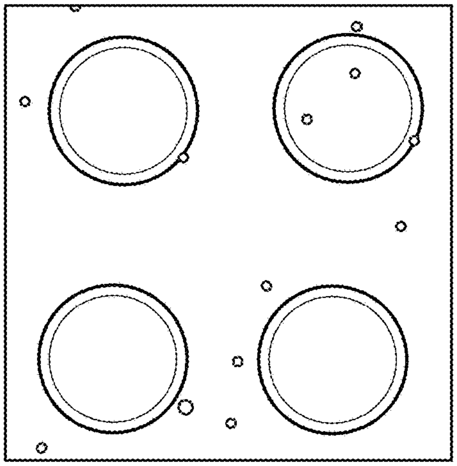

Brightfield images were then collected on the resultant hydrogel chambers. FIG. 19A-C are top-down images of hydrogel chambers formed using 1, 2, and 3 seconds of blue light irradiation, respectively. As can be seen from FIG. 19A, faint hydrogel chambers formed following one second of irradiation. However, as shown in FIG. 19B-C, the respective chambers exhibited greater density when formed with 2 or 3 seconds of irradiation. The hydrogel chambers in all three images exhibited clean cylindrical shapes, indicating that the polymer precursor can be rapidly photopolymerized in a spatially-controlled manner.

Example 12—Hydrogel Chamber Stability in the Presence of Adherent Cells

This example covers hydrogel chamber stability. In order to test the mechanical fidelity of hydrogel chambers, hydrogel chambers were incubated with colon fibroblasts, a type of adherent cell that is capable of applying mechanical stress by pulling on hydrogel structures following surface adherence. Hydrogel chambers were formed in a fluidic device by photopolymerizing a polymer precursor that included a four-armed monomer of structure (XVII). Each chamber was synthesized around a single colon fibroblast. The fluidic device was then washed, and the cells were incubated for multiple days in media.

Figure 20A:
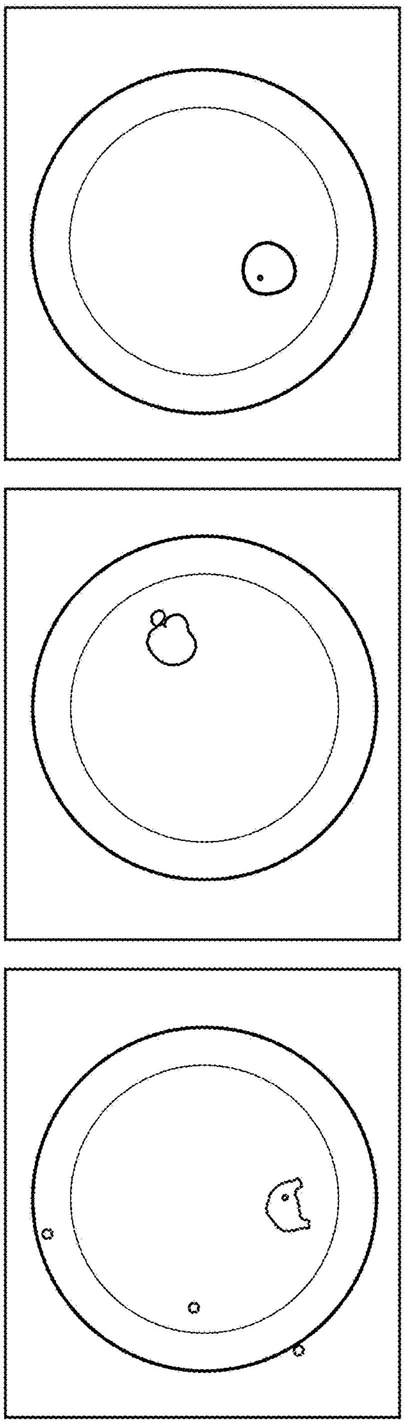
FIG. 20A-B are a series of brightfield images of hydrogel chambers enclosing adherent cells.
Figure 20B:
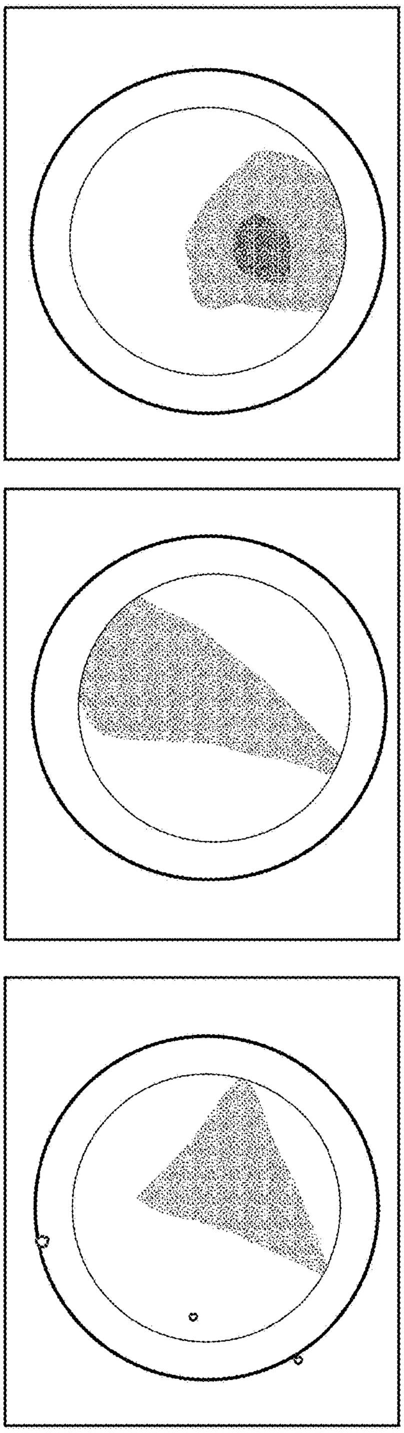

Brightfield images of the hydrogel chambers were collected immediately following hydrogel chamber synthesis (FIG. 20A) and 72 hours after hydrogel chamber synthesis (FIG. 20B). Following 72 hours, the cells increased in size and became translucent, indicating that they adhered to the bottom surface of the fluidic device. However, the shape, width, and opacity of the chamber walls did not change over the 72 hours (going from FIG. 20A to FIG. 20B), indicating that the colon fibroblasts did not deform or degrade the hydrogel chambers.

Example 13—Synthesis of a Macromonomer with a Disaccharide Cleavable Functional Groups This example covers the synthesis of a multiarmed macromonomer that contains a disaccharide cleavable functional group within each of its arms. An outline of this synthesis is shown in SCHEME 9. In a first step, a 4-arm PEG alkynyl compound is reacted with an azide-modified disaccharide at room temperature in the presence of Cu(I) to couple the disaccharide to the 4-arm PEG through click chemistry. The resulting compound is then reacted with acryloyl chloride to convert one or more disaccharide hydroxyl groups to a crosslinkable acrylate. While SCHEME 9 depicts the acryloyl chloride as undergoing nucleophilic substitution on the same hydroxyl on each disaccharide unit, the acryloyl chloride can add to any of the hydroxyl groups on each disaccharide. The number of disaccharide hydroxyl groups converted to acrylate may be controlled by modifying the ratio of acryloyl chloride to disaccharide-modified 4-arm PEG. The resultant molecule is a crosslinkable macromonomer with a cleavable disaccharide in each of its four arms.

SCHEME 9

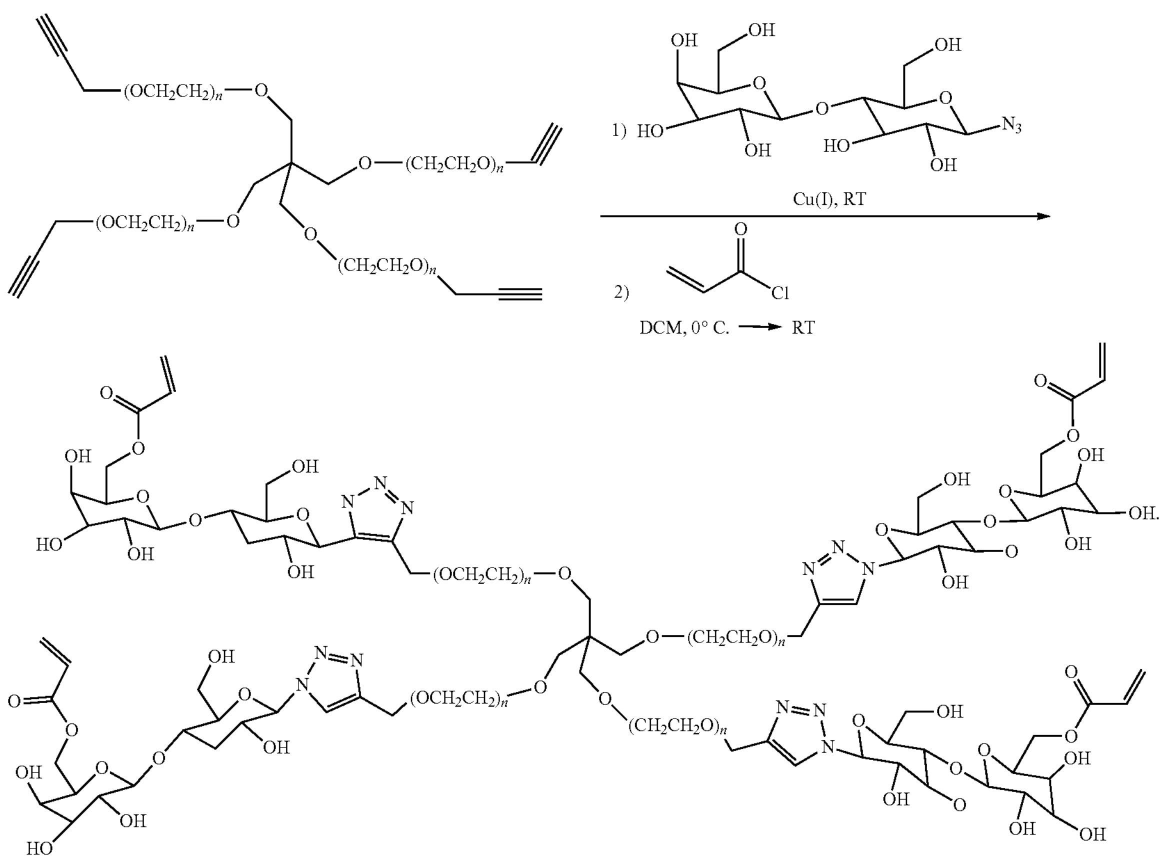

(XX)

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, wherein the second stimulus comprises introduction of a degradation reagent, and wherein the degradation reagent comprises dithiothreitol (DTT), tris (2-carboxyethyl) phosphine (TCEP), 2-mercaptoethanol (BME), glutathione reductase (GSH), sodium (meta) periodate, alginate lyase, dextranase, lysozyme, chitinase, hyaluronidase, chondroitinase, cellulases, or a combination thereof.

2. The polymer precursor of claim 1, wherein the oligomeric domain comprises four or more arms.

3. The polymer precursor of claim 1, wherein the oligomeric domain consists of four arms.

4. The polymer precursor of claim 1, wherein the oligomeric domain is hydrophilic.

5. The polymer precursor of claim 1, wherein the oligomeric domain comprises poly(ethylene glycol), poly(N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), poly(2-vinyl-1-methylpyridinium bromide), poly(N,N-diethylacrylamide), poly(N,N-dimethylacrylamide), poly(2-hydroxyethyl acrylate), poly (2-hydroxy methacrylate-co-methacrylic acid), poly (propylene oxide), poly(2-(dimethylamino) ethyl methacrylate), or poly(N-(2-hydroxypropyl) methacrylamide), or a combination thereof.

6. The polymer precursor of claim 5, wherein the oligomeric domain comprises poly(ethylene glycol).

7. The polymer precursor of claim 1, wherein the degradable functional group comprises disulfide, vicinal diol, polysaccharides, or a combination thereof.

8. The polymer precursor of claim 1, wherein the degradable functional group comprises disulfide.

9. The polymer precursor of claim 1, wherein the degradable functional group comprises vicinal diol.

10. The polymer precursor of claim 1, wherein the degradable functional group is enzymatically degradable.

11. The polymer precursor of claim 1, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

12. The polymer precursor of claim 1, wherein the oligomeric domain comprises polyethylene glycol, wherein the degradable functional group comprises disulfide, and wherein the crosslinkable functional group comprises acrylamide.

13. The polymer precursor of claim 12, wherein the oligomeric domain further comprises thioether.

14. The polymer precursor of claim 1, wherein the oligomeric domain comprises polyethylene glycol, wherein the degradable functional group comprises vicinal diol, and wherein the crosslinkable functional group comprises acrylamide.

15. The polymer precursor of claim 14, wherein the oligomeric domain further comprises thioether.

16. The polymer precursor of claim 1, wherein the first stimulus comprises light.

17. The polymer precursor of claim 16, wherein the light is at a wavelength from about 300 to about 500 nm.

18. The polymer precursor of claim 1, wherein the oligomeric domain further comprises an amide moiety, a beta-thioether moiety, or a combination thereof.

19. A kit, comprising: (a) a porogen, wherein the porogen comprises poly(ethylene glycol); and (b) a polymer precursor comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor.

20. The kit of claim 19, wherein the ratio of the porogen to the polymer precursor by weight is from about 1:1 to about 1:6.

21. The kit of claim 19, wherein (a) the porogen and (b) the polymer precursor are contained in a single container.

22. The kit of claim 21, further comprising (c) a photoinitiator contained in another container.

23. The kit of claim 22, wherein the photoinitiator includes lithium phenyl-2,4,6-trimethylbenzoylphosphinate (LAP), Irgacure 2959, diphenyl(2,4,6-trimethylbenzoyl) phosphine oxide (TPO) nanoparticles, 2,2'-azobis[2-methyl-N-(2-hydroxyethyl)promionamide] (VA-086), BAPO-Oli, BAPO-Ona, eosin-Y, riboflavin, or combinations thereof.

24. The kit of claim 22, wherein the photoinitiator comprises lithium phenyl-2,4,6-trimethylbenzoylphosphinate (LAP).

25. The kit of claim 19, wherein a free thiol concentration of the polymer precursor is less than 5%.

26. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, and wherein the second stimulus comprises introduction of an oxidizing agent.

27. The polymer precursor of claim 26, wherein the oligomeric domain comprises four or more arms.

28. The polymer precursor of claim 26, wherein the oligomeric domain consists of four arms.

29. The polymer precursor of claim 26, wherein the oligomeric domain is hydrophilic.

30. The polymer precursor of claim 26, wherein the oligomeric domain comprises poly(ethylene glycol), poly (N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), poly(2-vinyl-1-methylpyridinium bromide), poly(N,N-diethylacrylamide), poly(N,N-dimethylacrylamide), poly(2-hydroxyethyl acrylate), poly (2-hydroxy methacrylate-co-methacrylic acid), poly (propylene oxide), poly(2-(dimethylamino) ethyl methacrylate), or poly(N-(2-hydroxypropyl) methacrylamide), or a combination thereof.

31. The polymer precursor of claim 30, wherein the oligomeric domain comprises poly(ethylene glycol).

32. The polymer precursor of claim 26, wherein the degradable functional group comprises vicinal diol.

33. The polymer precursor of claim 26, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

34. The polymer precursor of claim 26, wherein the oligomeric domain comprises polyethylene glycol, wherein the degradable functional group comprises vicinal diol, and wherein the crosslinkable functional group comprises acrylamide.

35. The polymer precursor of claim 34, wherein the oligomeric domain further comprises thioether.

36. The polymer precursor of claim 26, wherein the first stimulus comprises light.

37. The polymer precursor of claim 36, wherein the light is at a wavelength from about 300 to about 500 nm.

38. The polymer precursor of claim 26, wherein the oligomeric domain further comprises an amide moiety, a beta-thioether moiety, or a combination thereof.

39. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, wherein the second stimulus comprises introduction of a reducing agent.

40. The polymer precursor of claim 39, wherein the oligomeric domain comprises four or more arms.

41. The polymer precursor of claim 39, wherein the oligomeric domain consists of four arms.

42. The polymer precursor of claim 39, wherein the oligomeric domain is hydrophilic.

43. The polymer precursor of claim 39, wherein the oligomeric domain comprises poly(ethylene glycol), poly (N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), poly(2-vinyl-1-methylpyridinium bromide), poly(N,N-diethylacrylamide), poly(N,N-dimethylacrylamide), poly(2-hydroxyethyl acrylate), poly (2-hydroxy methacrylate-co-methacrylic acid), poly (propylene oxide), poly(2-(dimethylamino) ethyl methacrylate), or poly(N-(2-hydroxypropyl) methacrylamide), or a combination thereof.

44. The polymer precursor of claim 43, wherein the oligomeric domain comprises poly(ethylene glycol).

45. The polymer precursor of claim 39, wherein the degradable functional group comprises disulfide.

46. The polymer precursor of claim 39, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

47. The polymer precursor of claim 39, wherein the oligomeric domain comprises polyethylene glycol, wherein the degradable functional group comprises disulfide, and wherein the crosslinkable functional group comprises acrylamide.

48. The polymer precursor of claim 47, wherein the oligomeric domain further comprises thioether.

49. The polymer precursor of claim 39, wherein the first stimulus comprises light.

50. The polymer precursor of claim 49, wherein the light is at a wavelength from about 300 to about 500 nm.

51. The polymer precursor of claim 39, wherein the oligomeric domain further comprises an amide moiety, a beta-thioether moiety, or a combination thereof.

52. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, and wherein the oligomeric domain further comprises an amide moiety, a beta-thioether moiety, or a combination thereof.

53. The polymer precursor of claim 52, wherein the oligomeric domain comprises four or more arms.

54. The polymer precursor of claim 52, wherein the oligomeric domain consists of four arms.

55. The polymer precursor of claim 52, wherein the oligomeric domain is hydrophilic.

56. The polymer precursor of claim 52, wherein the oligomeric domain comprises poly(ethylene glycol), poly (N-vinylpyrrolidone), poly(acrylic acid), poly(methacrylic acid), poly(vinyl alcohol), poly(L-lysine), poly(2-ethyl-2-oxazoline), poly(maleic acid), poly(vinyl phosphoric acid), poly(acrylamide), poly(vinylamine), poly(ethylene oxide-co-propylene oxide), poly(N-isopropylacrylamide), poly(vinyl phosphonic acid), poly(2-vinyl-1-methylpyridinium bromide), poly(N,N-diethylacrylamide), poly(N,N-dimethylacrylamide), poly(2-hydroxyethyl acrylate), poly (2-hydroxy methacrylate-co-methacrylic acid), poly (propylene oxide), poly(2-(dimethylamino) ethyl methacrylate), or poly(N-(2-hydroxypropyl) methacrylamide), or a combination thereof.

57. The polymer precursor of claim 56, wherein the oligomeric domain comprises poly(ethylene glycol).

58. The polymer precursor of claim 52, wherein the degradable functional group comprises disulfide, vicinal diol, beta-thioether ester, amidomethylol, peptide, polysaccharides (e.g. alginate, dextran, chitosan, chondroitin), ortho-nitrobenzyl, coumarin, acetal, ketal, ester, ortho ester, anhydride, imine, hydrazone, carbonate, phosphate, cinnamoyl, or benzoin ether, or a combination thereof.

59. The polymer precursor of claim 58, wherein the degradable functional group comprises disulfide.

60. The polymer precursor of claim 58, wherein the degradable functional group comprises vicinal diol.

61. The polymer precursor of claim 52, wherein the degradable functional group is enzymatically degradable.

62. The polymer precursor of claim 52, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

63. The polymer precursor of claim 52, wherein the oligomeric domain comprises polyethylene glycol, wherein the degradable functional group comprises disulfide, and wherein the crosslinkable functional group comprises acrylamide.

64. The polymer precursor of claim 63, wherein the oligomeric domain comprises thioether.

65. The polymer precursor of claim 52, wherein the oligomeric domain comprises polyethylene glycol, wherein the degradable functional group comprises vicinal diol, and wherein the crosslinkable functional group comprises acrylamide.

66. The polymer precursor of claim 65, wherein the oligomeric domain comprises thioether.

67. The polymer precursor of claim 52, wherein the first stimulus comprises light.

68. The polymer precursor of claim 67, wherein the light is at a wavelength from about 300 to about 500 nm.

69. The polymer precursor of claim 52, wherein the second stimulus comprises an energy source in a presence of a photoinitiator and an absence of polymer precursor.

70. The polymer precursor of claim 52, wherein the second stimulus comprises introduction of a degradation reagent, and wherein the degradation reagent comprises dithiothreitol (DTT), tris (2-carboxyethyl) phosphine (TCEP), 2-mercaptoethanol (BME), glutathione reductase (GSH), sodium (meta) periodate, alginate lyase, dextranase, lysozyme, chitinase, hyaluronidase, chondroitinase, cellulases, or a combination thereof.

71. The polymer precursor of claim 52, wherein the second stimulus comprises introduction of an oxidizing agent.

72. The polymer precursor of claim 52, wherein the second stimulus comprises introduction of a reducing agent.

73. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, and wherein the degradable functional group comprises disulfide.

74. The polymer precursor of claim 73, wherein the oligomeric domain consists of four arms.

75. The polymer precursor of claim 73, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

76. The polymer precursor of claim 73, wherein the crosslinkable functional group comprises alkene.

77. A polymer precursor, comprising:

an oligomeric domain comprising three or more arms, wherein each arm of the oligomeric domain comprises a degradable functional group and a crosslinkable functional group, wherein the crosslinkable functional group of an arm of the three or more arms is configured to crosslink in response to a first stimulus, thereby obtaining a polymerized form of the polymer precursor, and wherein the degradable functional group is configured to be cleaved in response to a second stimulus, thereby solubilizing the polymerized form of the polymer precursor, and wherein the degradable functional group comprises vicinal diol.

78. The polymer precursor of claim 77, wherein the oligomeric domain consists of four arms.

79. The polymer precursor of claim 77, wherein the crosslinkable functional group comprises acrylate, methacrylate, acrylamide, methacrylamide, norbornyl, styrene, vinyl ether, vinyl pyrrolidone, vinyl ester, maleimide, allyl, alkyne, azide, thiol, alkene, or epoxide, or a combination thereof.

80. The polymer precursor of claim 77, wherein the crosslinkable functional group comprises alkene.

* * * * *